(12) United States Patent  (10) Patent No.: US 7,469,064 B2
Furuya et al.  (45) Date of Patent: Dec. 23, 2008

(54) IMAGE DISPLAY APPARATUS

(75) Inventors: Shinji Furuya, Osaka (JP); Ichiro Okabayashi, Ikoma (JP); Yasuhiro Mori, Izumi (JP); Masaki Yamauchi, Ibaraki (JP); Akihiro Kawabata, Daito (JP)

(73) Assignee: Panasonic Corporation, Osaka (JP)

( * ) Notice: Subject to any disclaimer, the term of this patent is extended or adjusted under 35 U.S.C. 154(b) by 864 days.

(21) Appl. No.: 10/882,641

(22) Filed: Jul. 2, 2004

(65) Prior Publication Data

US 2005/0220349 A1  Oct. 6, 2005

(30) Foreign Application Priority Data

Jul. 11, 2003 (JP) ............................. 2003-273762
Jul. 22, 2003 (JP) ............................. 2003-277429

(51) Int. Cl.
 G06K 9/66 (2006.01)
(52) U.S. Cl. ..................................... 382/195
(58) Field of Classification Search ................ 345/590, 345/620, 621, 622, 625, 660, 668, 670, 671, 345/FOR. 214; 348/33.05; 382/190, 195, 382/199, 201, 203, 298, 282–283; 715/838
See application file for complete search history.

(56) References Cited

U.S. PATENT DOCUMENTS

| 5,748,776 | A | 5/1998 | Yoshida |
| 5,960,126 | A | 9/1999 | Nielson et al. |
| 6,101,289 | A * | 8/2000 | Kellner ..................... 382/276 |
| 6,370,262 | B1 | 4/2002 | Kawabata |
| 2003/0179301 | A1* | 9/2003 | Feldis et al. ............ 348/231.3 |
| 2006/0155811 | A1* | 7/2006 | Goh et al. ................... 709/206 |

FOREIGN PATENT DOCUMENTS

EP  673010 A1 *  9/1995
EP  0 727 760      8/1996

(Continued)

OTHER PUBLICATIONS

Wactlar H.D., et al. entitled "*Intelligent Access to Digital Video: Informedia Project*", May 1, 1996, Computer, IEEE Computer Society, Long Beach, CA, US, pp. 46-52.

(Continued)

*Primary Examiner*—Sherali Ishrat
(74) *Attorney, Agent, or Firm*—Wenderoth, Lind & Ponack, L.L.P.

(57) ABSTRACT

An image display apparatus includes: a display displaying an image with a predetermined number of pixels; an image holding unit holding an original image composed of a number of pixels larger than a number of pixels that is displayable on the display; and an object judgment unit judging whether or not an object is included in the original image held in the image holding unit, and generating object information related to the object in a case where the object is included in the original image. The image display apparatus also includes a display image generation unit extracting at least a part of an object area from the original image based on the original image specified by the user as well as on the object information corresponding to the original image, and generating a display image composed of a number of pixels corresponding to the number of pixels that is displayable on the display.

14 Claims, 40 Drawing Sheets

FOREIGN PATENT DOCUMENTS

| | | |
|---|---|---|
| JP | 11-15993 | 1/1999 |
| JP | 2002-23914 | 1/2002 |

OTHER PUBLICATIONS

Hauptmann A.G. and Witbrock M.J., entitled "*Informedia: News-On-Demand Multimedia Information Acquisition and Retrieval*", 1997, Intelligent Multimedia Information Retrieval, XX, XX, pp. 213-239, XP002245560.

Flickner M., et al., *Query by Image and Video Content: The QBIC System*, Sep. 1, 1995, Computer, IEEE Computer Society, Long Beach, CA, US, pp. 23-32, XP000673841.

* cited by examiner

FIG. 10
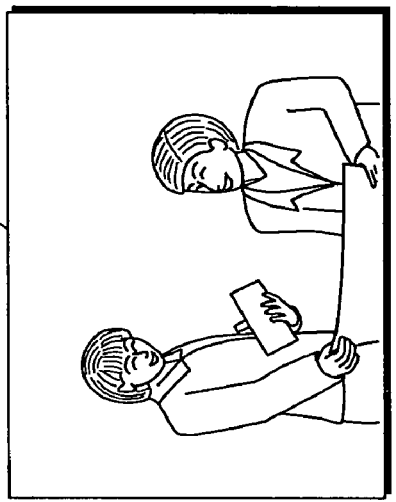
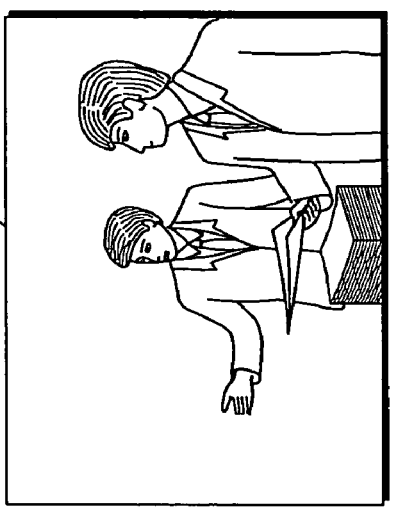
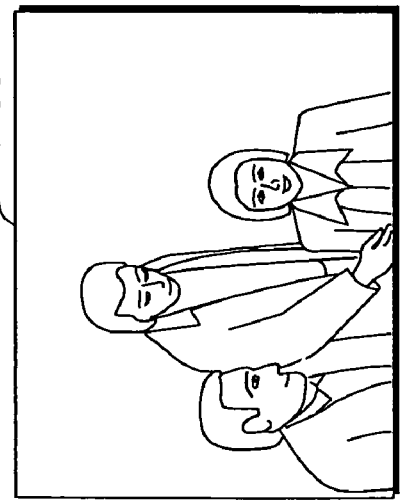
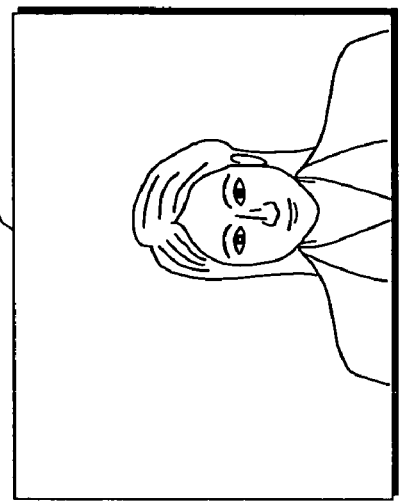
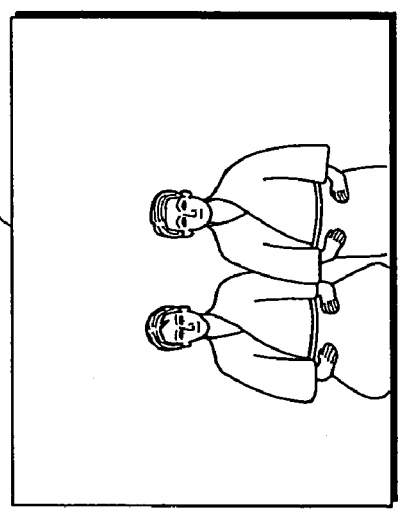

FIG. 11

| File name of original image | | a001.jpg | | |
|---|---|---|---|---|
| Position and size of object candidate | Starting point | O0e:(x0e, y0e) | O1s:(x1s, y1s) | O2s:(x2s, y2s) |
| | Ending point | | O1e:(x1e, y1e) | O2e:(x2e, y2e) |
| Type of objects | | someone's face | tie | uncertain | marker |
| Priority on objects | | 5 | 3 | 1 | 3 | a002.jpg a003.jpg

| Type of objects | Priority on objects |
|---|---|
| someone's face | 5 |
| tie | 3 |
| necklace | 3 |
| ⋮ | ⋮ |
| apple | 3 |
| orange | 3 |
| ⋮ | ⋮ |
| marker | 3 |
| eraser | 3 |
| ⋮ | ⋮ |
| uncertain | 1 |

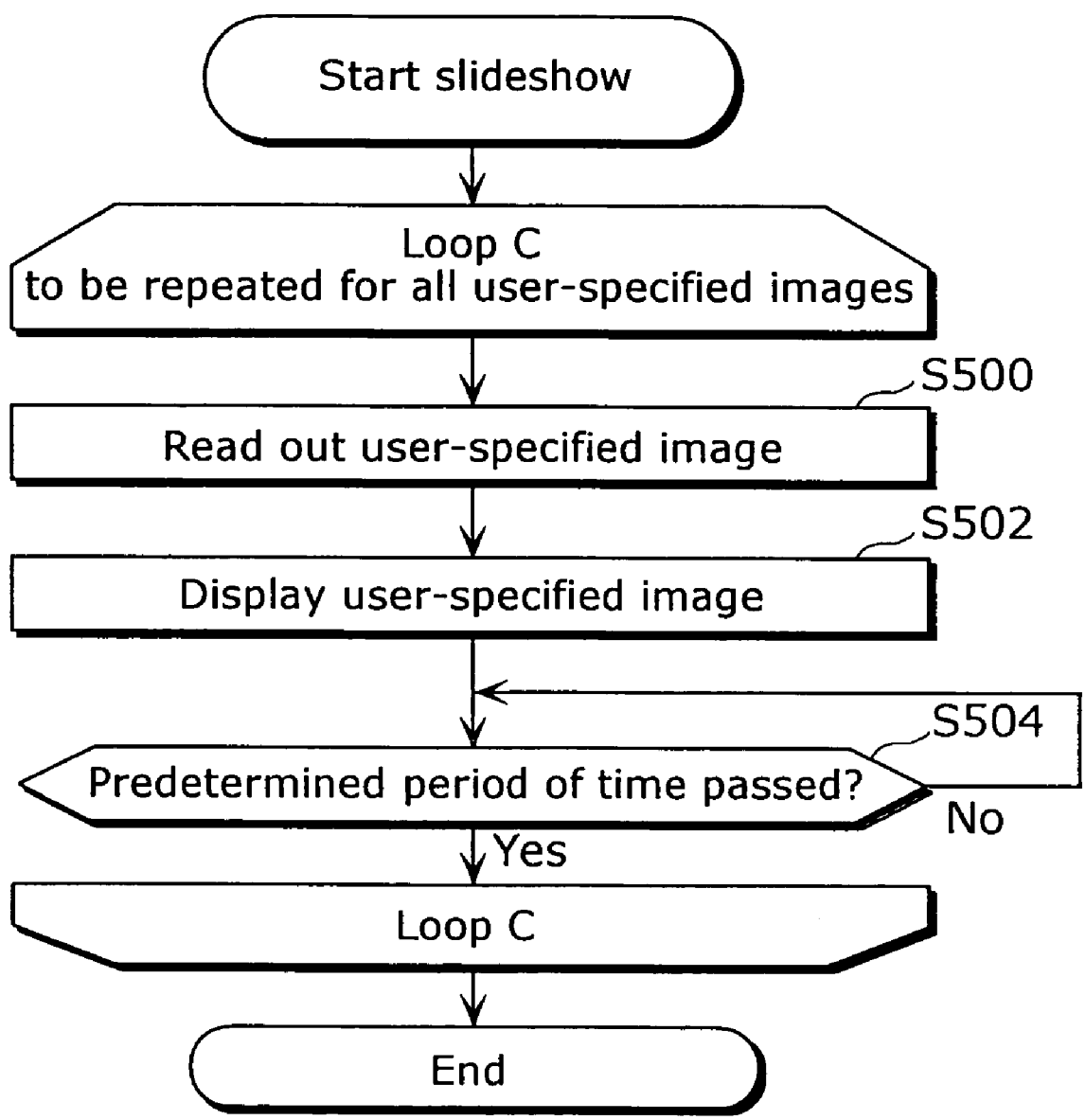

FIG. 24

IMAGE DISPLAY APPARATUS

BACKGROUND OF THE INVENTION (1) Field of the Invention

The present invention relates to image processing as well as a display technique for still images. In particular, the present invention to a technique of controlling an area in view of an object to be extracted when displaying the image as well as a technique of generating and replaying a short film with the use of at least one still image.

(2) Description of the Related Art

In 2001, the number of shipments of digital steel cameras (hereafter to be referred to as "digital camera") has surpassed that of silver salt cameras in the Japanese market for cameras, and it is predicted that the difference in number will further increase in the future. The recent market for cell phones has released a number of cell phones, each being equipped with a digital camera and these models are gaining a huge popularity. Thus, the number of users using a digital camera grows steadily.

On the other hand, a portable terminal (e.g., a cell phone) equipped with a function to display an image is also widely used to the extent that one person carries one cell phone, and the demand for displaying the images shot by a digital camera on an image display apparatus of the portable terminal (hereafter to be referred to as "image display apparatus") grows day by day.

An image formation apparatus like a digital camera, in general, shoots an object with the size of 1280×960 pixels and stores, in a medium such as an SD memory card (™), the image with the size of 1280×960 pixels (to be referred to as "original image") and a thumbnail image with the size of 160×120 pixels in EXIF format. The display of the image display apparatus, however, displays an image with the size of 240×320 pixels (QVGA) at maximum.

Thus, in the case where there is a difference between the resolution of the image to be displayed by the display of the image display apparatus and the resolution of the image to be displayed by the image display apparatus (referred to as "display image"), it is necessary to scale the display image in accordance with either of the resolutions.

Therefore, in the case of cell phone, the method to judge whether the image to be displayed can be displayed within a display area, and display the thumbnail image that is separately stored in the case where the original image does not fit in the display area is suggested as a technique related to the conventional image formation apparatus (see reference to Japanese Laid-Open Patent Publication 2002-23914).

Along with the wide use of digital cameras and cell phones with a camera, an increase in the number of users keeping huge amount of digital still images (hereafter to be referred to as "stillimages") is remarkable. These still images, in general, are stored in a disk drive in the personal computer. A short film generation apparatus for generating a short film like a movie based on still images and replaying it is suggested as an apparatus to replay such a huge amount of still images. For example, a technique to replay a still image while applying a visual effect to it based on the contents of dynamic image processing and a procedure in time processing (i.e., scenario) is disclosed in Japanese Laid-Open Application H 11-15993.

FIG. 1 is a block diagram showing the configuration of the conventional short film generation apparatus.

The conventional short film generation apparatus 900 consists of an operation receiving unit 901, an image receiving (obtainment) unit 902, an image accumulation unit 903, a scenario generation unit 904, an image replay unit 905 and a display unit 906.

The operation receiving unit 901 receives the inputs such as an instruction for reading still image data or a selection of still images operated by the user.

The image receiving unit 902 reads in the still image data in JPEG compressive format taken by a digital camera 910.

The image accumulation unit 903 accumulates the read-in still image data.

The scenario generation unit 904 decides an order of replaying the still images and respective visual effects, based on the still images selected by the user, generates a scenario that is replay information and stores it in the memory. Here, a scenario is not moving image data itself as represented by MPEG, but rather the data in which (i) a visual effect (effect), (ii) a parameter to define the operation of the effect, (iii) a pointer pointing at the still images to which the visual effect is applied, and (iv) a replay time are described in chronological order using a script language as represented by XML.

The image replay unit 905 repeats the following operation: reading out still image data from the image accumulation unit 903 according to the generated scenario; and replaying it with a speed of 15 frames/second while applying the predetermined visual effect.

The display unit 906 displays a user interface screen or an image to be replayed under the control of the scenario generation unit 904 and the image replay unit 905.

The short film generation apparatus 900 constructed as above operates as follows.

Firstly, the image shot by the user with the digital camera 910 is read in by the short film generation apparatus 900 via the image receiving unit 902 and then transferred and stored in the image accumulation unit 903.

Here, when the operation receiving unit 901 receives the user's operation to press a short film generation button, the scenario generation unit 904 generates a scenario.

FIG. 2 is a flowchart showing a procedure of the processing performed by the conventional scenario generation unit 904.

Firstly, the scenario generation unit 904 generates a screen (an image selection screen) to urge the user to select plural images stored in the image accumulation unit 903 and displays the screen on the display unit 906 (S900).

Here, when the operation receiving unit 901 receives the user's operation to select the still image to be replayed from the images to be displayed by the display unit 906 (Yes in S902), the scenario generation unit 904 checks the shooting time information is of the selected image and generates a scenario frame which links lists the replay information for each of the images in chronological order (S904).

Here, FIG. 3 shows the scenario frame generated in the case where the operation receiving unit 901 receives a selection of five still images (images 31, 32, 33, 34 and 35) from the user. It should be noted that the shooting time of the five still images are arranged in chronological order of images 31, 32, 33, 34 and 35.

FIG. 3 shows the conventional scenario frame.

The conventional scenario frame is like a linked list consisting of a scenario header 920, a scenario first list 921, a scenario second list 922, a scenario third list 923, a scenario fourth list 924 and a scenario fifth list 925.

In this case, a scenario name and a number of images are set in the scenario header 920 while an image file name and a storing place, out of the replay information for each image, are set in each of the lists 921~925 in the scenario frame.

A total replay time in the scenario header 920 and visual effect information and replay time information in each of the lists 921~925 in the scenario frame are left vacant.

The scenario generation unit 904 decides the visual effect to be assigned for each image in order of replaying images after having generated such a scenario.

As shown in FIG. 2, the scenario generation unit 904 firstly refers to the scenario first list 921 in the scenario frame (S906) and decides the visual effect to be assigned for the image 31.

Here, the scenario generation unit 904 generates a random number using a random function, divides it by 4 (S908) and decides the visual effect to be assigned for the image 31 by obtaining the remainder.

Namely, the scenario generation unit 904 adds, to the visual effect information in the scenario first list 921, "fade-in" for gradually clarifying the image (S912), in the case where the remainder is "1" (Yes in S910), and adds, to the visual effect information in the scenario first list 921, "fade-out" for gradually removing the image, in the case where the remainder is "2" (S916).

The scenario generation unit 904 adds, to the visual effect information in the scenario first list 921, "zoom-in" for enlarging the image in the center direction (S920), in the case where the remainder is "0" (Yes in S918), and adds, to the visual effect information in the scenario first list 921, "Pan" for displaying larger the part of the image and shifting the displayed part (S922), in the case where the remainder is "3" (No in S918).

The scenario generation unit 904 further sets the replay time of the image and adds the replay time information to the scenario first list 921, when adding the visual effect to be assigned to the visual effect information in the scenario first list 921. Here, the replay time of the image to which the zoom-in effect is applied is set as three seconds (45 frames) while two seconds is set for other images (30 frames).

After that, the scenario generation unit 904 judges whether or not the list to which the visual effect information and the replay time information are added is the last list (S924). The scenario generation unit 904 terminates the operation of scenario generation in the case where the list is the last list (Yes in S924) but refers to the next list in the scenario frame (S926) and repeats the operation to decide the visual effect, in the case where the list is not the last list (No in S924).

In this way, the scenario shown in FIG. 4 is completed after the repetition of the operation to assign the visual effect performed by the scenario generation unit 904 until it comes to the last image in replay order.

FIG. 4 shows the first example of the conventional completed scenario.

In the completed scenario, the information indicating 12 seconds for the total replay time is described in the scenario header 930, the visual effect information for assigning the fade-in effect as well as 2 seconds for the replay time information are described in the scenario first list 931 in which the replay information of the image 31 is described. In the same way, the visual effect information and the replay time information to be respectively assigned are described in the list where the replay information is described for each image.

That is to say, according to the completed scenario, the images 31, 32, 33, 34 and 35 are replayed in this order, and it is indicated that the fade-in effect is applied to the image 31, the zoom-out effect to the image 32, the fade-out effect to the image 33, the Pan effect to the image 34 and the zoom-in effect to the image 35. The respective replay time are indicated as 2 seconds, 3 seconds, 2 seconds, 2 seconds and 3 seconds (12 seconds in total).

Here, when the operation receiving unit 901 receives the input of the title of the short film from the user, in some cases, the scenario generation unit 904 inserts the replay information of the title image (an image with a black screen prepared to be used for the title) at the head of the list of the completed scenario.

In this case, the scenario generation unit 904 adds, to the head of the list of the scenario, the visual effect information indicating the insertion of the characters inputted by the user in the center of the image as well as the replay time information (2 seconds). FIG. 5 shows the scenario thus completed.

In the completed scenario, the title image, the images 31, 32, 33, 34 and 35 are replayed in this order and it is indicated that the character insertion effect is applied to the title image, the fade-in effect to the image 31, the zoom-out effect to the images 32 and the fade-out effect to the image 33, the Pan effect to the image 34 and the zoom-in effect to the image 35. The respective replay time are indicated as 2 seconds, 2 seconds, 3 seconds, 2 seconds, 2 seconds and 3 seconds (14 seconds in total).

Namely, the information indicating 14 seconds for the total replay time is described in the scenario header 940 while the visual effect information for assigning the character insertion effect for inserting the characters inputted by the user in the center of the image as well as replay time information indicating 2 seconds for the replay time as is described in the scenario first list 941 in which the replay information of the title image is described. In the same way, the visual effect information and the replay time information are respectively assigned in the respective list where the replay information is described for each image.

The image replay unit 905 receives address information of the scenario generated by the scenario generation unit 904 using the procedure described above and refers to the replay information of the image stored in the scenario first list.

The image replay unit 905 then reads out the image in compressive format from the image accumulation unit 903 based on the replay information that is already referred to and decompresses it. Then the image replay unit 905 applies the visual effect indicated in the visual effect information and outputs it to the display unit 906 while performing time management based on the replay time information (the number of frames). After the replay of the head image is completed, the image replay unit 905 executes the replay processing with reference to the replay information of the next image indicated in the scenario, and repeats the same processing until the replay of the last image (image 35) is terminated.

The following describes the visual effect of the image to be outputted for display on the display unit with reference to FIG. 6.

Here, the Pan effect for shifting in diagonal direction on the image is explained.

FIG. 6 shows an example of the screen display performed by the conventional short film generation apparatus 900.

According to the Pan effect in diagonal direction on the image, the short film generation apparatus 900 enlarges the first display area 951 for display after having displayed the display screen example 950, then, displays the second display area 953 by shifting the part to be displayed along with the display transition line 952, and then terminates the replay.

In this way, the conventional short film generation apparatus 900 generates a short film to be displayed as if an image were moving, and replays it while applying to the plural still images the visual effects such as zoom-in, fade-in, fade-out and Pan. It is innovative that such conventional short film generation apparatus 900 has opened up the possibility of new entertainment using digital still images by giving the still images the movements as seen in the moving image.

However, with the use of the conventional image display apparatus, in the case where the resolution (number of pixels) of the display image is higher (larger) than that of the display, it is necessary to store thumbnail images having less number of pixels than that of the display in order to display the whole image. This is often the case for a display terminal with a very small display as is the case of the cell phone, where the thumbnail image with the resolution 1/64 of the original one is wholly displayed on the display apparatus having a display area of QVGA (320×240 pixels=approximately 80000 (76800) pixels).

That is to say, in such case, the problem is that the resolution of the whole image is decreased, by which the degradation of the image quality is caused.

Another problem is that the part of the image which the user wants to close up (Region Of Interest, e.g., someone's face) becomes relatively small and therefore the quality as well as the is level of visibility is degraded.

In order to solve such problems, it is conceivable to store the original image and display it on the display, however, the problem is that this means to see a part of a large image with a small display apparatus (screen) and imposes strains on the user in the operation. More precisely, the image with XGA size is ten times as big as the display area with QVGA size so that it causes a lot of trouble for the user to scroll in order to find the ROI. In the case where someone's face is shot in a small size, the user needs to zoom-in the part in order to display it. This causes troublesome operations at the side of the user.

Similarly, in the case of listing about nine thumbnail images on the display, the thumbnail images need to be further minimized to the size of 80×60 pixels. In such case, it is again the same problem that the degradation of the level of visibility due to the decrease in resolution for each thumbnail image is evident, and this makes it difficult to see what is in the image.

According to the conventional short film generation apparatus as described above, the visual effect on the image selected beforehand by the user is decided randomly or fixedly for the generation of the scenario necessary for replay. It is therefore impossible to generate a scenario with an impact. That is to say, when deciding a visual effect for each image, the visual effect is assigned in an arbitrary manner without considering what is in the image. Therefore, the trouble is that it is impossible to generate a scenario with an impact, where the characteristics of the image are concerned.

Another problem in using the conventional short film generation apparatus is that it troubles the user because he/she needs to input a title of the image and select the image for generating a scenario.

BRIEF SUMMARY OF THE INVENTION

The present invention has been conceived in view of the above problems, and it is the first object of the present invention to provide an image display apparatus, an image display method and a portable terminal having the apparatus or the method for reducing a degradation of the image quality, improving a visibility of what is in the image and reducing user's burdens in operating the apparatus as well as to provide an image display apparatus that allows the user to see clearly what is in the image when looking at an index of thumbnail images.

It is the second object of the present invention to provide a short film generation apparatus which can replay an image by applying a visual effect suitable for the image and which allows the user to generate a scenario without operations such as inputting a title or selecting an image.

In order to achieve the above objects, the present invention implements the following technical units.

Namely, the image display apparatus according to the present invention is an image display apparatus comprising: a display unit operable to display an image; an original image holding unit operable to hold an original image composed of a number of pixels larger than a number of pixels that is displayable on the display unit; an object judgment unit operable to judge whether or not an object is included in the original image held in the original image holding unit, and generate object information related to the object in the case where the object is included in the original image; and a display image generation unit operable to i) extract, from the original image, at least a part of an object area which includes the object, and ii) generate a display image with a number of pixels corresponding to the number of pixels that is displayable on the display unit, the extraction and generation being performed based on the original image specified by a user and the object information corresponding to the original image.

Thus, a part including at least a part of the object area is displayed larger since the display image that includes at least the part of the object area is generated based on the original image. Therefore, it is possible to provide the image display apparatus which improves the visibility and reduces the user's operational burdens.

The object judgment unit includes an object extraction unit operable to extract a position and a size of the object in the original image, and add the extracted position and size of the object to the object information, and the display image generation unit determines a part to be extracted from the original image, based on the position and size of the object which are added to the object information.

With this structure, it is easier to determine the part of the original image that includes at least a part of the object area.

The object extraction unit may extract the object using at least one of the following: pattern matching; color distribution information; edge information; area division information; and layout information.

The object judgment unit may further include an object type judgment unit operable to judge a type of the object extracted by the object extraction unit, and add the judged type of the object to the object information, wherein the display image generation unit determines the part to be extracted from the original image, based on the position, size and type of the object which are added to the object information.

Owing also to this, it is easier to determine the part of the original image that includes at least a part of the object area.

The type of objects may include at least one of the following: figure; someone's face; dog; cat; book; object with a character string; sign-board; and price tag.

Thus, the part which includes at least the object area of various types is displayed larger.

The object judgment unit may further include an object priority setting unit operable to add, to the object information, a priority that is given according to the type of the object judged by the object type judgment unit, and the display image generation unit determines the part to be extracted from the original image, based on the priority that is added to the object information.

Owing also to this, it is easier to determine the part of the original image that includes at least a part of the object area.

The object judgment unit may include an object extraction unit operable to extract a position and a size of the object in the original image, and add the extracted position and size of the object to the object information, and the display image generation unit determines a part to be extracted from the original image so that a center position of the object becomes a center position of the display image, the center position of the object being added to the object information.

Thus, it is possible to enhance the visibility of the object.

The image display apparatus may further comprise: an obtainment unit operable to obtain an original image at least by shooting a picture, or via a storage medium or a transmission medium; and a storage unit operable to store, in the original image holding unit, the original image obtained by the obtainment unit.

With this structure, it is possible to obtain an original image in various ways.

The display image generation unit further includes a thumbnail image generation unit operable to i) extract at least a part of an object area which includes the object in the original image, and ii) generate a thumbnail image composed of a predetermined number of pixels, the extraction and generation being performed based on the object information.

Here, it is preferable that the original image holding unit holds a plurality of original images and the display image generation unit allows the display unit to list up, for display, the thumbnail images for each of the original images generated by the thumbnail image generation unit. Also, it is more preferable that the predetermined number of pixels is a number of pixels assigned by the display unit for the display of one thumbnail image.

Thus, it is possible to see clearly what is in the image when the thumbnail images are listed up for display.

The display image generation unit may generate a display image composed of a number of pixels corresponding to the number of pixels that is displayable on the display unit by enlarging or reducing a part to be extracted from the original image. The display image generation unit may determine a part to be extracted from the original image so that a number of pixels of the part to be extracted from the original image equals to the number of pixels that is displayable on the display unit.

Thus, it is possible to realize the image display apparatus which improves the visibility of the object and reduces the user's operational burdens since a display image is generated based on an original image in such manner that the part which includes at least a part of the object area is displayed larger.

The short film generation apparatus according to the present invention is a short film generation apparatus for generating a short film using at least one still image, the apparatus comprising: a still image obtainment unit operable to obtain one or more still images inputted from outside; an object extraction unit operable to judge whether or not an object is included in each of the one or more inputted still images, and extract information related to the object in the case where the object is included in the inputted still image; and a scenario generation unit operable to generate a scenario that is replay information of the short film by determining: an order of replaying the inputted still images; and a visual effect to be applied to the object in the still image according to the judgment made by the object extraction unit. Here, the object is a character area, and the object extraction unit includes a character area extraction unit operable to judge whether or not a character area is included in each of the one or more inputted still images, and extract information related to the character area in the case where the character area is included in the still image, and the scenario generation unit generates the scenario that is replay information of the short film by determining: an order of replaying the inputted still images; and a visual effect to be applied to the character area in the still image according to the judgment made by the character area extraction unit.

With this structure, an object (i.e., character area) included in the still image is extracted and a visual effect is applied to the object (character area). It is therefore possible to generate a short film with a strong impact where the object is thus emphasized.

The scenario generation unit may generate a scenario based on which an enlargement effect is applied to the character area in the still image according to the judgment made by the character area extraction unit. The scenario generation unit may also generate a scenario based on which a Pan effect is applied to the character area in the still image according to the judgment made by the character area extraction unit. The scenario generation unit may further generate a scenario based on which the character area in the still image is modified according to the judgment made by the character area extraction unit.

It is preferable that the scenario generation unit generates a scenario by determining a visual effect to be applied to the character area, based on at least one of form, size and color of the character area, out of information related to the character area extracted by the character area extraction unit.

Thus, the visual effect applied to the character area is selected according to the characteristics of the character area in the still image. It is therefore possible to generate a short film with a stronger impact because a suitable visual effect is applied to the character area.

The short film generation apparatus may further comprise an image selection unit operable to select a still image to be replayed, based on a shooting time of a still image that is judged, by the character area extraction unit, as the image which includes the character area, wherein the scenario generation unit generates a scenario for the image selected by the image selection unit.

Thus, the image group temporally associated with a key image is automatically selected so that the user does not need to select the still images to be used for a short film.

Moreover, the scenario generation unit may generate a scenario in which characters in the character area within the still image are used as a title of the scenario according to the judgment made by the character area extraction unit.

Thus, it is possible to save the user from inputting a title character with a keyboard since the character area in the image is automatically inserted in the title image.

The visual effect to be determined by the scenario generation unit may be at least one of the following: i) a scaling effect of displaying the still image by enlarging or reducing the object; ii) an eye-point shifting effect of displaying the still image by shifting an eye-point from the object; iii) a zoom-in/zoom-out effect of displaying the still image by applying, to the still image, zoom-in or zoom-out with a focus on the object; iv) and a trimming effect of trimming out an area which includes the object in the still image.

Thus, the short film generation unit which enhances the visibility of the object, since it is possible to apply one of various visual effects to the object, and can generate a short film with a strong impact.

It should be noted that the present invention can be realized not only as the image display apparatus as described above, but also as the image display method comprising these characteristic units included in the image display apparatus as steps or as a program which causes a computer to execute these steps. The present invention can be realized even as a portable terminal having such image display apparatus.

Similarly, the present invention can be realized as the short film generation apparatus as described above, but also as the short film generation method comprising the characteristic units included in the short film generation apparatus as steps or as a program which causes a computer to execute these steps. Such program can be surely distributed via a storage medium like a CD-ROM or a transmission medium like the Internet.

As already described above, according to the image display apparatus according to the present invention, a display image is generated based on the part of the original image which includes at least a part of the object area, therefore, the part that includes at least a part of the object area is displayed larger. Therefore, it is possible to provide the image display apparatus that achieves the visibility of the object and reduces the user's operational burdens.

According to the image display apparatus of the present invention, a thumbnail image is generated based on the part of the original image which includes at least a part of the object area so that the part that includes at least a part of the object area is displayed larger. Therefore, it is possible to clearly see what is in the image even when the thumbnail images are listed up for display.

Consequently, according to the present invention, it is possible to perform various kinds of image processing with a focus on the object in the original image and display an image with a high visibility even with the display having less number of pixels. The practical value of the present invention is extremely high today where digital cameras and cell phones are widely used.

According to the short film generation apparatus of the present invention, it is possible to select a visual effect that is suitable for the image. This enables the generation of the short film with a greater impact.

The related images are automatically selected, and then replayed, with the image selected by the user as a key image.

Therefore this saves the user from selecting all the images to be replayed.

In addition, the character area is automatically inserted to the title image so that the user does not need to input the title manually.

Consequently, the user can enjoy making a short film with a great impact with a simple operation, and the practical value of the present invention is very high in this world where an increase in number of the users who keep a huge amount of still images is noticeable.

The disclosure of Japanese Patent Applications No. 2003-273762 filed on Jul. 11, 2003 and No. 2003-277429 filed on Jul. 22, 2003, each including specification, drawings and claims, are incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 10 shows the original image to be stored in an image holding unit;

FIG. 11 shows an example of the composition of object information;

FIG. 13 shows an example of the composition of an object priority setting table;

FIG. 15A shows an example of the listing of the thumbnail images performed by the image display apparatus according to the present invention while

FIG. 18A shows an enlarged image while

FIG. 19A shows the display image before the eye-point is shifted while

FIG. 20A shows the display image when the image is zoomed-in while

FIG. 21A shows the display image before the trimming processing is operated while

FIG. 22 is a flowchart showing the processing executed by a slideshow unit;

FIG. 24 shows an example of displaying the icons "Return", "Whole" and "Save" when the magnified image is displayed and an example of displaying the icons "Return", "Enlarge" and "Save" when the minimized image is displayed;

DETAILED DESCRIPTION OF THE INVENTION

The following describes in detail the best modes for implementing the present invention with reference to the drawings.

First Embodiment

Firstly, the image display apparatus according to the first embodiment of the present invention will be explained with reference to FIGS. 7~27.

Figure 1:
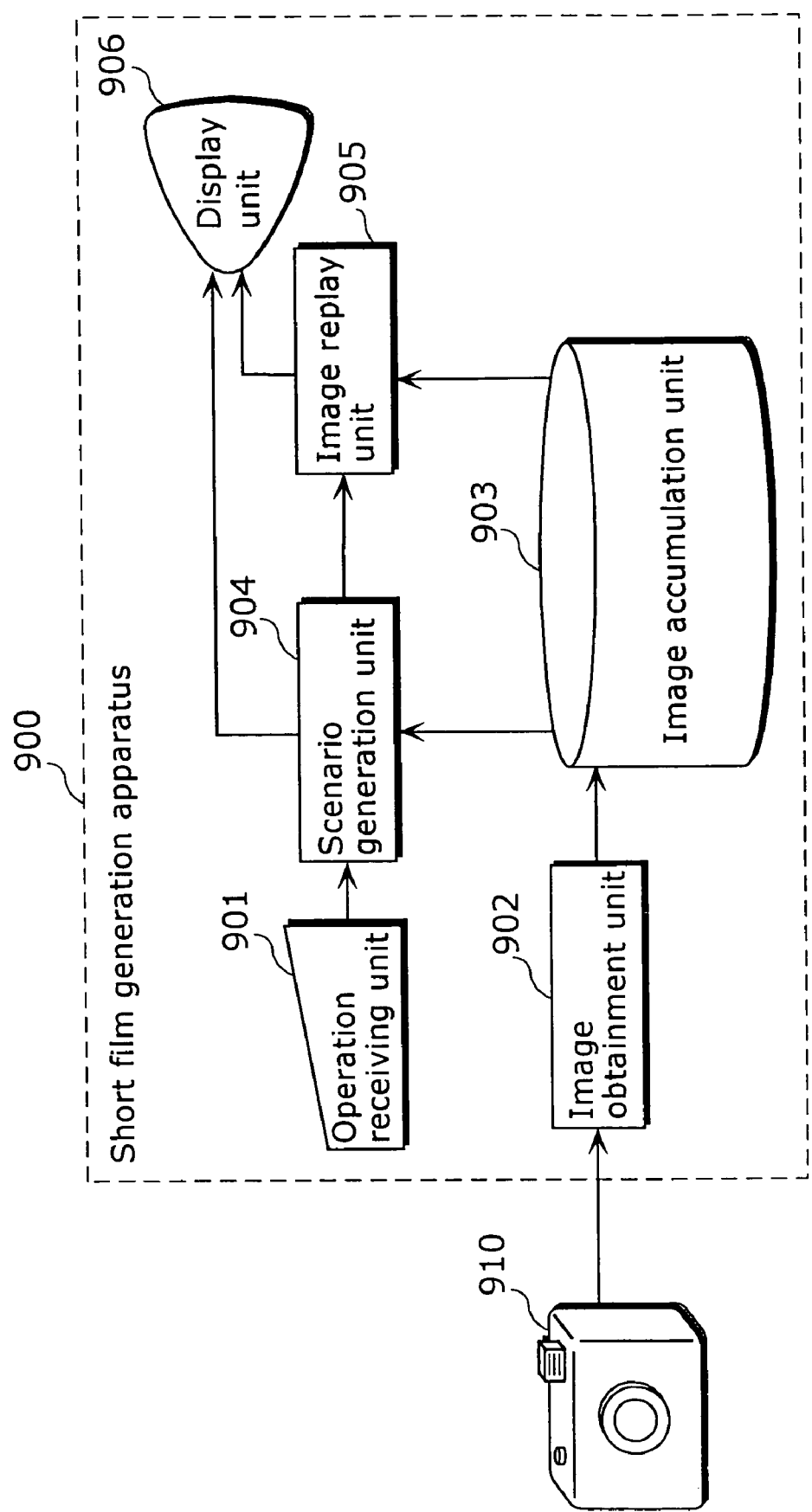
FIG. 1 is a block diagram showing the configuration of a conventional short film generation apparatus.
Figure 2:
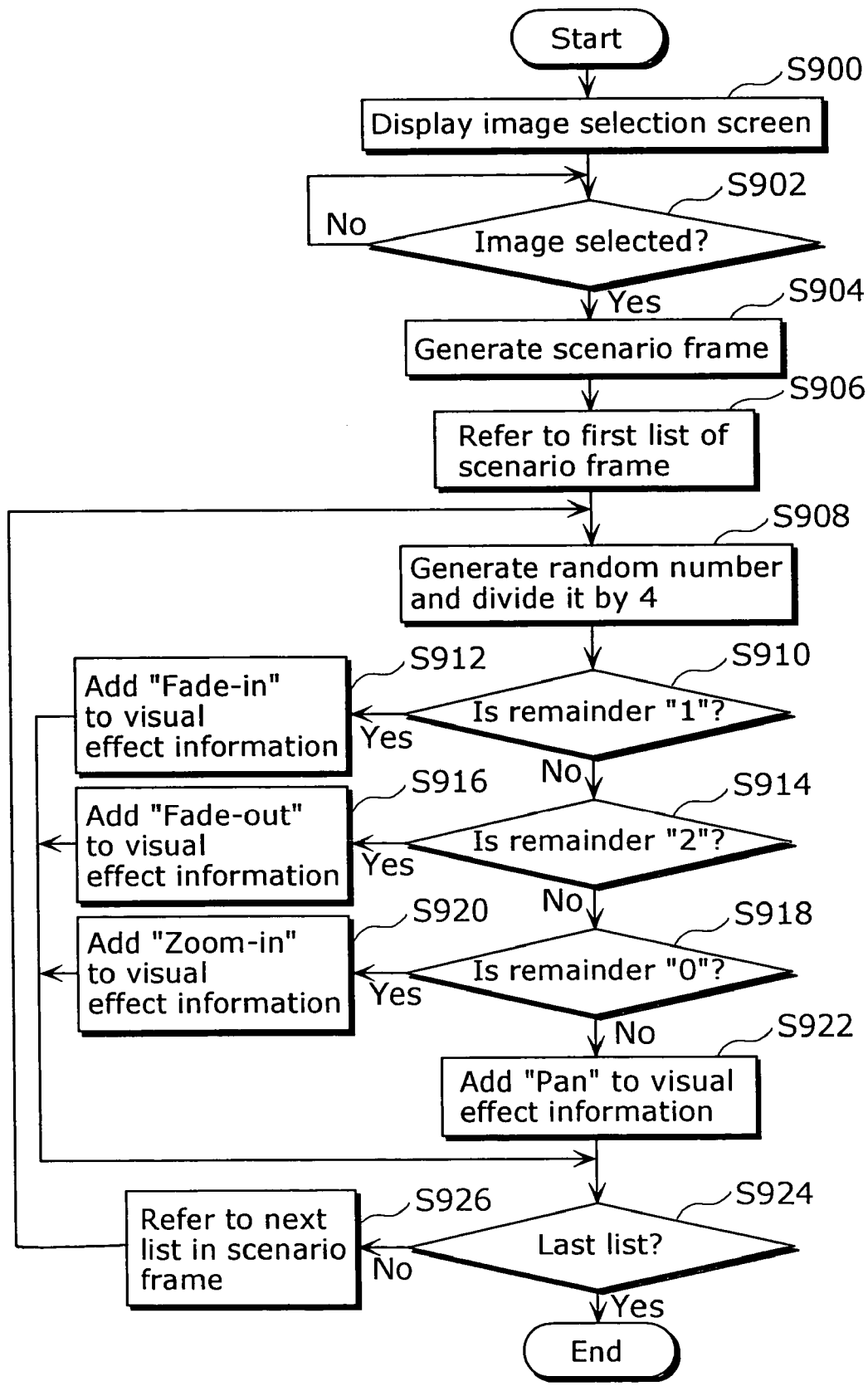
FIG. 2 is a flowchart showing the procedure operated by a conventional scenario generation unit.
Figure 3:
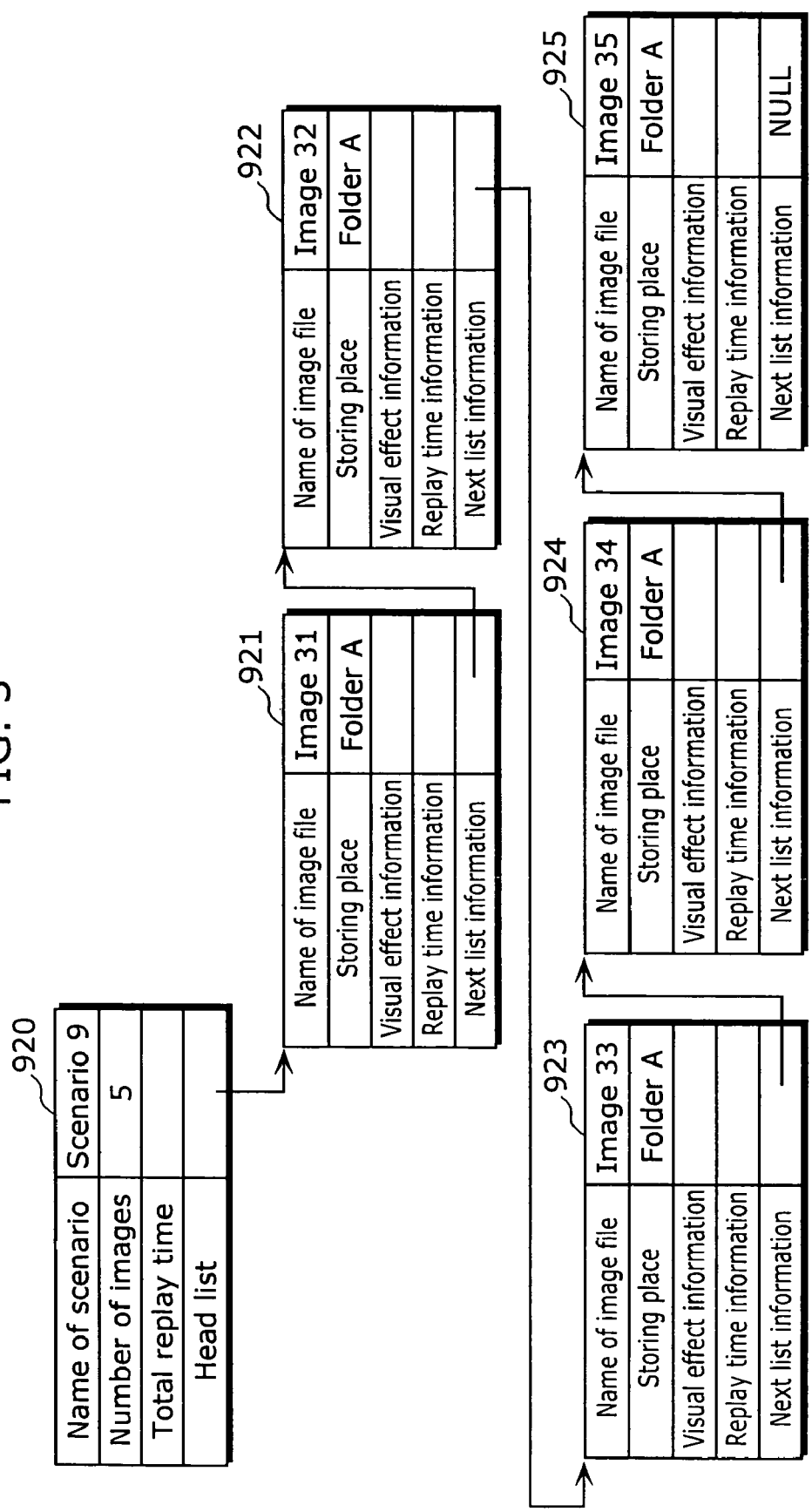
FIG. 3 shows the conventional scenario frame.
Figure 4:
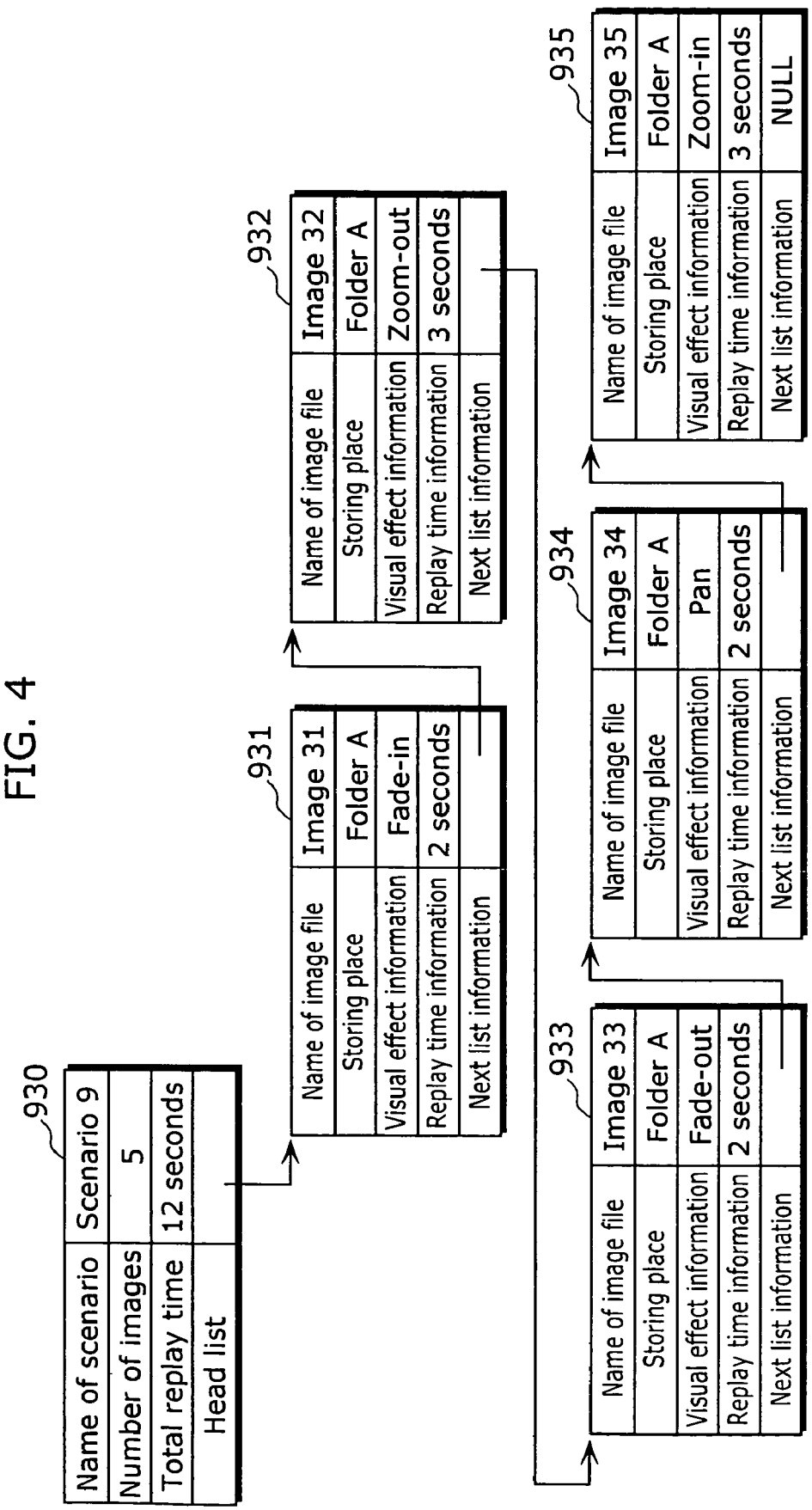
FIG. 4 shows a first example of a conventional completed scenario.
Figure 5:
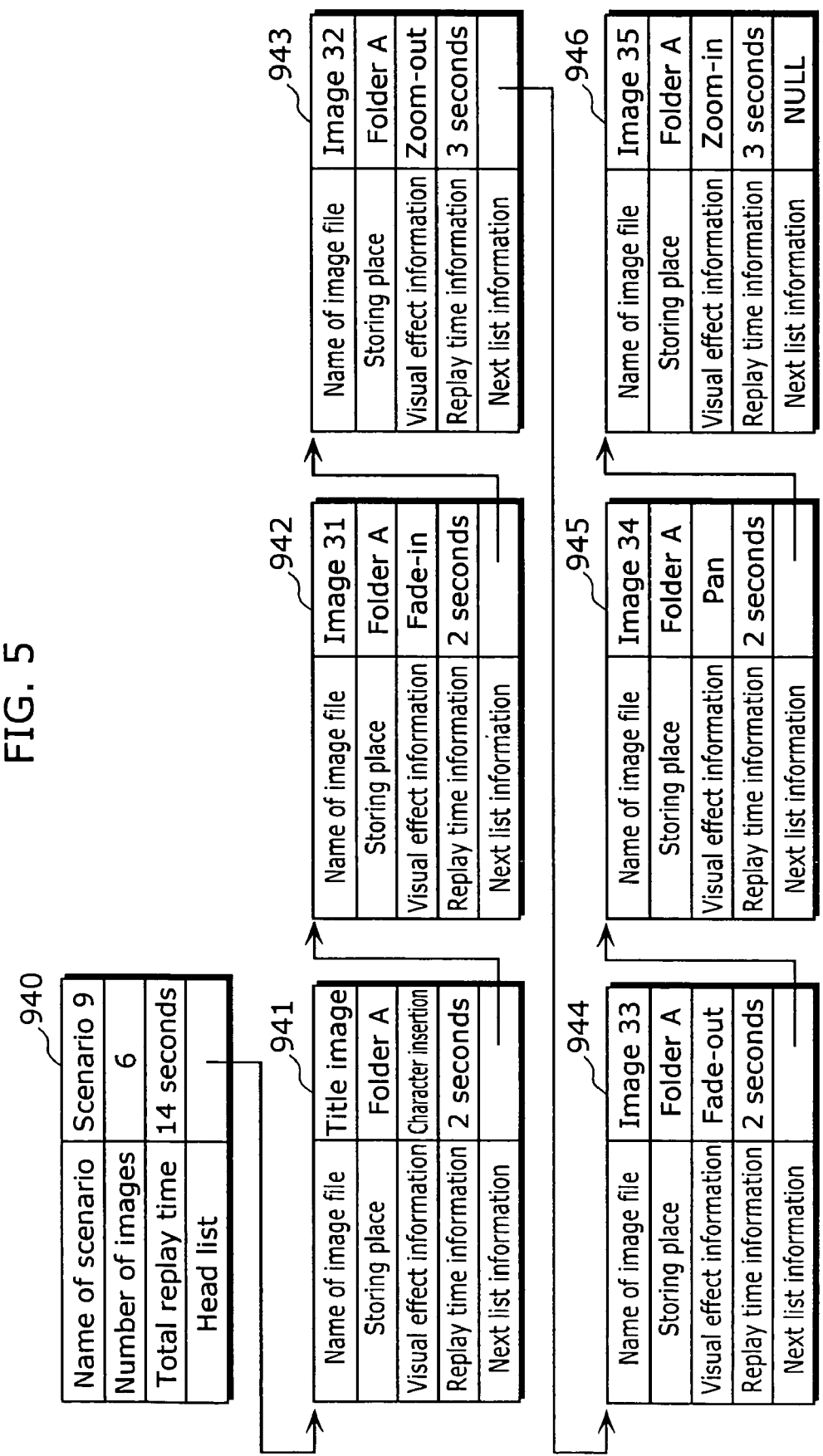
FIG. 5 shows a second example of the conventional completed scenario.
Figure 6:
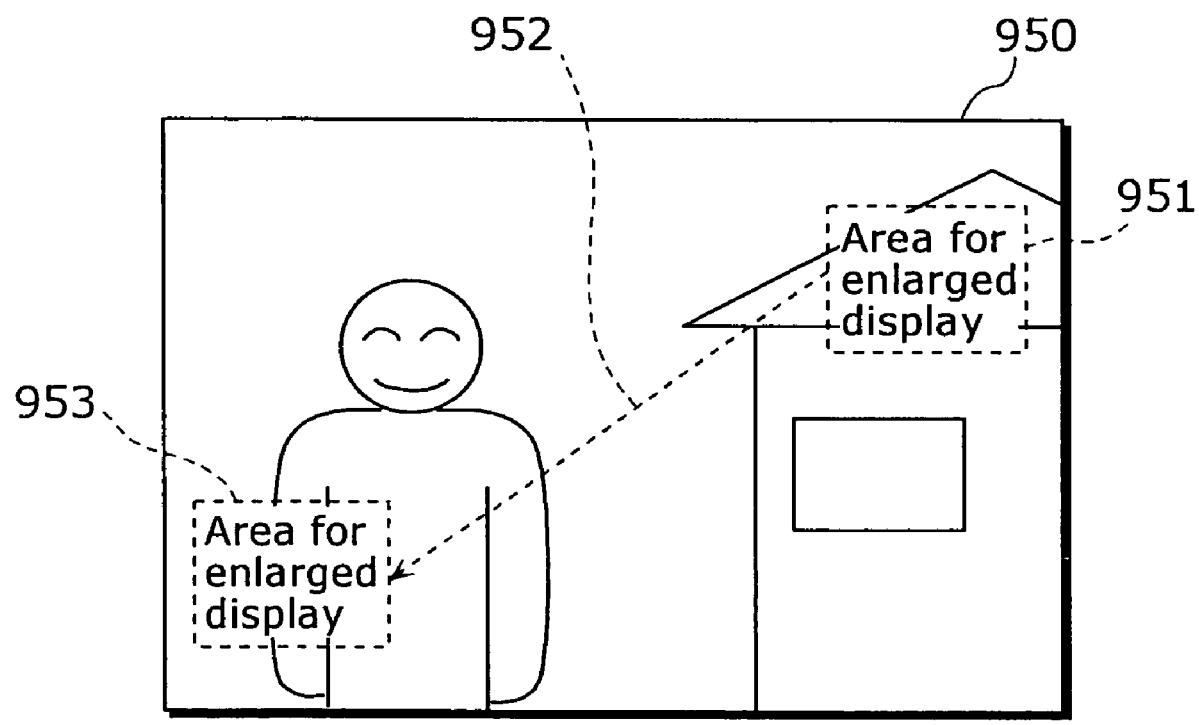
FIG. 6 shows an example of the screen display performed by the conventional short film generation apparatus.
Figure 7:
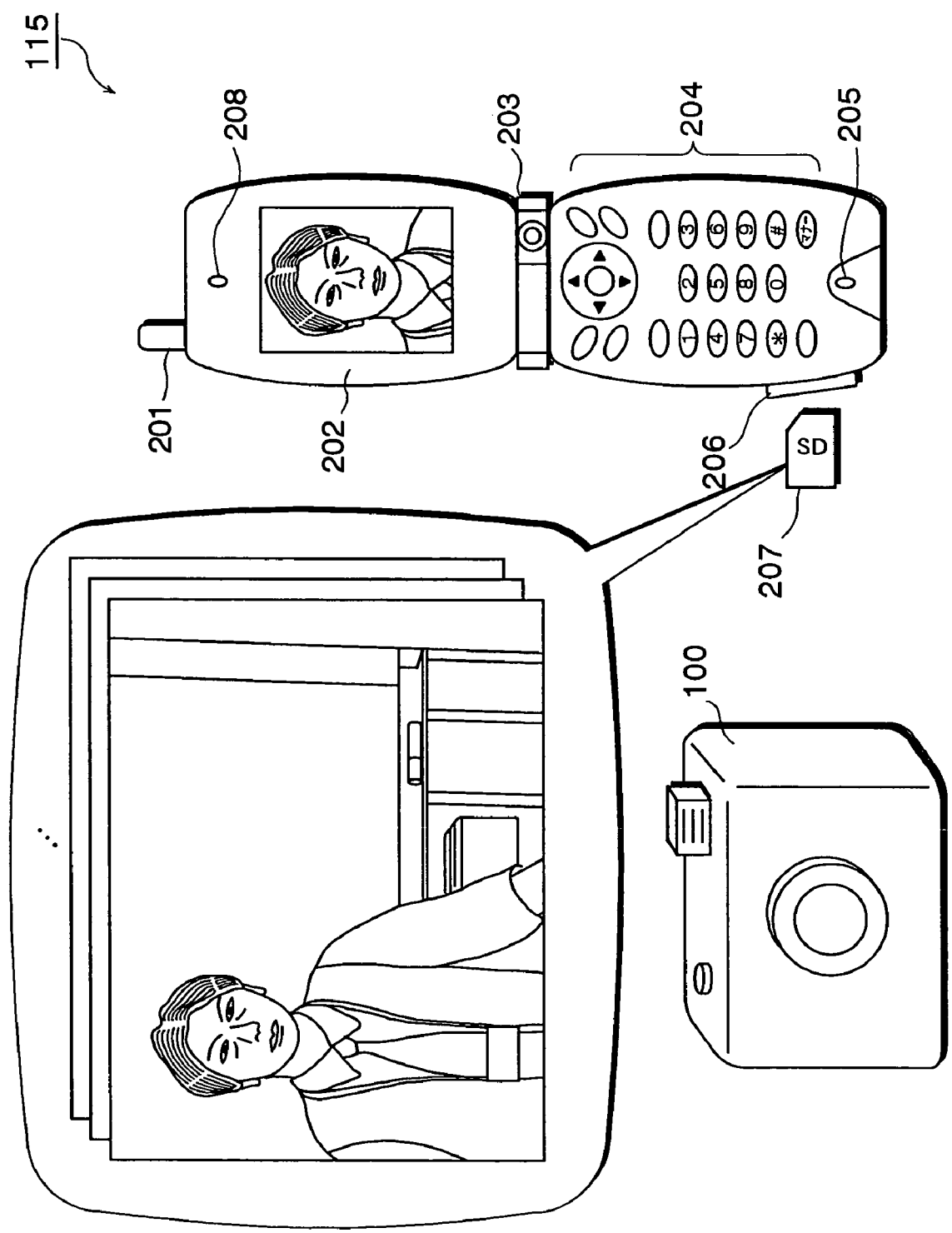
FIG. 7 shows outer appearances of a digital camera and a cell phone equipped with an image display apparatus.

FIG. 7 shows outer appearances of the digital camera and the cell phone equipped with the image display apparatus.

The digital camera 100, equipped with a CCD, for instance, of 3 million pixels, shoots an object with a resolution of 1280×960 pixels, and stores, in the storage medium 207, the original image with the resolution of 1280×960 pixels and the thumbnail image with the resolution of 160×120 pixels, both of which are in EXIF format.

The cell phone 115, on the other hand, is equipped with an antenna 201 for transmitting electric waves to and from a base station and a flash, and includes the following: a camera unit 203 capable of shooting moving or still images; a display unit 202 such as a liquid crystal display for displaying the images taken by the camera unit 203 and the images received by the antenna 201; a main unit consisting of operational keys 204; a voice output unit 208 such as a speaker for outputting voices; a voice input unit 205 such as a microphone for inputting voices; and a slot unit 206 for mounting the storage medium 207 to the cell phone 115.

The camera unit 203, equipped with a CCD, for instance, of 1.3 million pixels, shoots an object with the resolution of 1024×1280 pixels at maximum that is more than the number of pixels (240×320) displayable on the display unit 202. The storage medium 207 is a storage medium such as an SD memory card (™) storing, within a plastic case, a flash memory component that is a kind of Electrically Erasable and Programmable Read Only Memory (EEPROM) and is used for storing the (i) data of moving or still images that are shot, (ii) the data of received e-mails and (iii) the data of coded or decoded moving or still images.

Figure 8:
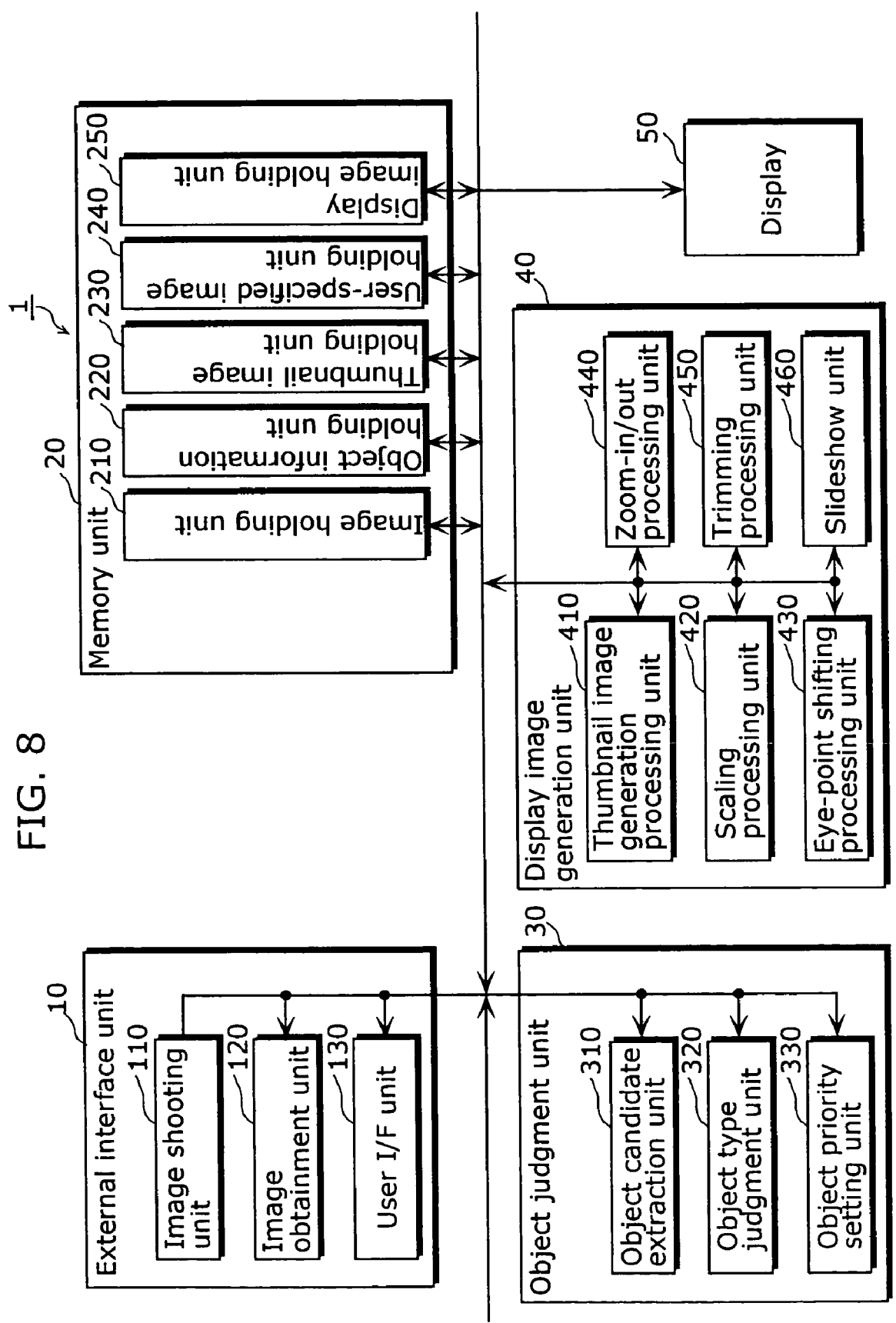
FIG. 8 shows a pattern diagram of the block structure of the image display apparatus according to a first embodiment.

FIG. 8 shows a pattern diagram showing the block structure of the image display apparatus according to the first embodiment.

The image display apparatus 1 is mounted to the cell phone 115 and consists of the following: an external interface unit 10 which functions as an external interface; a memory unit 20 which functions as a storing apparatus; an object judgment unit 30 for judging whether or not an object is included in the original image stored in the memory unit 20 and generating object information related to the object in the case where it is judged that the object is included; a display image generation unit 40 which generates, based on the image specified by the user and the object information corresponding to the original image, at least one display image in accordance with the number of pixels displayable on a display 50 using the original image including at least a part of the object area; and the display 50 for displaying the image. It should be noted that the object judgment unit 30 and the display image generation unit 40 consist of a program for performing predetermined operations and a DSP for executing the program.

The external interface unit 10 includes an image shooting unit 110, an image receiving (obtainment) unit 120 and a user IF unit 130.

The image shooting unit 110 shoots an image, using an arbitrary means to shoot an image, as represented by a CCD, and reads the shot image in the image display apparatus 1.

The image receiving unit 120 obtains an image from an arbitrary storage medium as represented by an SD memory card (™) or a multimedia card, or via an arbitrary network as represented by an Ethernet (™) cable or a wireless LAN, and reads it in the image display apparatus 1.

The user IF unit 130 provides a user interface for the image display apparatus 1 via an arbitrary means for input as represented by a keyboard, a touch panel and speech recognition. The user IF unit 130 can improve convenience for the user through a display of icons and help.

It should be noted that the components of the external interface unit 10 are not limited to the image shooting unit 110, the image receiving unit 120 and the user IF unit 130, and it is possible to connect, input/output to an arbitrary external environment or apparatus, if necessary.

An arbitrary external input/output device installed in a cell phone, a PDA, a personal computer, a game and a camera (digital camera or movie) can be a component of the external interface unit 10. The following can be listed as an example: the microphone unit 205 for speech recognition, the speaker unit 208 for outputting the data stored in the image display apparatus such as help and music information, a light source unit such as a flash for the image shooting unit 110 to shoot an object, an inner status display unit for showing an arbitrary inner state of the image display apparatus 1 such as ON/OFF status of the power.

The memory unit 20 includes an image holding unit 210, an object information holding unit 220, a thumbnail image holding unit 230, a user-specified image holding unit 240 and a display image holding unit 250. The memory unit 20 can use, when necessary, an arbitrary storage medium such as an SD memory card (™) and a is hard disk besides a volatile/non-volatile memory, as a memory.

The image holding unit 210 stores the image data inputted to the image display apparatus. The image holding unit 210 can store, when necessary, one piece of original image data in plural formats or with plural resolutions or in a trimming size. For example, the image can be stored in plural formats such as JPEG and BITMAP, in different resolutions, or as an image that is partly trimmed. The image holding unit 210 can store the data in an arbitrary combination of the methods listed above without restriction to the examples shown here.

The object information holding unit 220 holds the object information generated by the object judgment unit 30.

The thumbnail image holding unit 230 holds the thumbnail image generated by the display image generation unit 40.

The user-specified image holding unit 240 holds the display image specified by the user.

The display image holding unit 250 temporarily holds, in particular, the image data of the image to be displayed by the display 50, and is an equivalent of a VRAM in a normal personal computer, for example.

The object judgment unit 30 includes an object candidate extraction unit 310, an object type judgment unit 320 and an object priority setting unit 330.

The object candidate extraction unit 310 estimates candidates for the object within the image and extracts it.

Here, an arbitrary existing technique of processing an image disclosed in Japanese Laid-Open Patent Publications No. 2002-304627 and No. H10-21394 can be used for the method to extract a candidate, employed by the object candidate extraction unit 310, as well as the method for judgment employed by the object type judgment unit 320.

For example, the object candidate extraction unit 310 extracts a candidate for an object by using a pattern match based on a template or by using an area division format, a binarized image and an edge extracted image for the correlation between frequency, color and layout.

The object type judgment unit 320 judges an object candidate for its authenticity or its type.

The object type judgment unit 320 also judges the type of the object candidate using an arbitrary process, e.g., color information and edge information, in the area for finding a candidate for an object or judges whether or not an object is identified as such.

Here, assume that someone's face is identified as an object. Firstly, a gray colored template is prepared for judging someone's face as a candidate. Then, the correlation between the gray colored template and a target image is calculated and the area with high correlation value is defined as "candidate area for someone's face". Furthermore, by obtaining a proportion of nude color for the candidate area, whether or not the identified area is someone's face can be judged.

The object priority setting unit 330 inserts, in the object information, a priority corresponding to the type of the object judged by the object type judgment unit 320.

The display image generation unit 40 includes a thumbnail image generation processing unit 410, a scaling processing unit 420, an eye-point shifting processing unit 430, a zoom-in/out processing unit 440, and a trimming processing unit 450 and a slideshow unit 460, and generates an image to be displayed by the display 50 via the display image holding unit 250.

The thumbnail image generation processing unit 410 sets a display area including at least a part of the object in the original image for each of the original images stored in the image holding unit 210, based on the position included in the object information. The thumbnail image generation processing unit 410 then generates, is based on the original image, a thumbnail image whose resolution corresponds to the resolution of the display area already set with a predetermined number of pixels, and lists up the generated thumbnail images on the display 50. In this way, it is possible to present clearly what is in the original image, that is, what the objects are, to the user.

The scaling processing unit 420 enlarges or reduces an original image. In this way, the object in the original image can be displayed larger, in detail, or as a whole.

It should be noted that the conditions for automatically enlarging the object are as follows:

1) in a case where the user sets beforehand "automatic magnification display" as valid;

2) in a case where "automatically magnifies for display" is set as an initial setting; and 3) in a case where "enlarges for display" is set when the object is recognized.

Thus, it is possible to set arbitrary conditions depending or not depending on the presence of the object.

The eye-point shifting processing unit 430 performs the processing equivalent of pan and tilt. Here, "pan" is a kind of camera operation at the time of shooting, that is, "shooting a wide range in shifting the camera in a horizontal direction with a fixed camera position". In the case of the eye-point shifting processing unit 430, it means to process the image displayed by the display 50 so that it seems to "display a wide range, being shifted in a horizontal direction".

Similarly, "tilt" means to "shift the camera fixed to the tripod in vertical direction", but in the case of the eye-point shifting processing unit 430, it means to process the image displayed by the display 50 so that it seems to "display a wide range, being shifted in vertical direction". It should be noted that the shifting direction is not limited to vertical and horizontal directions and the eye-point can be shifted in an arbitrary direction at an arbitrary timing.

The zoom-in/out processing unit 440 performs the processing equivalent of zoom-in and zoom-out. Here, zoom-in is a kind of camera operation at the time of shooting and it means to "obtain an image which incessantly approaches to the object using a zoom lens with a fixed camera position".

Zoom-out, on the other hand, is to "obtain an image which incessantly becomes distant". In the case of the zoom-in/out processing unit 440, as is the case of the eye-point shifting processing unit 430, the image displayed by the display 50 is processed so that it seems to be "incessantly approaching or becoming distant with a fixed eye-point". It should be noted that the eye-point of the zoom-in/out processing unit 440 should not necessarily be fixed and it may shift during the process. Thus, by use of the zoom-in effect, it is possible to gather the user's attention, to display in detail, or to drum up one's interest, by focusing the line of vision. With the use of zoom-out, it is possible to display the surrounding of the image.

Next, the trimming processing unit 450 performs trimming on the image.

Here, a trimming, in general, is to "trim away the unnecessary part around the object when an original photo is enlarged". The trimming processing unit 450, however, displays an image by cutting out a part of the image in an arbitrary form. Here, an arbitrary image, text, and texture (pattern to be attached) can be displayed in the background of the trimmed object. For the data, the one held in the image holding unit 210 may be used or the display image generation unit 40 may newly generate the data or the data may be obtained via the external interface unit 10.

The slideshow unit 460 allows the display 50 to display the display image stored in the user-specified image holding unit 240.

The display 50, which includes a liquid crystal panel, displays an image with the resolution of 240×320 pixels.

The following describes the operation for inputting a still image (i.e., an original image) performed by the image display apparatus 1 constructed as above.

Figure 9:
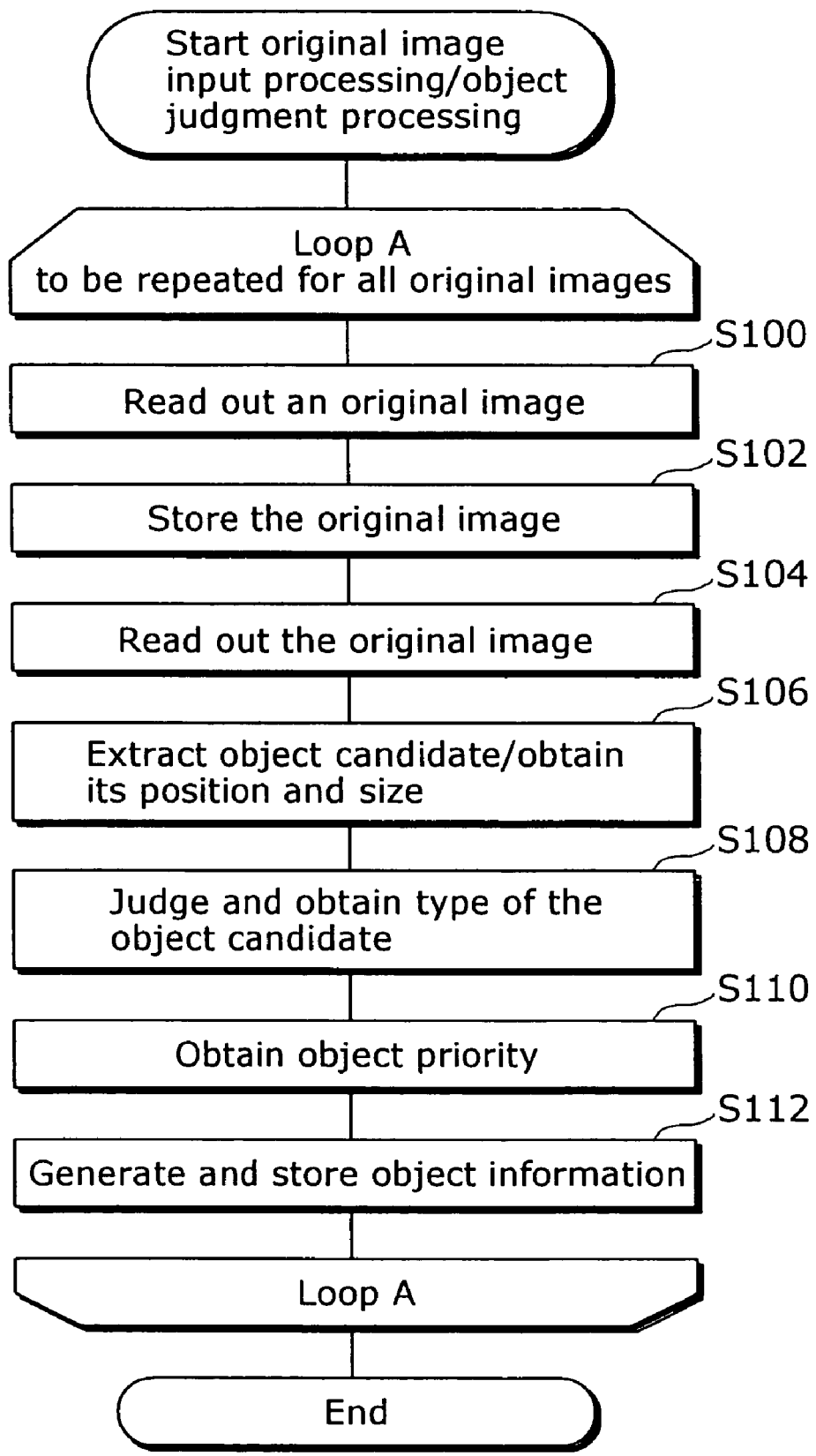
FIG. 9 is a flowchart showing the algorithm used by an external interface unit and an object judgment unit at the time of inputting an original image.

FIG. 9 is a flowchart showing the algorithm used for the input of an original image by the external interface unit 10 and the object judgment unit 30.

The image receiving unit 120 and the object judgment unit 30 repeat execution of the following processing for each of the original images stored in the storage medium 207 (Loop A).

The image receiving unit 120 firstly reads out the original image stored in the storage medium 207 onto the work memory within the present image display apparatus 1 (S100) and stores the read-out original image in the image holding unit 210 (S102). It should be noted that the format of storing the image data can be either a compression format as represented by JPEG format or non-compression format.

Next, the object candidate extraction unit 310 in the object judgment unit 30 reads out the original image stored in the image holding unit 210 onto the work memory (S104), extracts all the candidates for an object in the original image (S106), and obtains the position and size of the object candidate. After having obtained the position and size, the object type judgment unit 320 judges and obtains the type of the object candidate (S108). After having obtained the type of objects, the object priority setting unit 330 obtains an object priority which is set in advance depending on the type (S110).

Having obtained the object priority, the object judgment unit 30 generates object information by arranging the file name of the original image, the position, size and type of the object candidate and the object priority in a table format, and stores the generated is object information in the object information holding unit 220 (S112).

After the storage of all the original images in the image holding unit 210 and the storage of all the corresponding object information in the object information holding unit 220, the image receiving unit 120 and the object judgment unit 30 terminates the original image input processing and the object judgment processing.

In such processing as described above, all the original images stored in the storage medium 207 (see reference to FIG. 10) are sequentially stored in the image holding unit 210 and corresponding object information (see reference to FIG. 11) is generated for each of the original images and stored in the object information holding unit 220.

Figure 12:
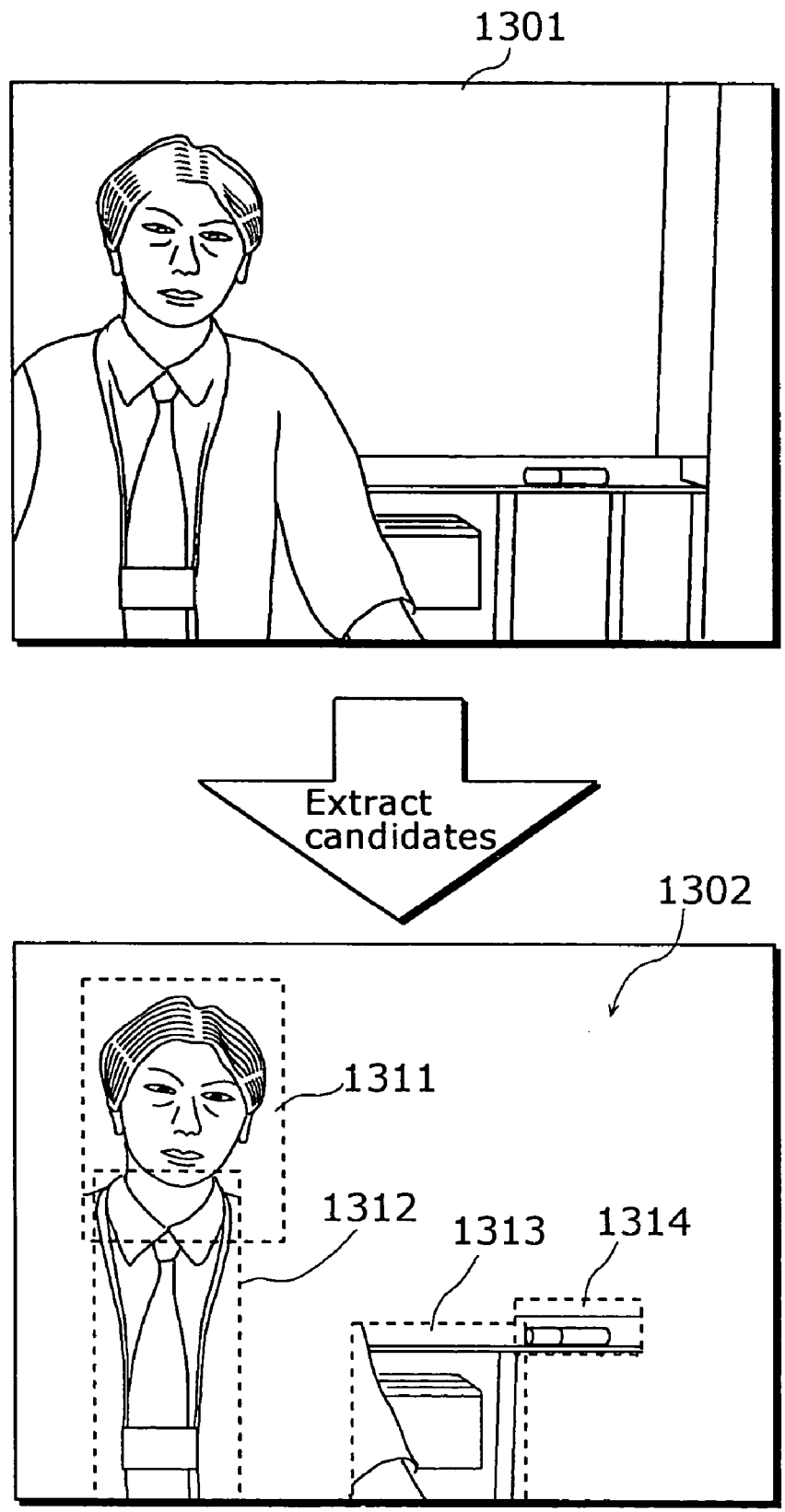
FIG. 12 shows an example of extracting an object candidate.

FIG. 12 shows an example of the judgment of an object.

The object candidate extraction unit 310 lets object templates, for example, "face", "tie", "apple" and "marker", act upon the original image 1301 as shown in FIG. 12 (an arbitrary existing technique such as a calculation of the correlativity between the templates can be used as a method). The object candidate extraction unit 310 then respectively extracts an object candidate 1311 as "an area appearing the most as a face", an object candidate 1312 as "an area appearing the most as a tie", an object candidate 1313 as "an area appearing the most as an apple", an object candidate 1314 as "an area appearing the most as a marker". These candidates 13119~1314 are a group of object candidates 1302.

It should be noted that the position and size of the object can be presented by the coordinates of the starting point and the ending point of one of the diagonal lines of the square that surrounds the extracted object. They may be presented by the coordinates of the center as well as the length of the radius of the circle that surrounds the extracted object. In this case, the size of the object is presented with surplus of space including the surrounding of the object, but it may be presented without the spatial margin.

The object candidate judgment unit 320 then decides the type of objects by performing object judgment on "whether the object is a face or not", "whether the object is a tie or not" and "whether the object is an apple or not". The method of judgment includes, for instance, the method based on a color distribution as explained above (e.g., the color is mostly nude in the case of a face) or the method based on a form (e.g., using a typical form of a tie). It should be noted that the type of the object candidate 1313 is determined as "uncertain", being judged as "not an apple" because it does not include "the color of an apple".

Moreover, the object priority judgment unit 330 holds in advance the object priority setting table 331 shown in FIG. 13 and obtains respectively, using the object priority setting table 331, the priority of the object "5", "3", "1" and "3" based on the correspondence between the respective areas for the candidates 1311~1314 and the types.

Thus, the object information (see FIG. 11) corresponding to the original image 1301 (file name: a001.jpg) shown in FIG. 12 is generated and stored in the object information holding unit 220.

It should be noted that in the object priority setting table 331 shown in FIG. 13, the types of objects such as "someone's face", "tie", "necklace", . . . , "apple", "orange", . . . "maker", "eraser", "uncertain" are already registered, but "figure (whole)" "figure (waist shot)", animals like "dog" and "cat", plants like "lemon", properties like "desk", "chair", "book", and "price tag", sign-boards with characters like "tourist guide map", "name of stations", "name of companies", or any kind of objects can be registered in the same way.

The priority for the objects "someone's face", "tie" and "necklace" are already set as "5", "3" and "3" however, the user can set it in order to reflect his/her own preferences.

In this way, the position of the object and other information are respectively obtained for all the original images to be displayed and it is possible to process the image by focusing on the object.

The following describes the operation for generating a thumbnail image, performed by the image display apparatus 1 constructed as described above.

Figure 14:
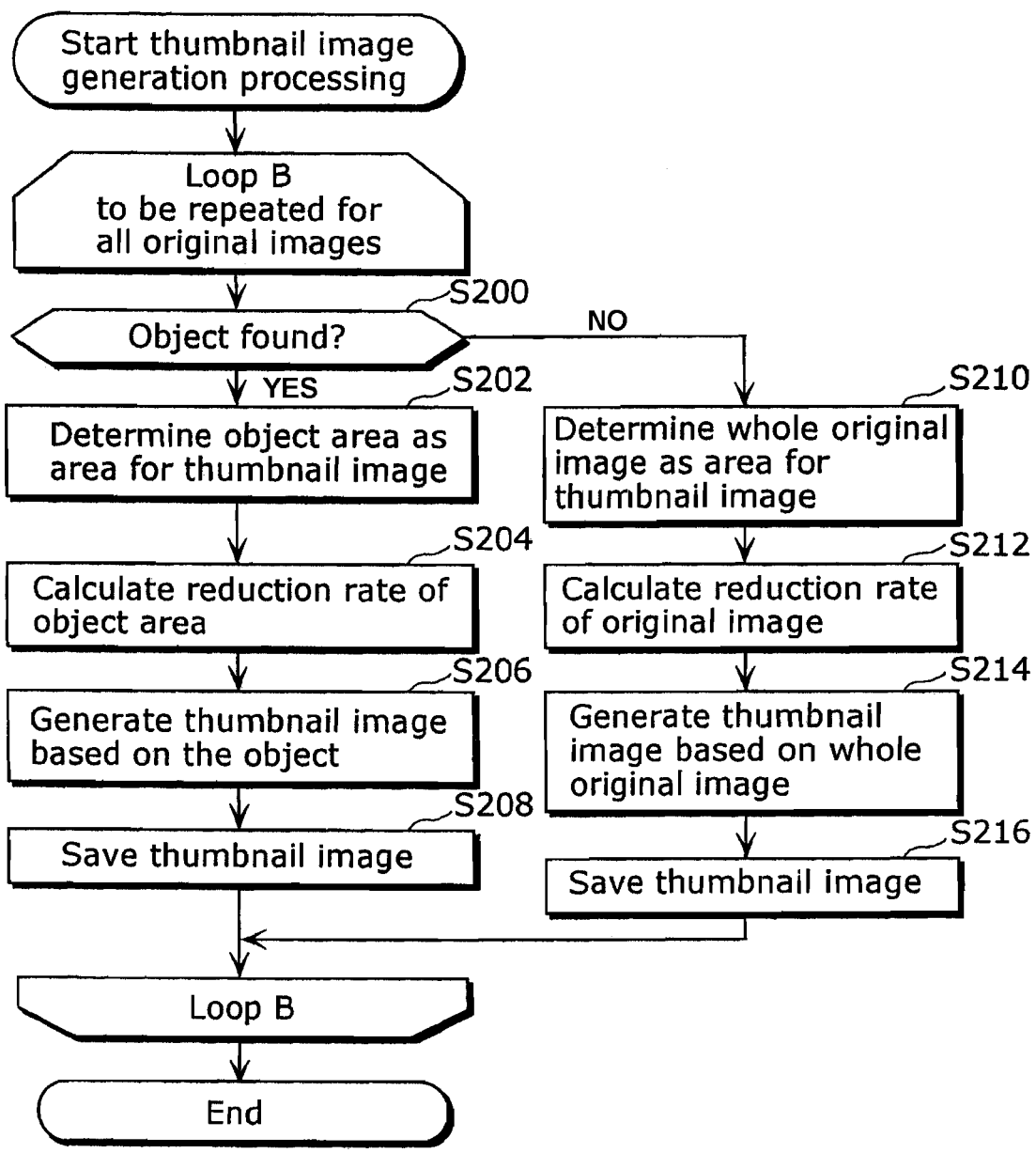
FIG. 14 is a flowchart showing the algorithm used by a thumbnail image generation processing unit in the display image generation unit for generating thumbnail images.

FIG. 14 is a flowchart showing the algorithm used by the display image generation unit 40 and the thumbnail image generation processing unit 410 for generating a thumbnail image.

It should be noted that the image display apparatus 1 is constructed in such way that one thumbnail image is formed with the resolution of 4800 (80×60) pixels in order to list up nine thumbnail images on the display 50.

The thumbnail image generation processing unit 410 repeats the execution of the following processing per original image for all the original images held in the image holding unit 210 (Loop B).

The thumbnail image generation processing unit 410 firstly refers to the corresponding object information and judges whether or not an object is found in the original image (S200). In the case where the object is found (Yes in S200), the thumbnail image generation processing unit 410 decides the area where the object is found to be an area for a thumbnail image (S202). It should be noted that in the case where plural objects are found, the area with high priority is determined as the area for a thumbnail image. After the determination of the area, the thumbnail image generation processing unit 410 calculates a reduction ratio of the object area based on the proportion between the number of pixels of the object area and that of the display 50 (S204). The thumbnail image generation processing unit 410 then generates a thumbnail image of the object by performing sizing based on the calculated proportion (S206) and saves the thumbnail image in the thumbnail image is holding unit 230 (S208).

On the other hand, in the case where it is judged that no object is found (No in S200), the thumbnail image generation processing unit 410 decides the whole original image to be a thumbnail image (S210), calculates a reduction ratio of the original image based on the proportion between the number of pixels of the whole original image and that of the display 50, generates a thumbnail image based on the whole original image by performing sizing based on the calculated proportion (S214) and saves the thumbnail image (S216).

After the generation of thumbnail image based on each of the original images stored in the image holding unit 210, the thumbnail image generation processing unit 410 terminates the processing of generating a thumbnail image.

Figure 15A:
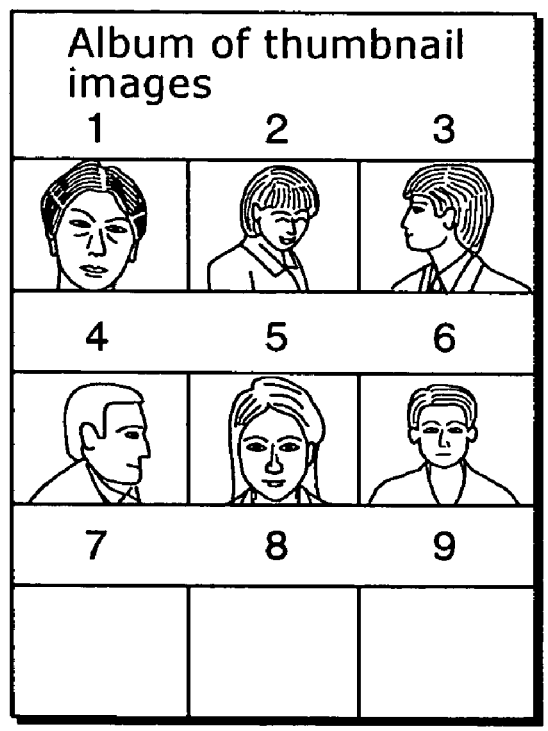
Figure 15B:
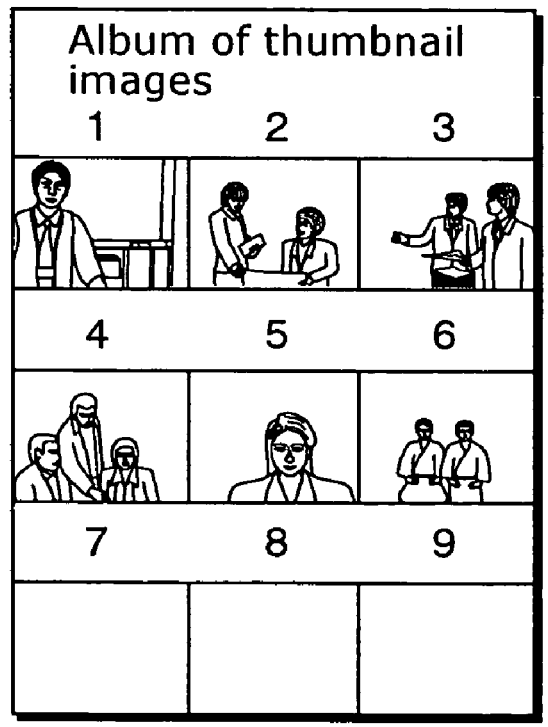
FIG. 15B shows an example of the listing of the thumbnail images performed by the conventional image display apparatus.

Here, FIGS. 15A and 15B show examples of listing up the thumbnail images.

FIG. 15A shows the case of listing up the thumbnail images focusing on the object. It is possible to present to the user clearly what is in the image by displaying the extracted objects as can be seen in the present example.

FIG. 15B shows the thumbnail images generated based on the respective whole original images in the same manner as in the conventional example. It is very difficult to recognize what is in the image because the size of each image is very small in the listing of such thumbnail images.

The following describes the display image generation processing.

Figure 16:
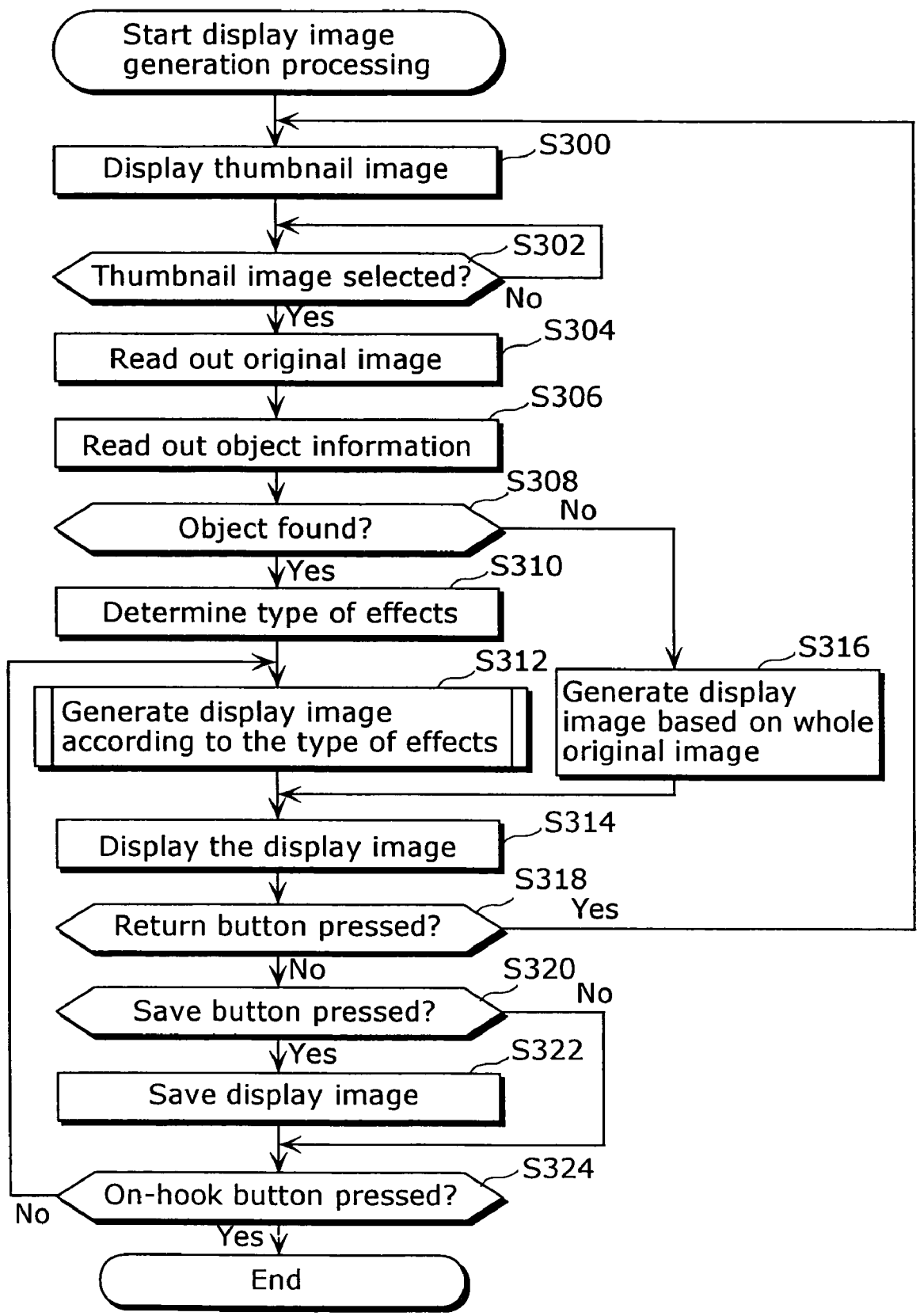
FIG. 16 is a flowchart showing the display image generation processing.

FIG. 16 is a flowchart showing the display image generation processing.

Firstly, the thumbnail image generation processing unit 410 in the display image generation unit 40 lists up the thumbnail images (S300) and waits for a thumbnail image to be selected (S302). The selection is operated by inputting the number assigned to the thumbnail image or by shifting a cursor key. Once the thumbnail image is selected, the display image generation unit 40 reads out the corresponding original image (S304), and then, the object information (S306), and judges whether or not an object is found in the original image (S308).

In the case where an object is found (Yes in S308), the display image generation unit 40 decides the type of the object (S310) and generates the display image according to the type of visual effects (S312). The generated display image is transferred to the display 50 via the display image holding unit 250 and displayed by the display 50 (S314).

After the transfer to the display 50, the display image generation unit 40 judges whether or not a return button (F1 button) is pressed (S318). In the case where the return button is pressed (Yes in S318), the display image generation unit 40 returns to Step S300 considering that the viewing of the image is terminated and waits for a thumbnail image to be selected. In this way, it is possible for the user to sequentially view each display image corresponding to each of the thumbnail images shown in FIG. 15A.

In the case where the return button is not pressed (No in S318), the display image generation unit 40 judges whether or not a save button is pressed (S320). In the case where the save button is pressed (Yes in S320), the display image is saved in the user-specified image holding unit 240 (S322). In the case where the save button is not pressed (No in S320), the display image generation unit 40 proceeds to Step S324. Thus, it is possible for the user to store and display only the favorite images in the user-specified image holding unit 240.

In Step S324, the display image generation unit 40 judges whether or not an on-hook button is pressed (S324). In the case where the on-hook button is not pressed (No in S324), the display is image generation unit 40 returns to Step S312 considering that the user is still viewing the display image and generates a display image.

In the case where the on-hook button is pressed (Yes in S324), the display image generation unit 40 terminates the processing of generating display images considering that the user has finished viewing display images.

Figure 17:
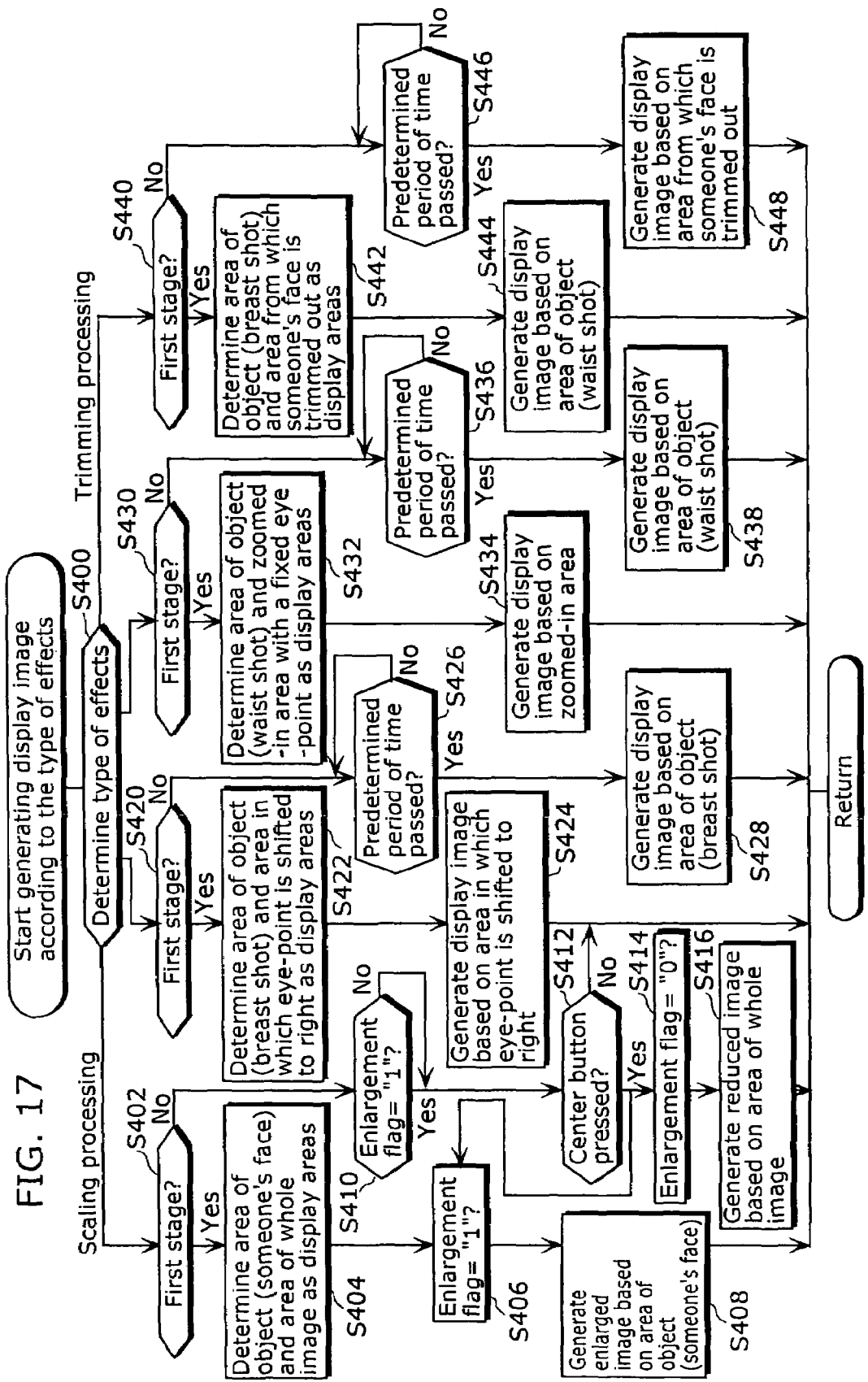
FIG. 17 is a flowchart showing a subroutine of the display image generation processing in accordance with the type of visual is effects.

FIG. 17 is a flowchart showing a subroutine of the processing of generating a display image according to the type of visual effects.

Firstly, the display image generation unit 40 decides the type of visual effects (S400). The type is determined by selecting at random from among the scaling, eye-point shifting, zoom-in/out and trimming processing.

In the case where the scaling processing is selected, the scaling processing 420 firstly judges whether or not it is an initial stage in the display image generation processing (S402). In the case where it is the initial stage (Yes in S402), the scaling processing unit 420 determines the area of the object (someone's face) in the original image and the area of the whole image as display areas (S404), sets an enlargement flag as "1" (S406), generates an enlarged image based on the area of the object (someone's face) (S408) and returns to the main routine shown in FIG. 16.

Figure 18A:

The enlarged image is generated by calculating a reduction ratio of the original image based on the proportion between the number of pixels in the area of the object (someone's face) in the original image and that of the display 50, and by performing sizing based on the calculated proportion. In this way, only the area of the object (someone's face) is displayed by the display 50, as shown in FIG. 18A.

On the other hand, in the case where it is not the initial stage in the display image generation processing (No in S402), the scaling processing unit 420 sequentially judges whether or not the enlargement flag indicates "1" (S410) and whether or not a center button is pressed (S412). As a result of the judgment, when the enlargement flag indicates "1" (Yes in S410) and the center button is pressed (Yes in S412), the scaling processing unit 420 sets the enlargement flag as "0" (S414) considering that the viewing of the enlarged image is terminated, generates a reduced image based on the area of the whole image (S416), and returns to the main routine shown in FIG. 16.

Figure 18B:
FIG. 18B shows a whole image.

The reduced image is generated by calculating a reduction ratio of the original image based on the proportion between the number of pixels in the area of the whole original image and that of the display 50, and by performing sizing based on the calculated proportion. In this way, the whole image is displayed by the display 50, as shown in FIG. 18B.

In the case where the enlargement flag indicates "0" (No in S410) and the center button is pressed (Yes in S412) as a result of the judgment, the scaling processing unit 420 returns to S414 considering that the viewing of the reduced image is terminated, sets the enlargement flag as "1" (S406) and generates an enlarged image based on the area of the object (someone's face) (S408).

In the case where the center button is not pressed (No in S412), the scaling processing unit 420 returns to the main routine shown in FIG. 16 considering that the user is still viewing the enlarged image or the reduced image.

With such enlarged image, it is possible to display the object larger or in detail, and also, to reduce the visual degradation of the image quality, improve the visibility of the image and to lighten the user's operational burdens.

In the case where the selected visual effect is eye-point shifting in Step S400, the eye-point shifting processing unit 430 judges whether or not it is an initial stage in the display image generation processing (S420). In the case where it is the initial stage in the display image generation processing (Yes in S420), the eye-point shifting processing unit 430 determines the area of the object (breast shot) in the original image and the area in which the eye-point is shifted towards right, as display areas (S422), generates a display image based on the area in which the eye-point is shifted towards right (S424) and returns to the main routine shown in FIG. 16.

Figure 19A:

The display image is generated by calculating an enlargement ratio or a reduction ratio of the area of the object based on the proportion between the number of pixels in the area in which the eye-point is shifted towards right in the original image and that of the display 50, and by performing complementation or sizing based on the calculated proportion. In this way, half of the object (breast shot) and the area surrounding it are displayed by the display 50, as shown in FIG. 19A.

On the other hand, in the case where it is not the initial stage in the display image generation processing (No in S420), the eye-point shifting processing unit 430 waits for a predetermined period of time (e.g., 2 seconds) to pass (S426). After the elapse of the predetermined time (Yes in S426), the eye-point shifting processing unit 430 considers that the viewing of the display image in the area in which the eye-point is shifted towards right is terminated, generates a display image based on the area of the object (breast shot) (S428) and returns to the main routine shown in FIG. 16.

Figure 19B:
FIG. 19B shows the display image after the eye-point is shifted.

The display image is generated by calculating the enlargement ratio/reduction ratio of the object based on the proportion between the number of pixels in the area of the object in the original image and that of the display 50, and by performing complementation or sizing based on the calculated proportion. In this way, only the image of the object (breast shot) is displayed by is the display 50, as shown in FIG. 19B.

With such display image, it is possible to display the object larger in a wide range from the surrounding of the object to the object itself or display in detail as well as to reduce the visual degradation of the image quality, improve the visibility and reduce the user's operational burdens.

In the case where zoom-in/out is selected in Step S400, the zoom-in/out processing unit 440 firstly judges whether or not it is an initial stage in the display image generation processing (S430). In the case where it is (Yes in S430), the zoom-in/out processing unit 440 determines the area of the object (waist shot) in the original image and the area zoomed-in with a fixed eye-point, as display areas (S432), generates a display image based on the zoomed-in area (S434) and returns to the main routine shown in FIG. 16.

Figure 20A:

The zoomed-in image is generated by calculating the enlargement ratio/reduction ratio of the area of the object based on the proportion between the number of pixels in the zoomed-in area in the original image and that of the display 50, and by performing complementation and sizing based on the calculated proportion. In this way, the zoomed-up object (breast shot) with the eye-point fixed in the center of the image is displayed by the display 50, as shown in FIG. 20A.

On the other hand, in the case where it is not the initial stage in the display image generation processing (No in S430), the zoom-in/out processing unit 440 waits for a predetermined period of time (e.g., 2 seconds) to pass (S436). When the predetermined period of time passes (Yes in S436), the zoom-in/out processing unit 440 considers that the viewing of the zoomed-up image is terminated, generates a display image based on the area of the object (breast shot) (S438) and returns to the main routine shown in FIG. 16.

Figure 20B:
FIG. 20B shows the display image when the image is zoomed-out.

The zoomed-out image is generated by calculating the enlargement ratio/reduction ratio of the area of the object based on the proportion between the number of pixels in the zoomed-out image in the original image and that of the display 50, and performing complementation and sizing based on the calculated proportion. In this way, the object (waist shot) and the surrounding of the object are displayed by the display 50, as shown in FIG. 20B.

With such a zoomed-in or zoomed-out image, it is possible to display the object larger or in detail by approaching the object, and also, to display clearly the wide area for the surrounding by becoming distant from the object. It is also possible to reduce the visual degradation of the image quality, improve the visibility and reduce the user's operational burdens.

It should be noted that the eye-point of the zoom-in/out processing unit 440 shall not necessarily be fixed and it may shift during the process.

In the case where the decided effect is trimming processing in Step S400, the trimming processing unit 450 firstly judges whether or not it is the initial stage in the display image generation processing (S440). In the case where it is (Yes in S440), the trimming processing unit 450 decides the area of the object (breast shot) in the original image and the trimmed area of someone's face, as display areas (S442), generates a display image based on the area of the object (breast shot) (S444) and returns to the main routine shown in FIG. 16.

Figure 21A:

The display image is generated by calculating the enlargement ratio/reduction ratio of the area of the object based on the proportion between the number of pixels of the area of the object (breast shot) in the original image and that of the display 50, and by performing complementation or sizing based on the calculated proportion. In this way, the area of the object (breast shot) is displayed by the display 50, as shown in FIG. 21A.

On the other hand, in the case where it is not the initial stage in the display image generation processing (No in S440), the trimming processing unit 450 waits for a predetermined period of time (e.g., 2 seconds) to pass (S446). When the predetermined period of time is passed (Yes in S446), the trimming processing unit 450 considers that the viewing of the breast shot image is terminated, generates a display image by trimming out only the area of the object (someone's face) (S448) and returns to the main routine shown in FIG. 16.

Figure 21B:
FIG. 21B shows the display image after the trimming processing is operated.

The trimmed-out image is generated by cutting off the edges of the area of the object (someone's face) and painting the cut-off area in black. In this way, the image in which the object (someone's face) is trimmed out is displayed by the display 50, as shown in FIG. 21B.

With such trimmed-out image, it is possible to mask the unnecessary part of the image or to attach the comment made at the time of shooting. It is also possible to reduce the visual degradation of the image quality, improve the visibility and lighten the user's operational burdens.

It should be noted that an arbitrary image, text and texture (a pattern to be attached) can be displayed as a background of the trimmed-out object. For the data, the one stored in advance in the image holding unit 210 may be used or the display image generation unit 40 may newly generate the data or the data may be obtained via the external interface unit 10.

The following describes the processing executed by the slideshow unit 460.

FIG. 22 is a flowchart showing the processing executed by the slideshow unit 460.

The slideshow unit 460 repeats the execution of the following processing per display image for all the display images in the image holding unit 210 (Loop C).

The slideshow unit 460 reads out, from the user-specified image holding unit 240, the display image stored according to the user's specification (S500), lets the display 50 display the display image (S502) and waits for a predetermined period of time (e.g., 2 seconds) to pass (S504).

After the display of all the display images, each being displayed for a predetermined period of time, is terminated by repeating such processing, the slideshow unit 460 terminates the slideshow.

Generally, the images with improved visibility out of the user's favorite images are stored in the user-specified image holding unit 240.

Therefore, it is possible to reduce the visual degradation of the image quality, improve the visibility and lighten the user's operational burdens also in the case of displaying a slideshow.

Figure 23:
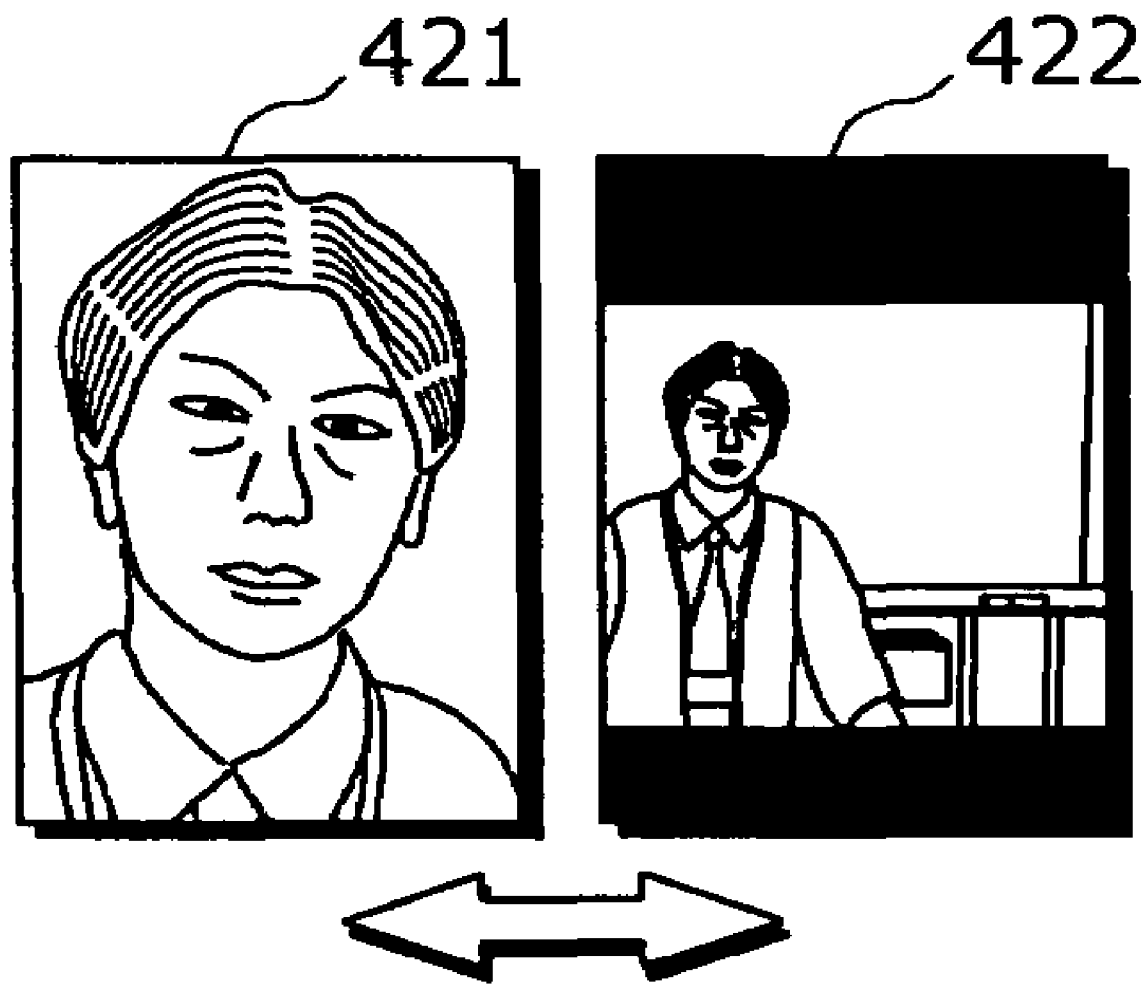
FIG. 23 shows the display image in the case where the enlarged image and the reduced image are displayed automatically in turn.

It should be noted that, in the first embodiment, when the center button is pressed in a case where an enlarged image is displayed, a reduced image is generated and displayed, while the center button is pressed in a case where a reduced image is displayed, an enlarged image is generated and displayed. The enlarged image 421 and the reduced image 422, however, can be automatically displayed in turn, as shown in FIG. 23. In this way, it is possible to reduce the user's operational burdens.

As illustrated in FIG. 24, in the first embodiment, only an image is displayed by the display 50, but the icons of "Return", "Whole" and "Save" can be displayed when the enlarged image 423 is displayed, and the icons of "Return", "Enlarge" and "Save" can be displayed when the reduced image 424 is displayed. Thus, it is possible to enhance the usability in using the GUI and lighten the user's operational burdens.

Figure 25:
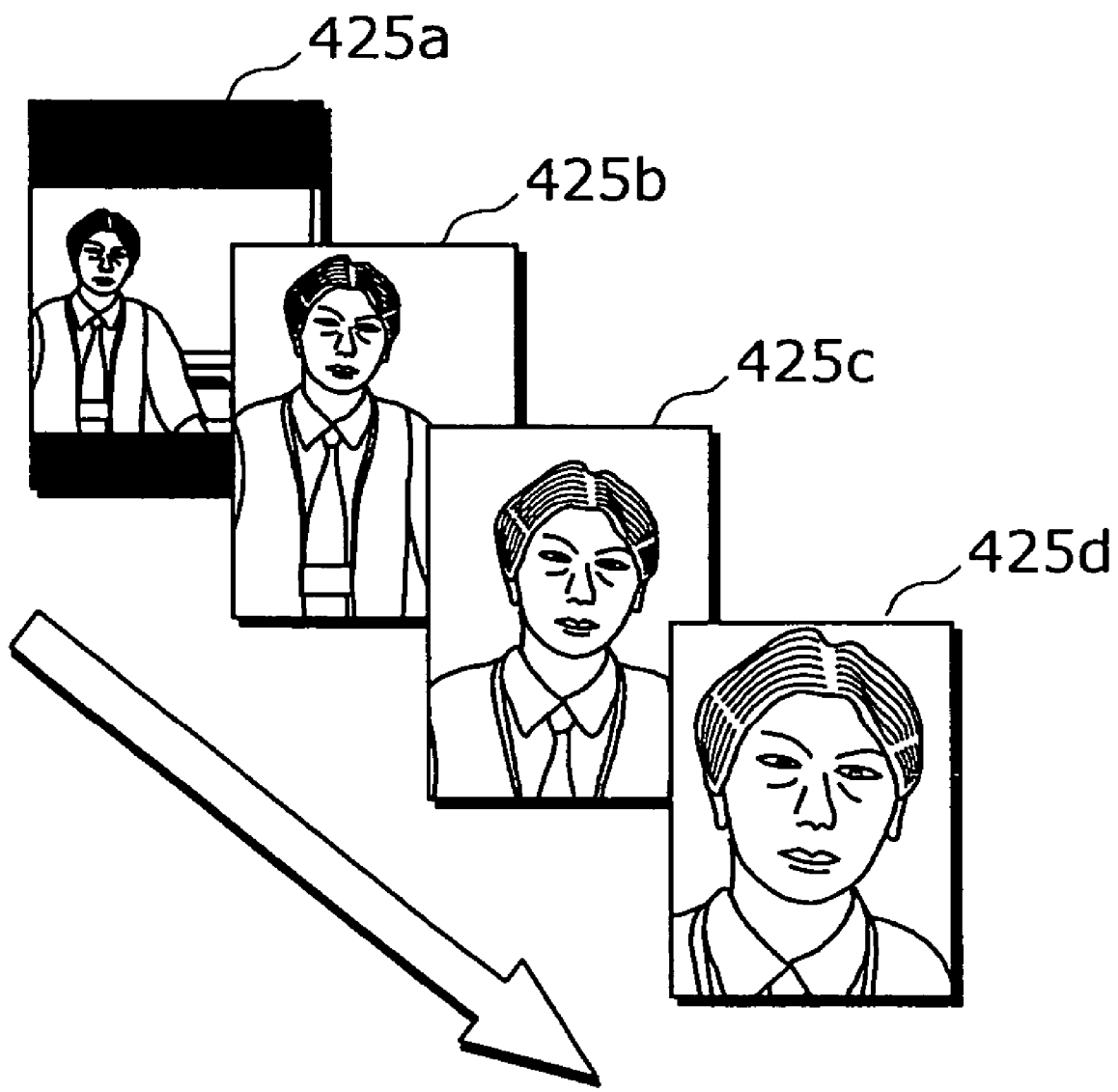
FIG. 25 shows an example of displaying the display image in the case of shifting smoothly from the whole image to the enlarged image of someone's face by gradually changing the scale.

Referring to FIG. 25, in the first embodiment, it is explained that two images, the whole image and the enlarged image of someone's face, are generated and displayed, but it is possible to shift smoothly from the whole image 425a to the enlarged image of someone's face 425d by gradually changing the scale. Thus, the visual effect can be improved.

Furthermore, in the first embodiment, the eye-point shifting processing unit 430 shifts an eye-point within a narrow range, but it is possible to display the image by further adding predetermined visual effects. The following is a concrete example of it.

Figure 26A:
FIGS. 26A and 26B are diagrams for explaining the processing of display while adding a predetermined visual effect.

Here, it is assumed that an original image is the shot image as shown in FIG. 26A. As explained above in the first embodiment, it is possible to automatically display the whole image or enlarged image of the object. However, the display method of gradually focusing on the ROI while grasping the whole image will be explained here.

Figure 26B:

Here, assume that an object (face) is extracted as an ROI from the shot image by the object judgment unit 30 and the area to be lastly displayed (final display area) is the area indicated by the square on the left in FIG. 26B. The area indicated by the square in FIG. 26A that is the most distant from the final display area and other objects are regarded as an initial display area. In this case, the size of the initial display area is as same as that of the final display area. A display area transition line (a spline curve that circulars the objects) can be drawn for the connection starting from the initial display area, the objects "marker", "uncertain", "tie", until the final display area. The display such as starting from the initial display area and gradually reaching to the final display area is also possible by shifting the eye-point along with the spline curve.

Figure 27:
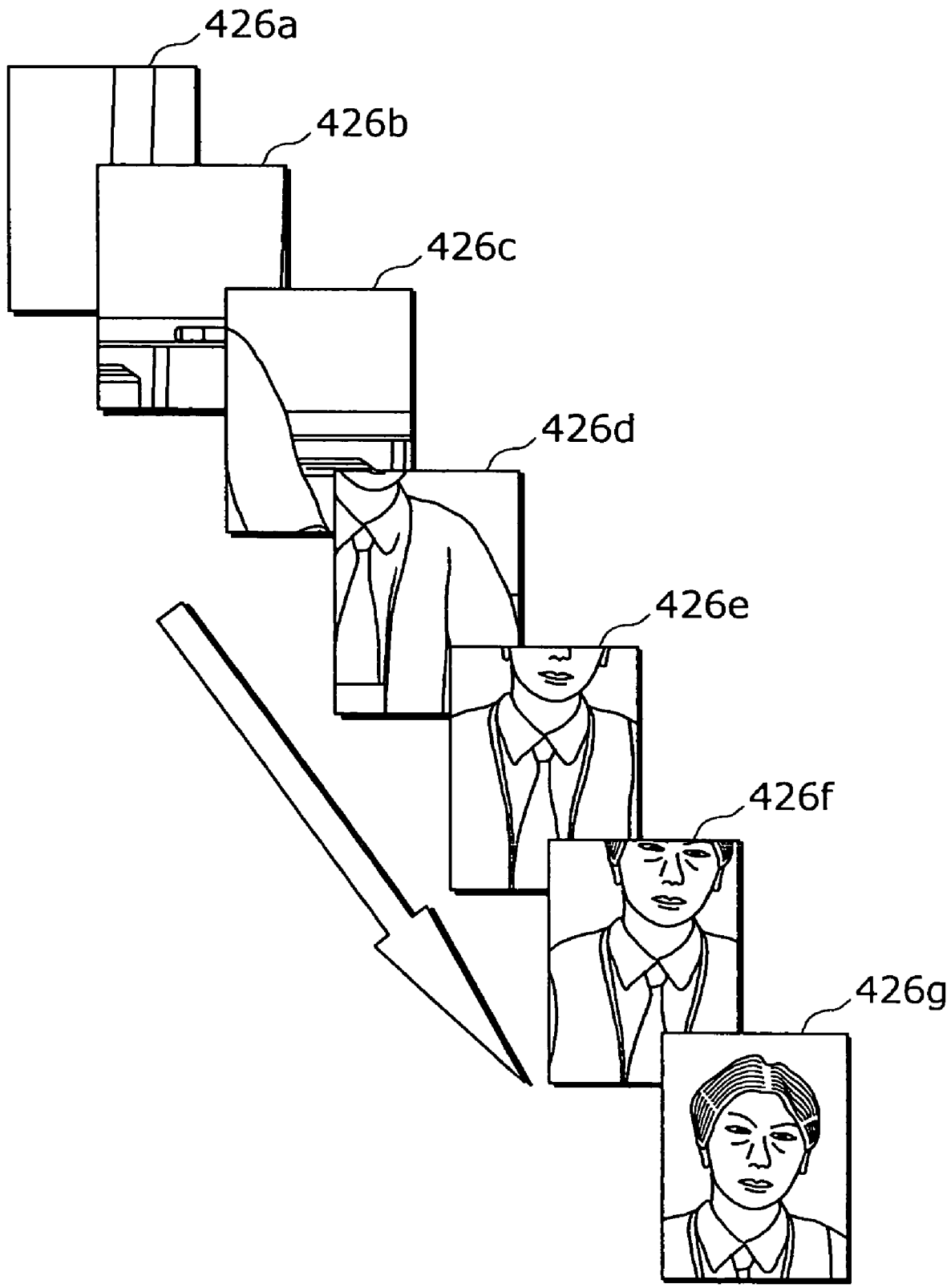
FIG. 27 shows an example of the display which shifts according to time in the case where the processing shown in FIGS. 26A and 26B is performed.

In this case, the image displayed by the display 50 transits, with basis on a time axis, from the initial display area image 426a to the final display area image 426g shown in FIG. 27. In this way, a panorama image starting from the initial display area and gradually reaching the final display area is displayed and the visual effect can is be greatly improved.

The position and size of the initial and final display area as well as the method of shifting the display area are surely not limited to those described above and they may be arbitrary.

Namely, arbitrary processing can be performed by combining the scaling processing unit 420, the eye-point shifting processing unit 430, the zoom-in/out processing unit 440 and the trimming processing unit 450. It is therefore possible to display both a whole image and an object by adding zoom-in/out processing while performing the combined processing with an arbitrary eye-point shifting and an arbitrary enlargement ratio on an arbitrarily formed area.

In the first embodiment, it is possible to generate the reduced display image data and the enlarged image data both independently and dependently based on the original image. In the case of generating the data independently, a better image quality can be obtained because the reduced image can be enlarged without newly performing enlargement processing on it. In the case of generating the data dependently, the inner memory can be reduced by especially using the reduced image as a basis.

A normal electronic appliance equipped with a display apparatus, such as a cell phone, a PDA, a game device, a digital camera, a video camera, a personal computer (PC), a portable PC and a car navigation system, can be used as an image display apparatus.

The present invention can be applied not only to the case of displaying a single image but also to the case of continuously displaying plural images like a slideshow (a short film). In this case, a sophisticated display as if the images are edited for a moving picture is possible by means of zooming up the ROI for enlarging the part at which the user desires to have a close look in addition to simply viewing the reduced images as a slideshow, when performing is a successive display for the images stored in a terminal such as a cell phone equipped with a camera or a digital camera whose CCD pixel number is larger than that of the display screen of the terminal and in which a number of image data are believed to be stored normally.

With the image display apparatus equipped with an external output, it is also possible to store a successive display (i.e., a display of the sophisticated slideshow-like replay as mentioned above) as a moving picture or as a data file in which still images and a method of replaying the images are described. It is also possible to output such display outside as a video output.

In addition, it is also possible to attach an arbitrary sound effect at the time of scaling or music at the time of replaying the images in a slideshow-like manner.

Second Embodiment

Next, the short film generation apparatus according to the second embodiment of the present invention will be explained with reference to FIGS. 28~36.

Figure 28:
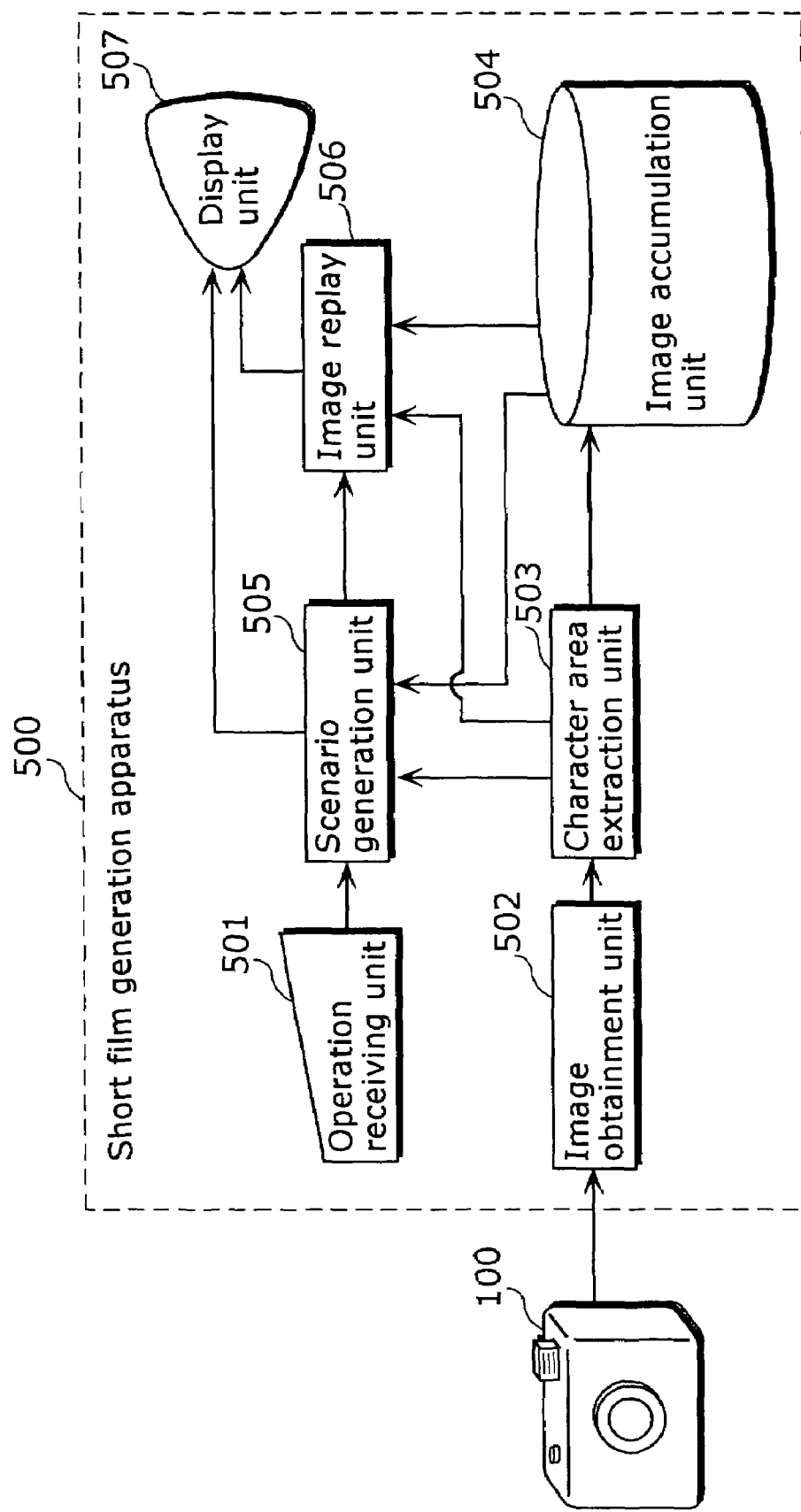
FIG. 28 is a block diagram showing the configuration of the short film generation apparatus according to a second embodiment.

FIG. 28 is a block diagram showing the functional configuration of the short film generation apparatus according to the second embodiment of the present invention.

The short film generation apparatus 500 is a computer apparatus for generating a scenario for a short film using one or more inputted still images and replaying the still images as a short film according to the scenario. The short film generation apparatus 500 consists of an operation receiving unit 501, an image receiving unit 502, a character area extraction unit 503, an image accumulation unit 504, a scenario generation unit 505, an image replay unit 506 and a display unit 507.

The operation receiving unit 501 is an input apparatus such as a keyboard and a mouse for receiving the user's operational input, is for instance, an instruction to read in still image data or a selection of still images.

The image receiving unit 502 is a processing unit for reading, into the apparatus, the still image data in JPEG compression format shot by a digital camera 100 and can be realized with an interface such as a Universal Serial Bus (USB) and an Institute of Electrical and Electronic Engineers (IEEE) 1394.

The character area extraction unit 503 is a processing unit for judging whether or not the still image that is read into the apparatus includes a square character area, and extracting character area information related to the character area in the case where the character area is included in the still image. Such a character area extraction unit 503 can be realized with an Optical Character Reader (OCR) which employs a pattern matching method and an edge detection method. Here, the character area information includes a position of the character area in the still image, form, size and color of the character area. The character area extraction unit 503 holds the extracted character area information in a memory within the apparatus.

The image accumulation unit 504 is a storage medium such as a hard disk for accumulating the still image data in JPEG compression format shot by the digital camera 100.

The scenario generation unit 505 is a processing unit for obtaining, from the operational input unit 501, the result of selecting the image received from the user, deciding a replay order of the selected images and the visual effect, and generating a scenario that is replay information. Such scenario generation unit 505 can be realized with a CPU or a memory.

The image replay unit 506 is a processing unit that repeats the following operation: reading out the still image from the image accumulation unit 504 according to the scenario generated by the scenario generation unit 505; and replaying the image at a speed of 15 frames/second while applying the effect specified in the scenario. Such image replay unit 506 can be realized with a CPU or a memory.

The display unit 507 can be a CRT display or a liquid crystal display for displaying a user interface screen or an image under the control of the scenario generation unit 505 and the image replay unit 506.

The following describes in detail the operation performed by each of the units in the short film generation apparatus 500 constructed as described above.

Figure 29:
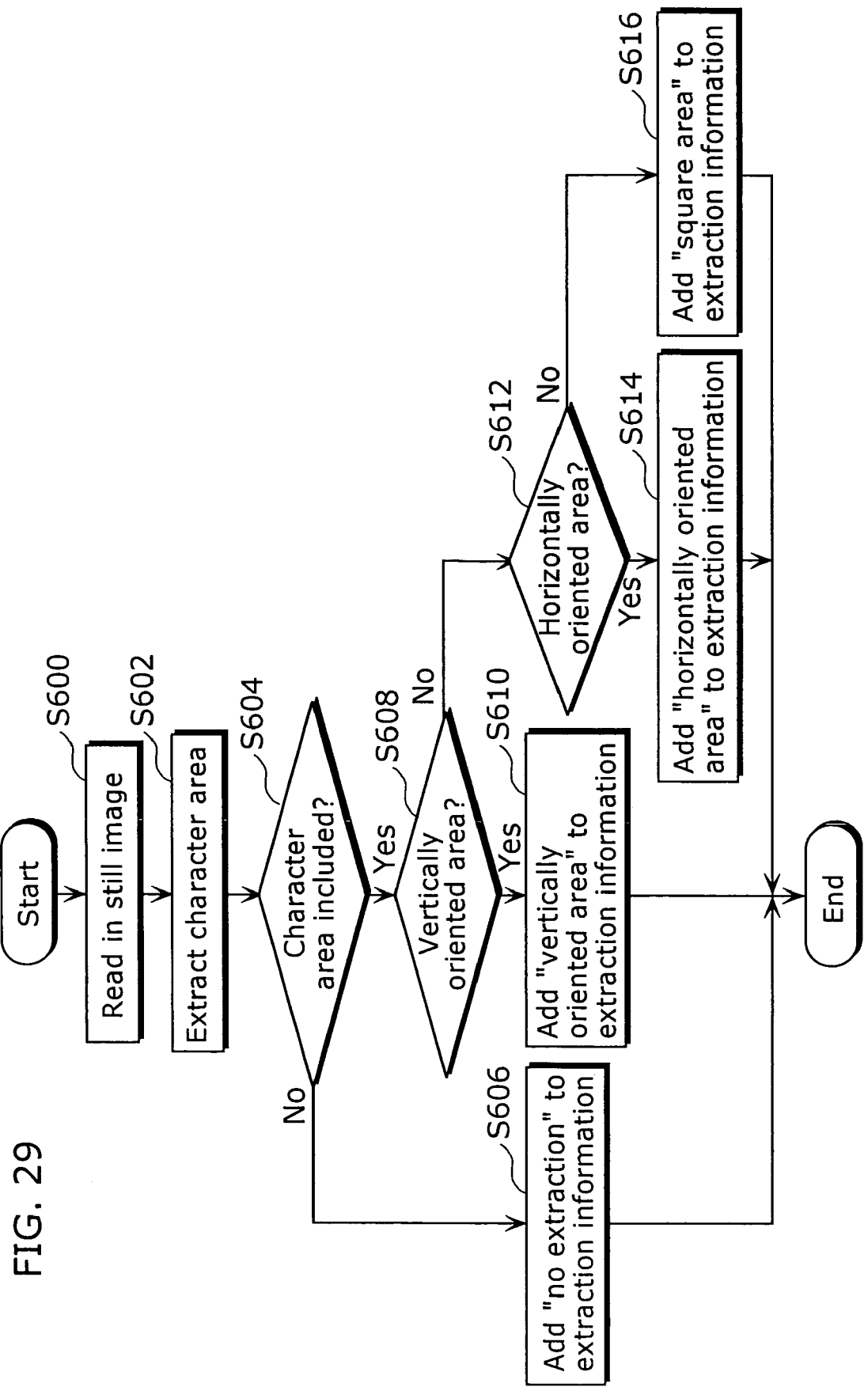
FIG. 29 is a flowchart showing the procedure in the processing performed by the scenario generation unit according to the second embodiment.

FIG. 29 is a flowchart showing the procedure used by the character area extraction unit 503.

The data of the still image shot by the user with the digital camera 100 is read directly into the short film generation apparatus 500 via the image receiving unit 502. (S600). Here, the character area extraction unit 503 generates a field for describing the file name of the still image data as well as the character area extraction unit 503 indicating the type of character area, and holds them in the memory.

Here, in the case where the still image data does not include the character area (No in S604), the character area extraction unit 503 adds "no extraction" to the field of the character area extraction information held in the memory, stores the still image data in the image accumulation unit 504 and terminates the processing (S606).

In the case where the still image data includes the character area (Yes in S604), the character area extraction unit 503 refers to the character area information and judges whether or not the character area included in the image is vertically oriented (a length-to-width ratio is 2 or more:1) (S608).

In the case where the character area is vertically oriented (Yes in S608), the character area extraction unit 503 adds "vertically oriented area" to the field of the character area extraction information held in the memory, stores the still image data in the image accumulation unit 504 and terminates the processing (S610).

In the case where the character area is not vertically oriented (No in S608), the character area extraction unit 503 refers to the character area information and judges whether or not the character area included in the image is horizontally oriented (a length-to-width ratio is 1:2 or more) (S612).

In the case where the character area is horizontally oriented (Yes in S612), the character area extraction unit 503 adds "horizontally oriented area" to the field of the character area extraction information held in the memory, stores the still image data into the image accumulation unit 504 and terminates the processing (S614).

In the case where the character area is not horizontally oriented (No in S612), namely, the character area is close to the form of a square, the character area extraction unit 503 adds "square area" to the field of the character area extraction information held in the memory, stores the still image data into the image accumulation unit 504 and terminates the processing (S616).

Figure 30:
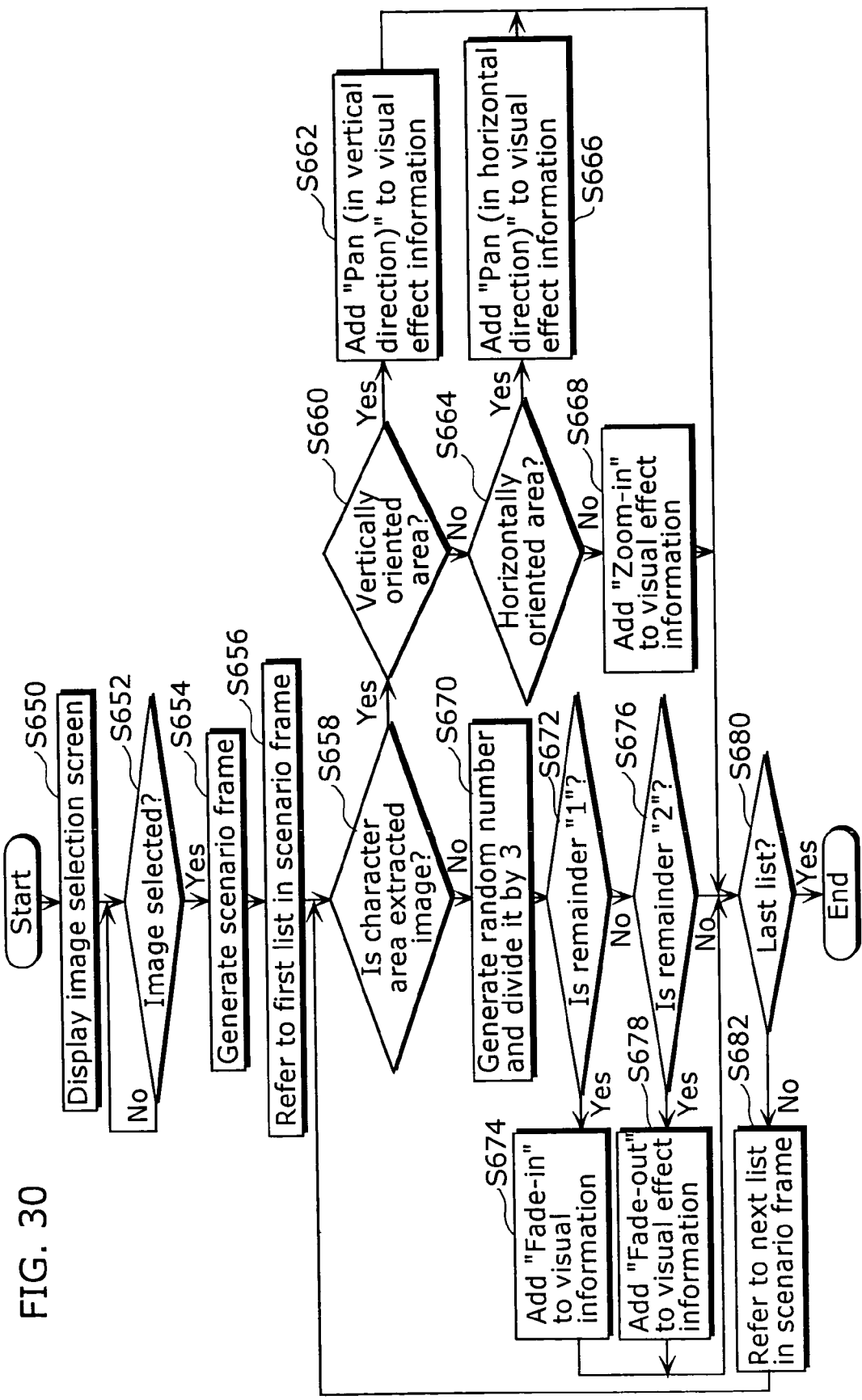
FIG. 30 is a flowchart showing the procedure in the processing performed by the scenario generation unit according to the second embodiment.

FIG. 30 is a flowchart showing the procedure used by the scenario generation unit 505.

When receiving the user's operation of pressing the short film generation button, the operation receiving unit 501 outputs, to the scenario generation unit 505, an instruction to generate a scenario.

After obtaining the instruction, the scenario generation unit 505 generates a screen (image selection screen) to urge the user to select plural images from the images stored in the image accumulation unit 504, and outputs it to the display unit 570 (S650).

When receiving the operation to select the still image to be replayed from among the images to be displayed by the display unit 507 (Yes in S652), the operation receiving unit 501 outputs to the scenario generation unit 505 the information on the selected image. The scenario generation unit 505 then examines the shooting time information of the selected image and generates a scenario frame in which replay information of each image is arranged in a shooting time order like a linked list (S654).

Figure 31:
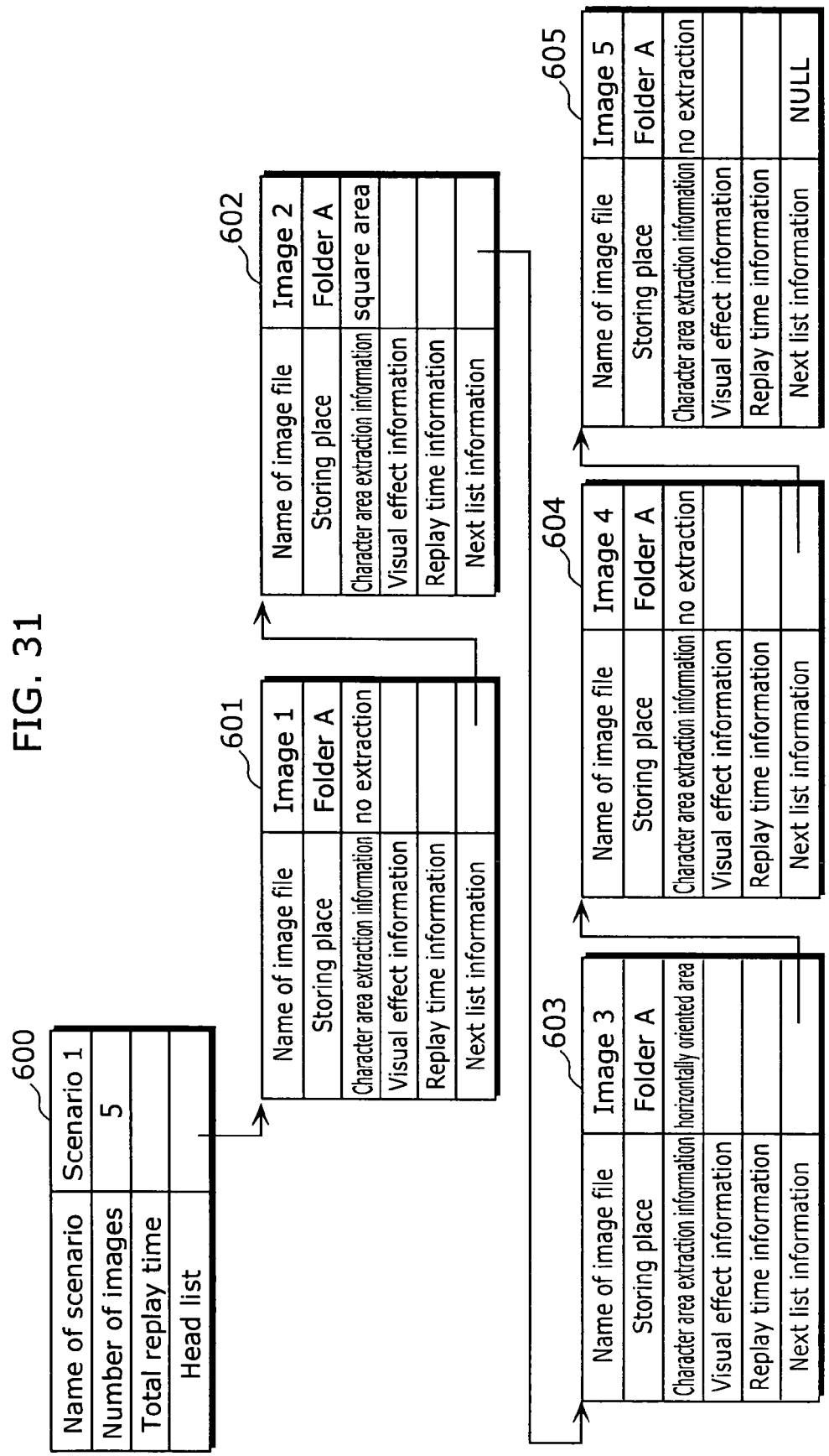
FIG. 31 shows the scenario frame according to the second embodiment.

FIG. 31 shows the scenario frame generated in the case where the operation receiving unit 501 receives from the user the selection of five still images (images 1, 2, 3, 4 and 5). It should be noted that the shooting time of the five images is assumed to be in line with the chronological order of images 1, 2, 3, 4 and 5.

As shown in FIG. 31, the scenario frame is like a linked list consisting of a scenario header 600, a scenario first list 601, a scenario second list 602, a scenario third list 603, a scenario fourth list 604 and a scenario fifth list 605.

The name of the scenario and a number of images are set in the scenario header 600 while the name of image file out of the replay information of each image, a storing place in the image accumulation unit 504 and the character area extraction information are set in each of the lists 601~605.

The total replay time in the scenario header 600 as well as visual effect information and replay time information of each of the lists 601~605 in the scenario frame, at this stage, are left blank.

Returning to the explanation of the procedure used by the scenario generation unit 505 with reference to FIG. 30, the scenario generation unit 505 refers to the scenario first list 601 in the generated scenario frame (S656) and determines the visual effect to be assigned for the image indicated in the scenario first list 601.

The scenario generation unit 505 examines the character area extraction information set in the scenario frame in order to determine the visual effect, and judges whether or not the image indicated in the scenario first list 601 (image 1) is the image with extracted character area (S658).

In the case where the character area of the image is extracted is (Yes in S658), the scenario generation unit 505 further judges whether or not the character area included in the image is vertically oriented by referring to the character area extraction information (S660).

In the case where the character area is vertically oriented (Yes in S660), the scenario generation unit 505 adds, to the visual effect information in the scenario first list 601, "Pan (in vertical direction)" to be applied on the character area (S662). It should be noted that, in the first embodiment, the visual effect for shifting the display area in vertical direction is called "tilt", however, it is called Pan effect in vertical direction in the second embodiment.

In the case where the character area is not vertically oriented (No in S660), the scenario generation unit 505 refers to the character area extraction information and judges whether or not the character area included in the image is horizontally oriented (S664).

In the case where the character area is horizontally oriented (Yes in S664), the scenario generation unit 505 adds, to the visual effect information in the scenario first list 601, "Pan (in horizontal direction)" to be applied to the character area (S666).

In the case where the character area is not horizontally oriented (No in S664), namely, the character area has a form of a square, the scenario generation unit 505 adds, to the visual effect in the scenario first list 601, "zoom-in" to be applied to the character area (S668).

In contrast, in the case where the image indicated in the scenario first list 601 is not the image with extracted character area (No in S658), the scenario generation unit 505 divides by 3 the random number generated using a random function (S670) and determines the visual effect to be assigned for the image by obtaining the remainder.

Namely, in the case where the remainder is "1" (Yes in S672), the scenario generation unit 505 adds, to the visual effect information in the scenario first list 601, "fade-in" to be applied to the image while in the case where the remainder is "2" (Yes in S676), adds "fade-out" to be applied to the image (S678). In the case where the remainder is "0" (No in S676), the scenario generation unit 505 adds, to the visual effect information in the scenario first list 601, a flag indicating that no visual effect is applied.

The scenario generation unit 505 further sets the replay time of the image and adds it to the replay time information in the scenario first list 601, when adding the visual effect to be assigned to the visual effect information in the scenario first list 601. The replay time of the image to which the Pan effect in vertical/horizontal direction or the zoom-in effect is applied is set as "3 seconds" while the replay time of the images other than that is set as "2 seconds".

After that, the scenario generation unit 505 judges whether or not the list to which the visual effect information and the replay time information are added is the last list (S680). In the case where it is the last list, (Yes in S680), the operation of the scenario generation is terminated, and in the case where it is not (No in S680), the scenario generation unit 505 refers to the next list in the scenario frame (S682) and repeats the operation of determining the visual effect for the image or the character area included in the image.

Figure 32:
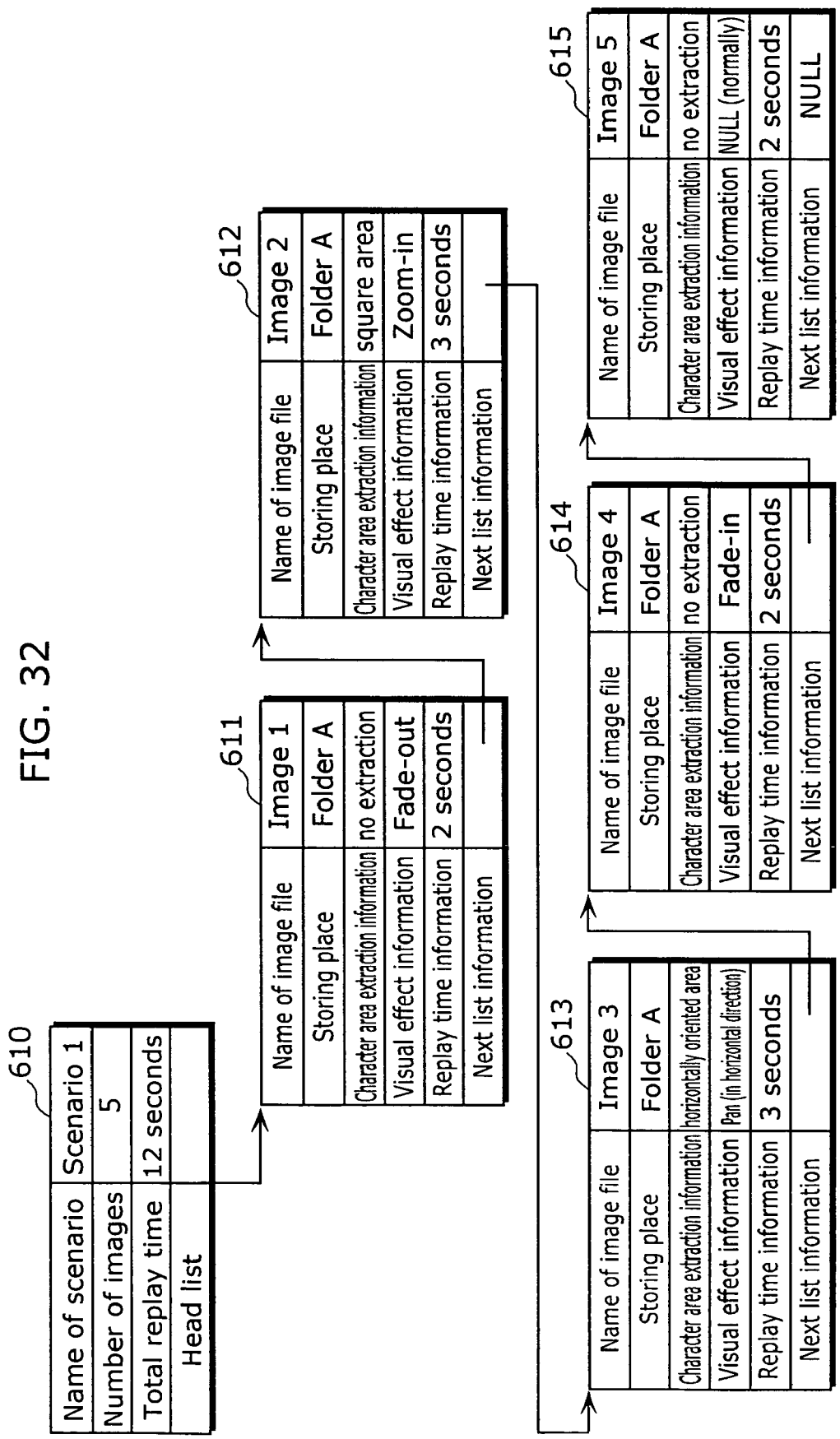
FIG. 32 shows the completed scenario according to the second embodiment.

In this way, the scenario generation unit 505 repeats the operation for assigning the visual effect from the head image (image 1) to the last image (image 5) in replay order so that the scenario shown in FIG. 32 is completed.

FIG. 32 shows the completed scenario.

In the completed scenario, the information indicating "12 seconds" as the total replay time is described in the scenario header 610 while the visual effect information for assigning the fade-out effect and the replay time information indicating "2 seconds" are described in the scenario first list 611 in which the replay information of the image 1 is described. Similarly, the visual effect information to be assigned respectively and the replay time information are described in the lists 611~615 in which the replay information of each image is respectively described.

Namely, according to the completed scenario, the images 1, 2, 3, 4 and 5 are replayed in the following order (and the visual effect is respectively applied thereto): the fade-out effect is applied to the image 1; the zoom-in effect to the character area for the image 2; the Pan effect in horizontal direction to the character area for the image 3; the fade-in effect to the image 4 while no visual effect is to be applied on the image 5. It is also indicated that the replay time for the respective images is as follows: 2, 3, 3, 2 and 2 (12 seconds in total).

Figure 33:
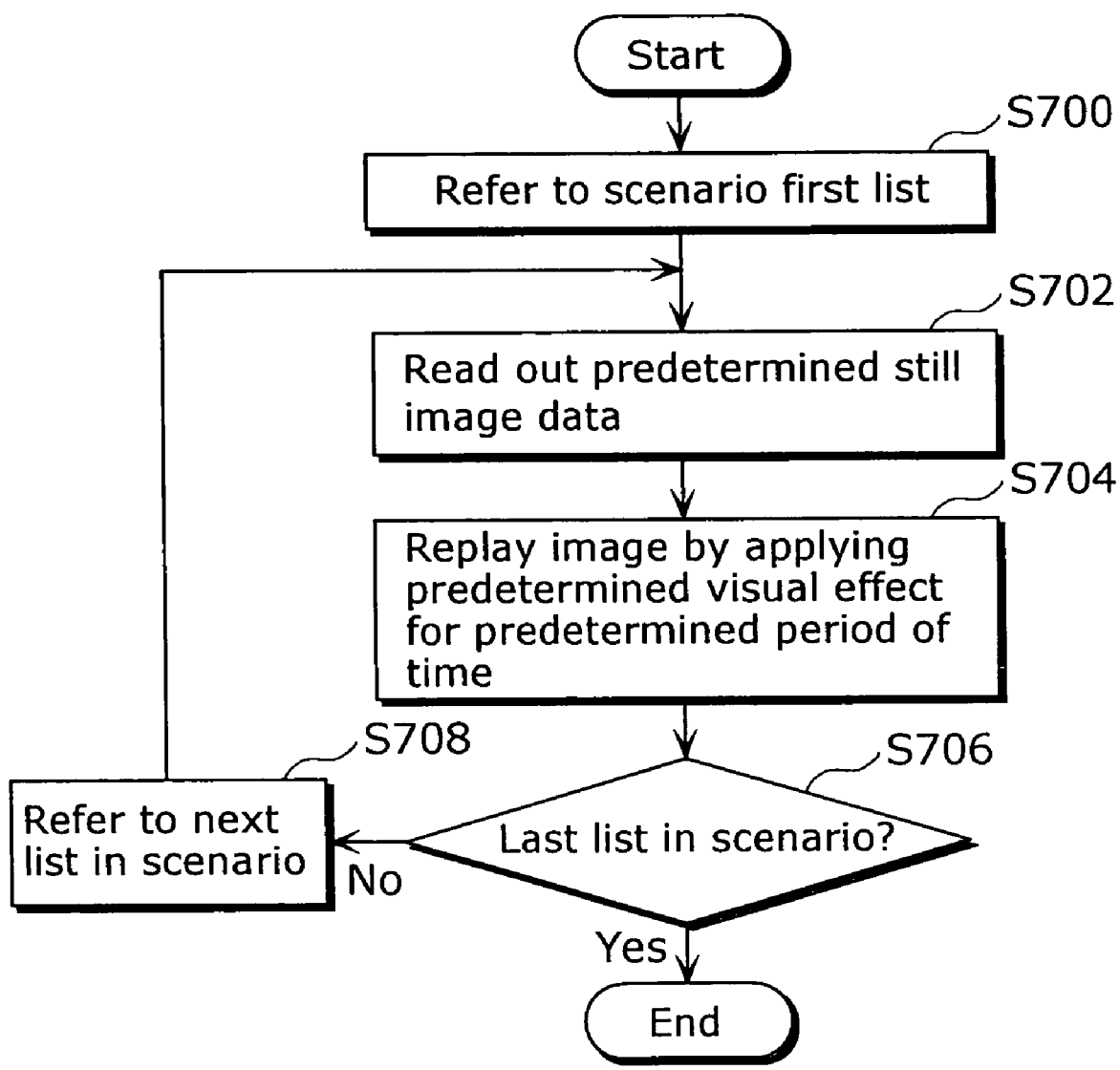
FIG. 33 is a flowchart showing the procedure in the processing performed by the image replay unit according to the second embodiment.

FIG. 33 is a flowchart showing the procedure used by the image replay unit 506 for replaying the images using the scenario thus generated.

The image replay unit 506 firstly receives the address information of the scenario generated by the scenario generation unit 505, refers to the scenario first list (S700) and obtains the replay information of the image (image 1) stored in the scenario first list, namely, the image file name, the storing place in the image accumulation unit 504, the character area extraction information, the visual effect information, the replay time information and the information on the next list.

The image replay unit 506 then reads out, from the storing place in the image accumulation unit 504, the still image data in compression format that corresponds to the image file name (S702).

After decompressing the read-out still image data, the image replay unit 506, by applying simultaneously the visual effect indicated in the visual effect information (i.e., fade-out effect) and managing time based on the obtained replay time information (i.e., the number of frames), replays the image so that the display unit is 507 outputs it for display (S704).

After the replay of the image, the image replay unit 506 refers to the next list information obtained and judges whether or not the list is the last one in the scenario (S706).

In the case where the list is not the last one (No in S706), the image replay unit 506 refers to the next list in the scenario based on the next list information (S708), obtains the replay information of the next image (image 2), and repeats the above processing until the replay of the last image (image 5) terminates.

In the case where the list is not the last one in the scenario (Yes in S706), namely, the next list information indicates "NULL", the image replay unit 506 terminates the replay of the image.

Here, the visual effect for the character area included in the image will be explained with reference to FIG. 34.

Figure 34:
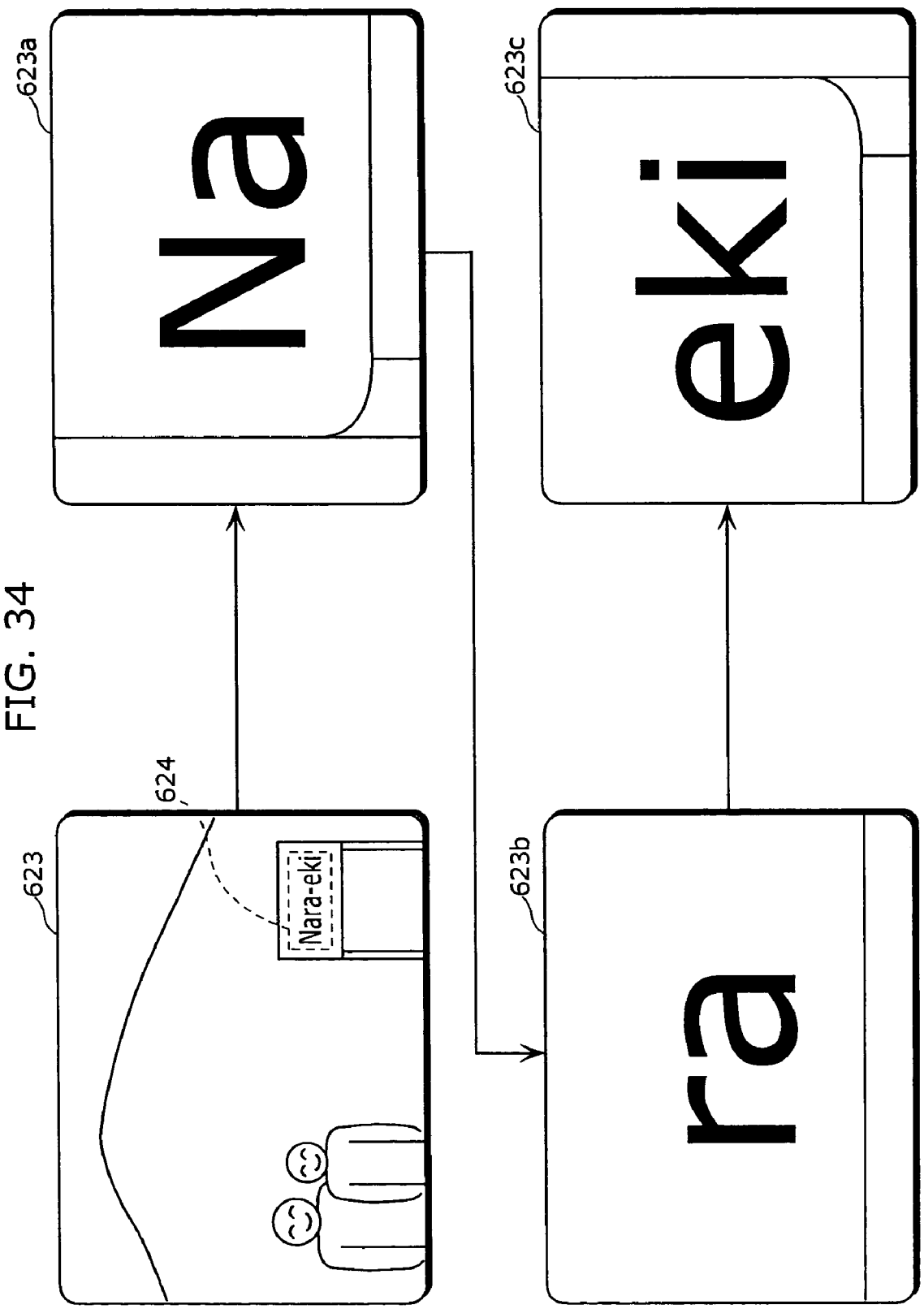
FIG. 34 shows a first example of the screen display performed by the short film generation apparatus according to the second embodiment.

FIG. 34 shows the first example of the screen display performed by the short film generation apparatus 500.

Here, the case in which the Pan effect is applied in horizontal direction to the character area included in the image will be explained.

Firstly, the image replay unit 506 in the short film generation apparatus 500 lets the display unit 507 output the first display image example 623 for display. As shown in FIG. 34, the first character area 624 of the horizontally oriented area is included in the first display image example 623 and the Pan effect is applied in horizontal direction to the first character area 624.

The image replay unit 506 in the short film generation apparatus 500 then magnifies the first character area 624 included in the first display image example 623 and outputs the second display image example 623*a* on the display unit 507 for display. The image replay unit 506 then shifts the part to be displayed in the first character area 624 to the right, and displays sequentially the third display image example 623*b* and the fourth display image example 623*c* on the display unit 507. After the display of the fourth display image example 623*c*, the image replay unit 506 terminates the replay of the image and proceeds to the processing for the next image.

Thus, it is possible to emphasize the characteristics (e.g., location of shooting) of the image by performing such visual effect to the character area included in the image and give a strong impact to the user who looks at a short film.

It should be noted that the visual effect applied by the scenario generation unit 505 to the character area included in the image is not restricted to the Pan effect in vertical and horizontal direction and a zoom-in effect. For example, a focus-in effect of focusing on the character area after the display of the whole image, a focus-out effect, in reverse, of displaying the whole image after the focus on the character area, a slide-in effect of dividing the character area into several parts and displaying each part of the character area by sliding it sequentially from the exterior of the display screen, and a slide-out effect of removing each part by sliding it out of the display screen.

The case in which the focus-out effect is applied to the character area included in the image will be explained with reference to FIG. 35.

Figure 35:
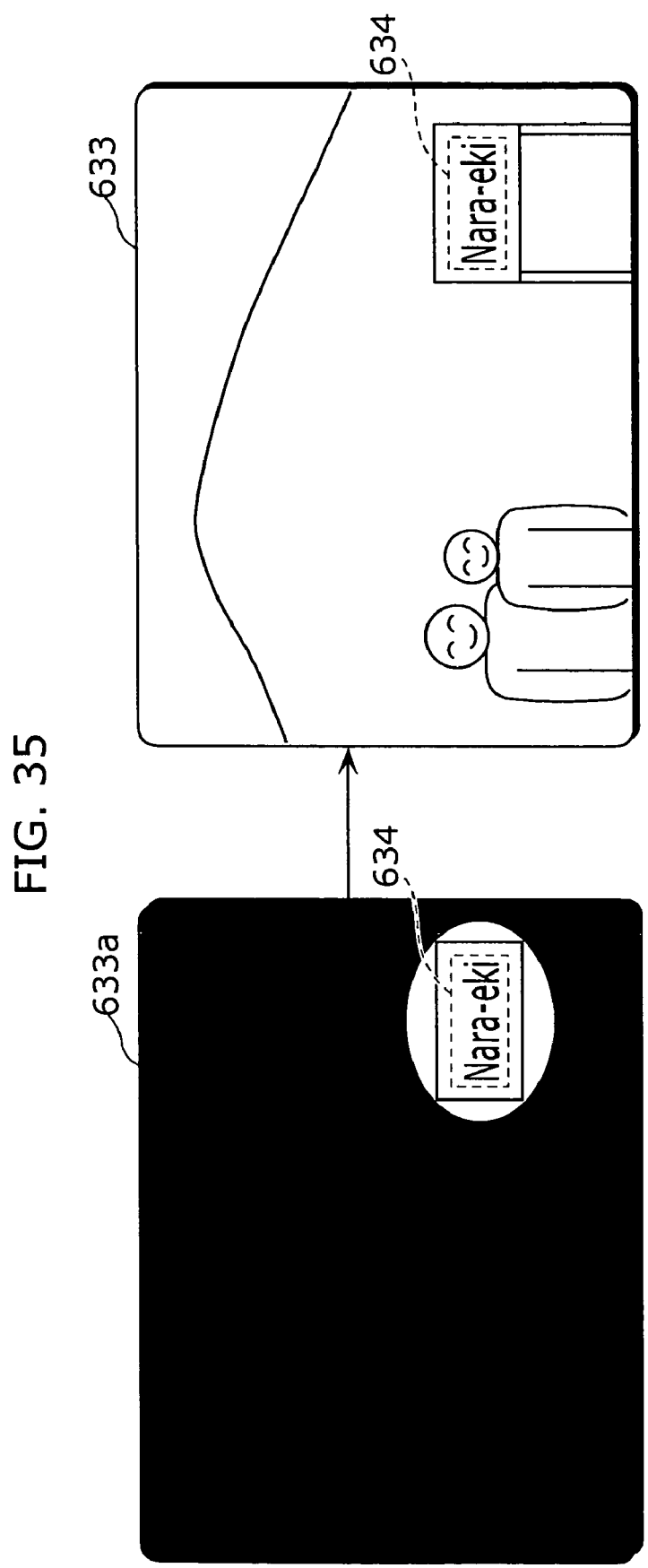
FIG. 35 shows a second example of the screen display performed by the short film generation apparatus according to the second embodiment.

FIG. 35 shows the second example of the image display performed by the short film generation apparatus 500.

Firstly, the image replay unit 506 in the short film generation apparatus 500 lets the display unit 507 output the second display image example 633*a* for display. As shown in FIG. 35, the second display image example 633*a* includes the first character area 634 that is a vertically oriented area while the focus-out effect is applied to the first character area 634 that is a horizontally oriented area.

Next, the image replay unit 506 in the short film generation apparatus 500 enlarges the focus that is made on the first character area 634, lets the display unit 507 outputs for display the first display image example 633 indicating the whole image, and after that, terminates the replay of the image and proceeds to the replay of the next image.

It should be noted that the focus-in effect is applied by reversing a direction of the arrow indicating the transition of the image display shown in the FIG. 35, namely, by displaying the second display image example 633*a* with a continuous focus on the first character area 634 after the display of the first display image example 633.

The case in which the slide-in effect is applied to the character area included in the image will be explained with reference to FIG. 36.

Figure 36:
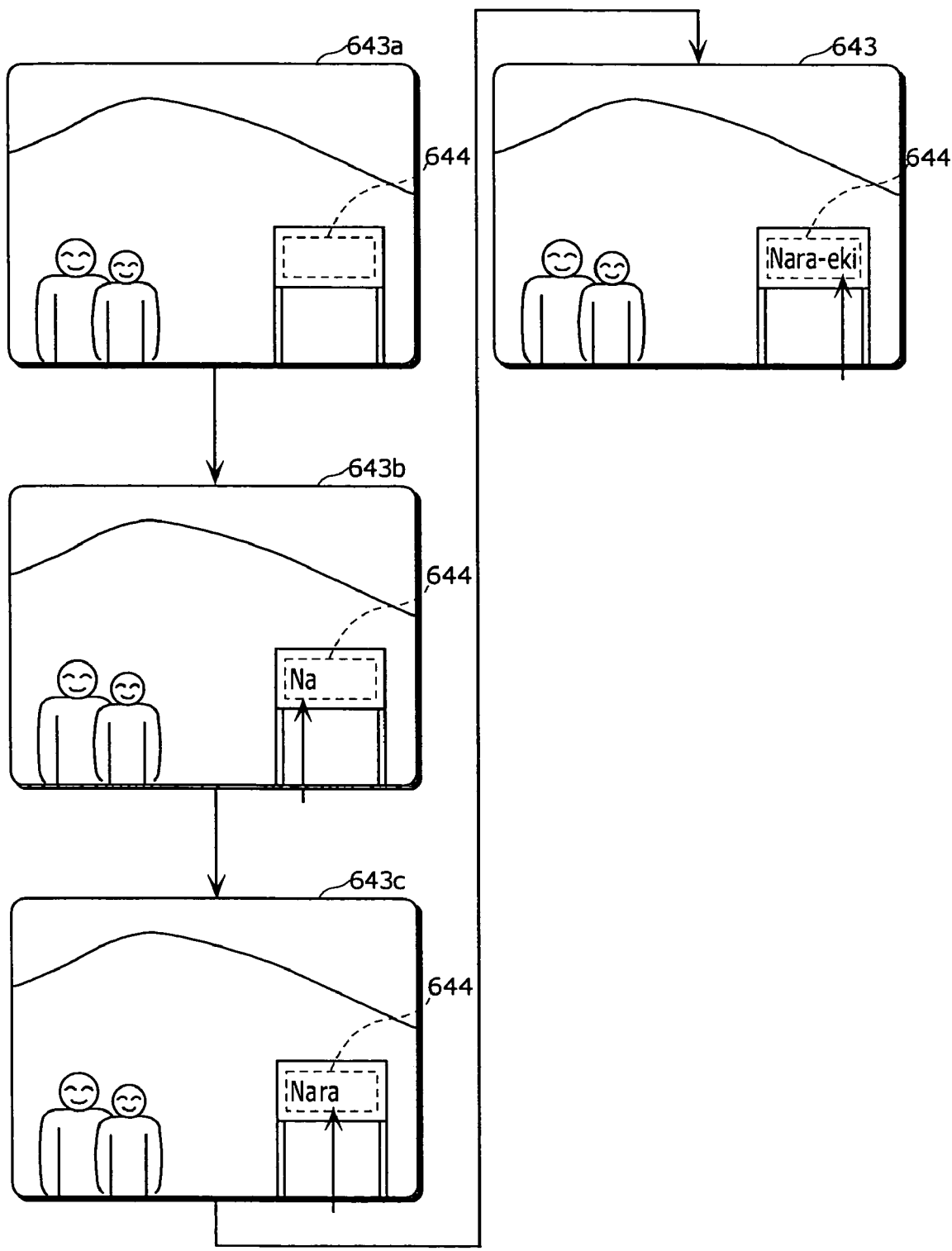
FIG. 36 shows a third example of the screen display performed by the short film generation apparatus according to the second embodiment.

FIG. 36 shows the third example of the image display performed by the short film generation apparatus 500.

Firstly, the image replay unit 506 in the short film generation apparatus 500 lets the display unit 507 output the second display image example 643*a* for display. As shown in FIG. 36, the second display image example 643*a* includes the first character area 644 that is a vertically oriented area and the slide-in effect is applied to the first character area 644.

Next, the image replay unit 506 in the short film generation apparatus 500 lets the display unit 507 output the third display image example 643*b* for display by displaying the part of the first character area 644 (the part of "Na" of "Nara-eki") by sliding it from the exterior of the display screen.

Then, the image replay unit 506 in the short film generation apparatus 500 lets the display unit 507 output the fourth display image example 643*c* for display by displaying the next part of the first character area 644 (the part of "Ra" of "Nara-eki") by sliding it from the exterior of the display screen.

Lastly, the image replay unit 506 in the short film generation apparatus 500 lets the display unit 507 output the first display image example 643 for display by displaying the last part of the first character area 644 (the part of "eki" of "Nara-eki") by sliding it from the exterior of the display screen, and then, terminates the replay of the image and proceeds to the replay of the next image.

Thus, with the short film generation apparatus 500 according to the second embodiment, it is possible to generate a short film with a stronger impact since the character area extraction unit 503 extracts the character area included in the still image while the scenario generation unit 505 selects the visual effect that is suitable for the character area included in the still image.

It should be noted that in the second embodiment, it is described that the visual effect to be applied to the character area included in the image is selected based on the form of the character area (length-width ratio) within the character area information. The selection, however, may be based on a factor other than the size of the character area (e.g., surface or length or width) or color (e.g. the color of character or background). To be more concrete, possible visual effects can be an enlargement applied to the character area that is smaller than a predetermined surface, or on the character area with white characters and a blue background or a green background, as in the case of the characters indicating a place name written on the traffic sign.

The short film that is suitable for the usage of the advertisement may be generated in changing the color of the character area or emphasizing the character area by applying the visual effect of replacing it with other characters prepared beforehand.

Furthermore, in the second embodiment, it is described that the image shot by the digital camera 100 is read directly into the apparatus via the image receiving unit 502. It may be, however, via a memory card.

It is needless to say that the visual effects to be applied either to the image or to the character area included in the image, as shown in the second embodiment, are just examples and the present invention is not limited to them.

Third Embodiment

Next, the short film generation apparatus according to the third embodiment of the present invention will be explained with reference to FIGS. 37~43.

The configuration and the operation of the short film generation apparatus according to the third embodiment is almost as same as those of the short film generation apparatus 500 according to the second embodiment. The difference, however, is the configuration and operation of the scenario generation unit.

The following explanation mainly focuses on the difference. The same referential marks are put for the same components in the second embodiment, and the description will be omitted.

Figure 37:
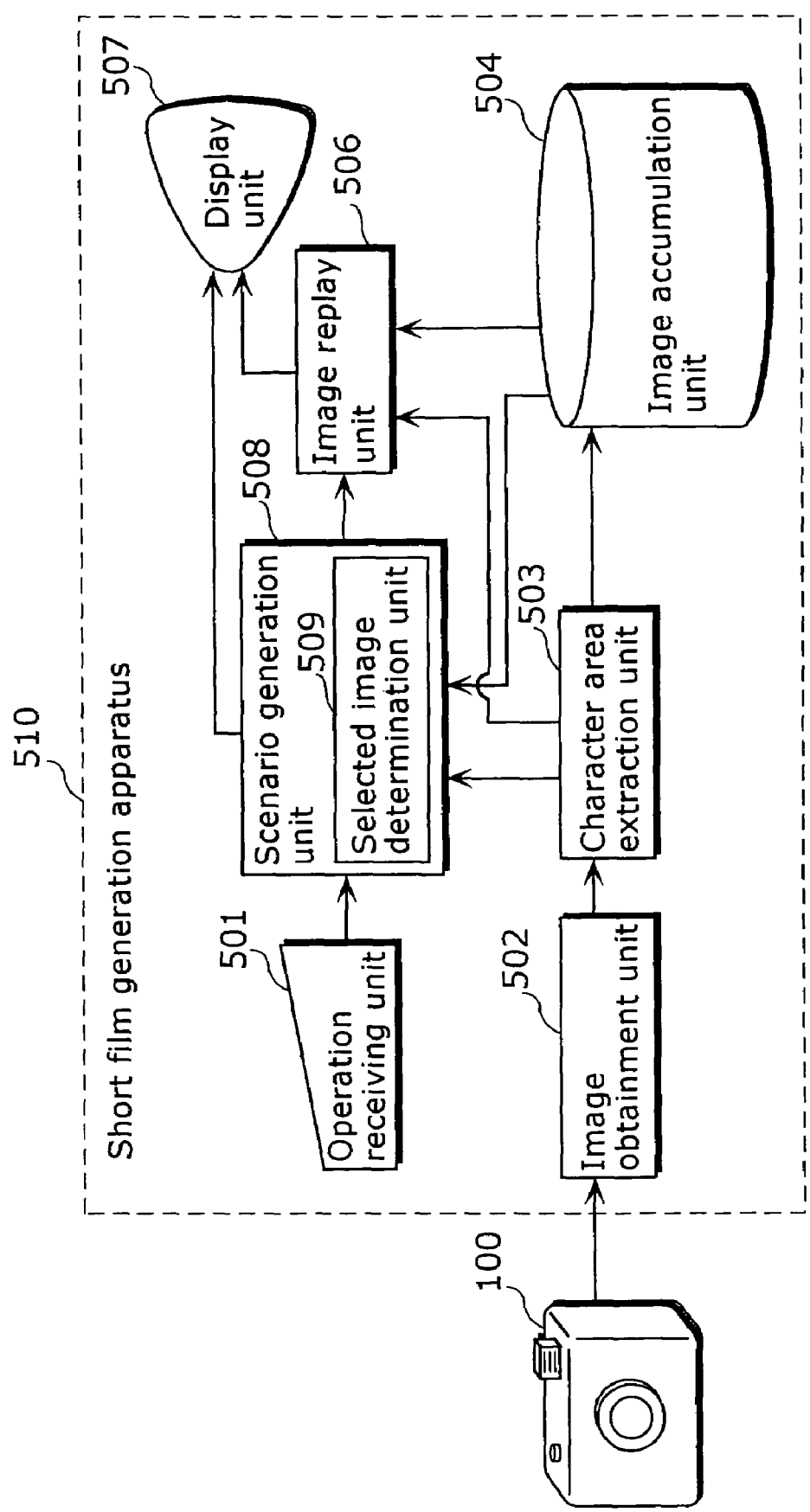
FIG. 37 is a block diagram showing the configuration of the short film generation apparatus according to a third embodiment.

FIG. 37 is a block diagram showing the configuration of the short film generation apparatus according to the third embodiment.

As shown in FIG. 37, the short film generation apparatus 510 includes the operation receiving unit 501, the image receiving unit 502, the character area extraction unit 503, the image accumulation unit 504, the scenario generation unit 508, the image replay unit 506 and the display unit 507.

The operation input 501 receives the user's operational inputs such as a selection of the character area included in the still image.

The scenario generation unit 508, which includes the selected image determination unit 509, is a processing unit for obtaining, from the operation input 501, the information on the character area selected by the user, performing a selection of the image to be replayed, a generation of the title image, a determination of the order of replaying the selected images as well as a visual effect, and is a generation of the scenario that is replay information, based on the character area information related to the selected character area.

The selected image determination unit 509 is a processing unit for selecting a still image shot within a predetermined period of time (e.g., within three hours) before and after the shooting of the key image, based on the shooting time information of the still image (key image) that includes the selected character area. Such selected image determination unit 509 can be realized with a CPU or a memory.

The following describes in detail the operation of each unit in the short film generation apparatus 510 with such configuration as described above, focusing on the scenario generation unit 508.

Figure 38:
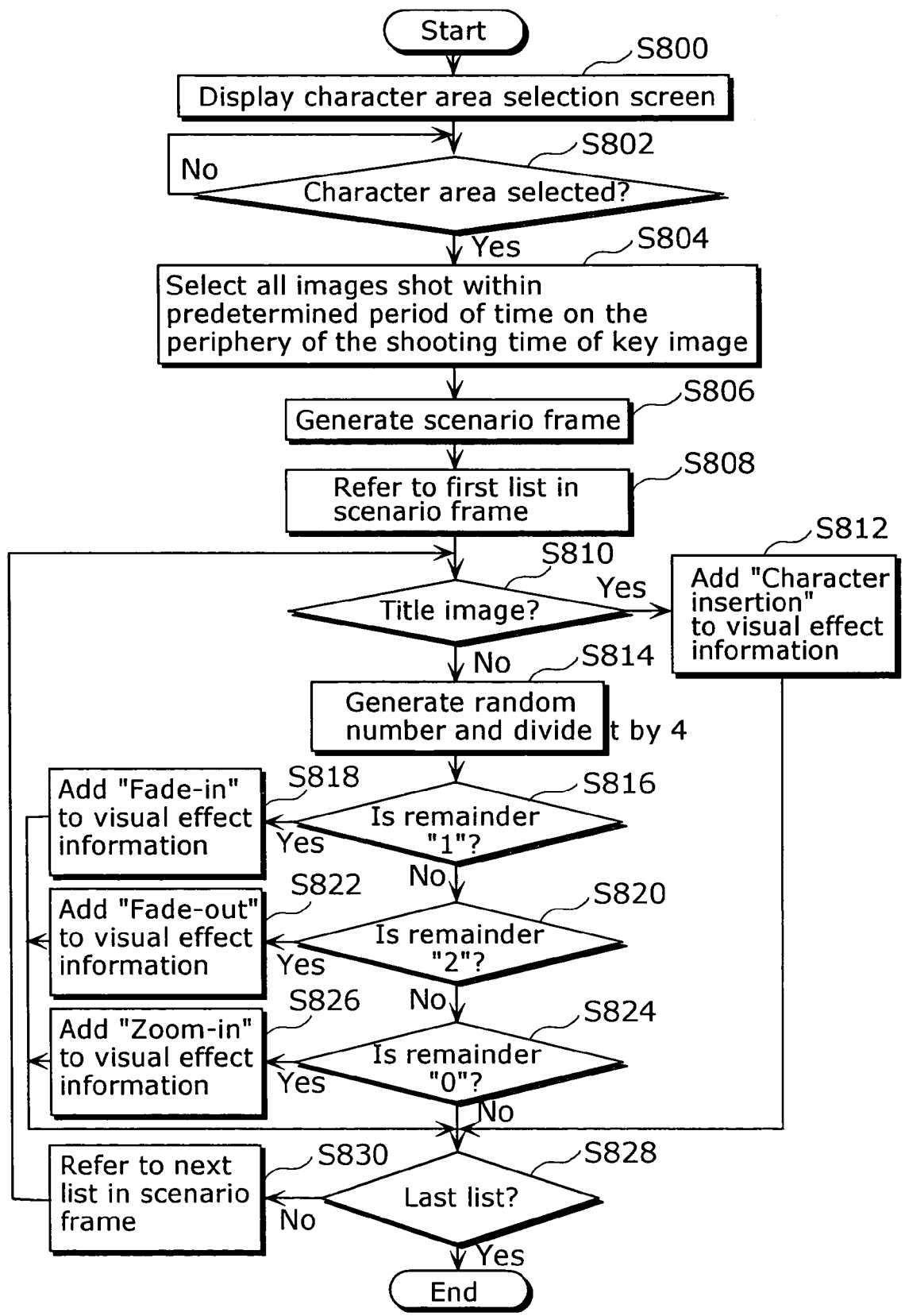
FIG. 38 is a flowchart showing the procedure in the processing performed by the scenario generation unit according to the third embodiment.

FIG. 38 is a flowchart showing the procedure used by the scenario generation unit 508.

Firstly, when receiving the operation of pressing the short film generation button from the user, the operation receiving unit 501 outputs, to the scenario generation unit 508, an instruction to generate a scenario.

After having obtained the instruction, the scenario generation unit 508 generates a screen to urge a selection of the character area (character area selection screen) and outputs it to the display unit 507 (S800). In this case, the scenario generation unit 508 generates a character area selection screen by showing clearly the character area, for instance, by drawing a broken line around the character area, for the image whose character area is extracted by the character area extraction unit 503 out of the images stored in the image accumulation unit 504. In the case where plural character areas are extracted, the scenario generation unit 508 generates the character area selection screen including the button "Next", and switches the screen from the character area selection screen to screen showing the image with the next character area extracted when the operation receiving unit 501 receives the user's operation to press the button "Next".

Here, when receiving, from the user, the operation of selecting a character area on the character area selection screen displayed by the display unit 507 (Yes in S802), the operation receiving unit 501 outputs the character area selection information to the scenario generation unit 508.

Then, the scenario generation unit 508 selects, as the images to be replayed, all the images shot within the predetermined period of time before and after the shooting time of the key image, based on the shooting time information of the image (key image) that includes the selected character area (S804).

Figure 39:
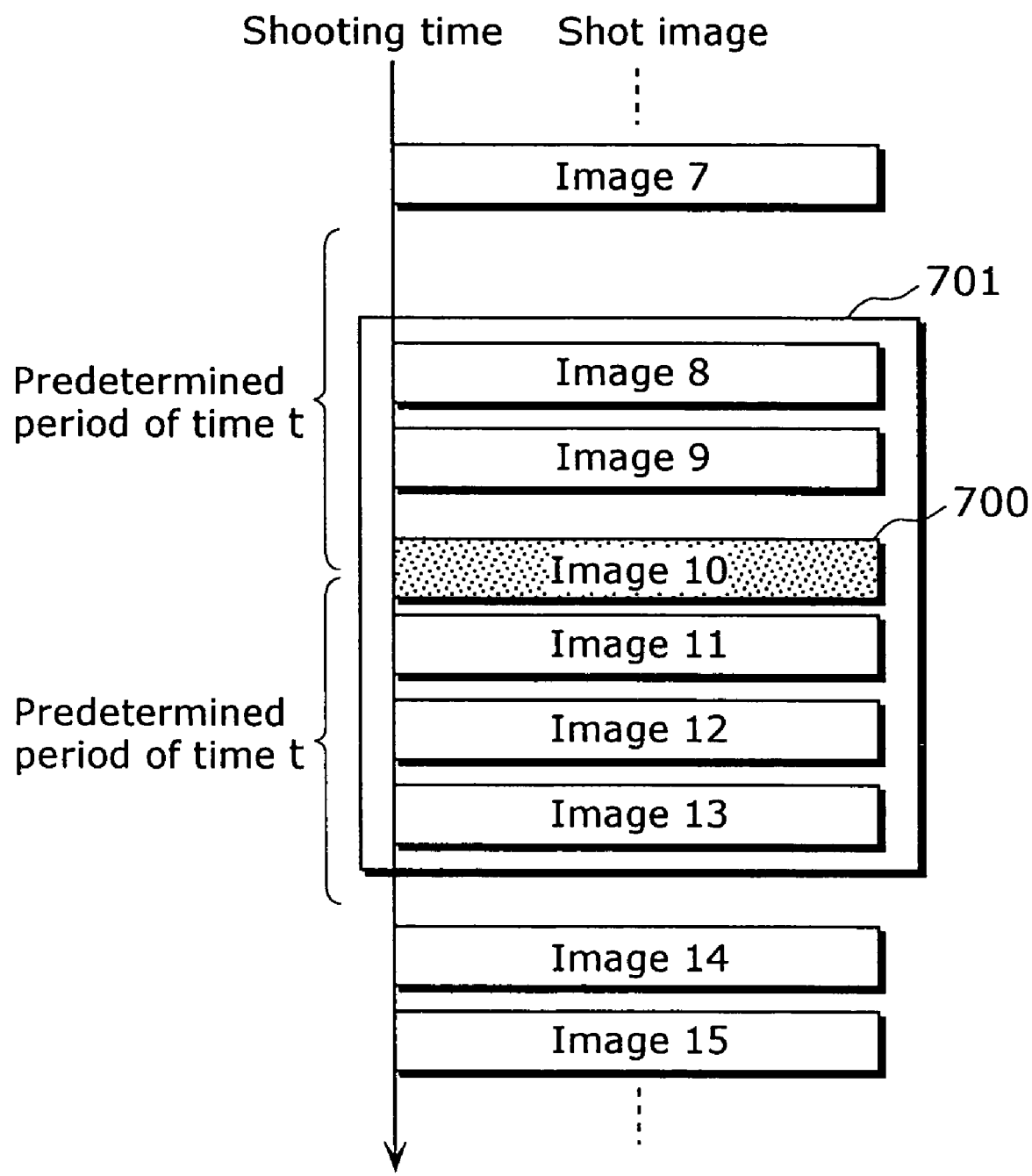
FIG. 39 shows a pattern diagram of selecting an image, according to the third embodiment.

The following describes the image selection performed by the selected image determination unit 509 with reference to FIG. 39.

FIG. 39 is a pattern diagram of the shot images (image 7-15) arranged in order of shooting time.

Here, when the operation receiving unit 501 receives the user's operation of selecting the character area included in the image 10, the selected image determination unit 509 determines the image 10 as a key image 700.

Then, the selected image determination unit 509 selects, as the images to be replayed, all the images shot within the predetermined period of time "t", based on the shooting time of the key image 700.

Since FIG. 39 indicates that images 8 and 13 are the images shot within the predetermined period of time "t" before and after the shooting time of the key image 700, the selected image determination unit 509 handles the images 8-13 as selected images 701.

In this way, after the selected image determination unit 509 selects the images to be replayed, the scenario generation unit 508 examines the shooting time information of the selected images and generates a scenario frame in which the replay information of each is image is arranged in order of shooting time like a link list (S806 in FIG. 38).

Figure 40:
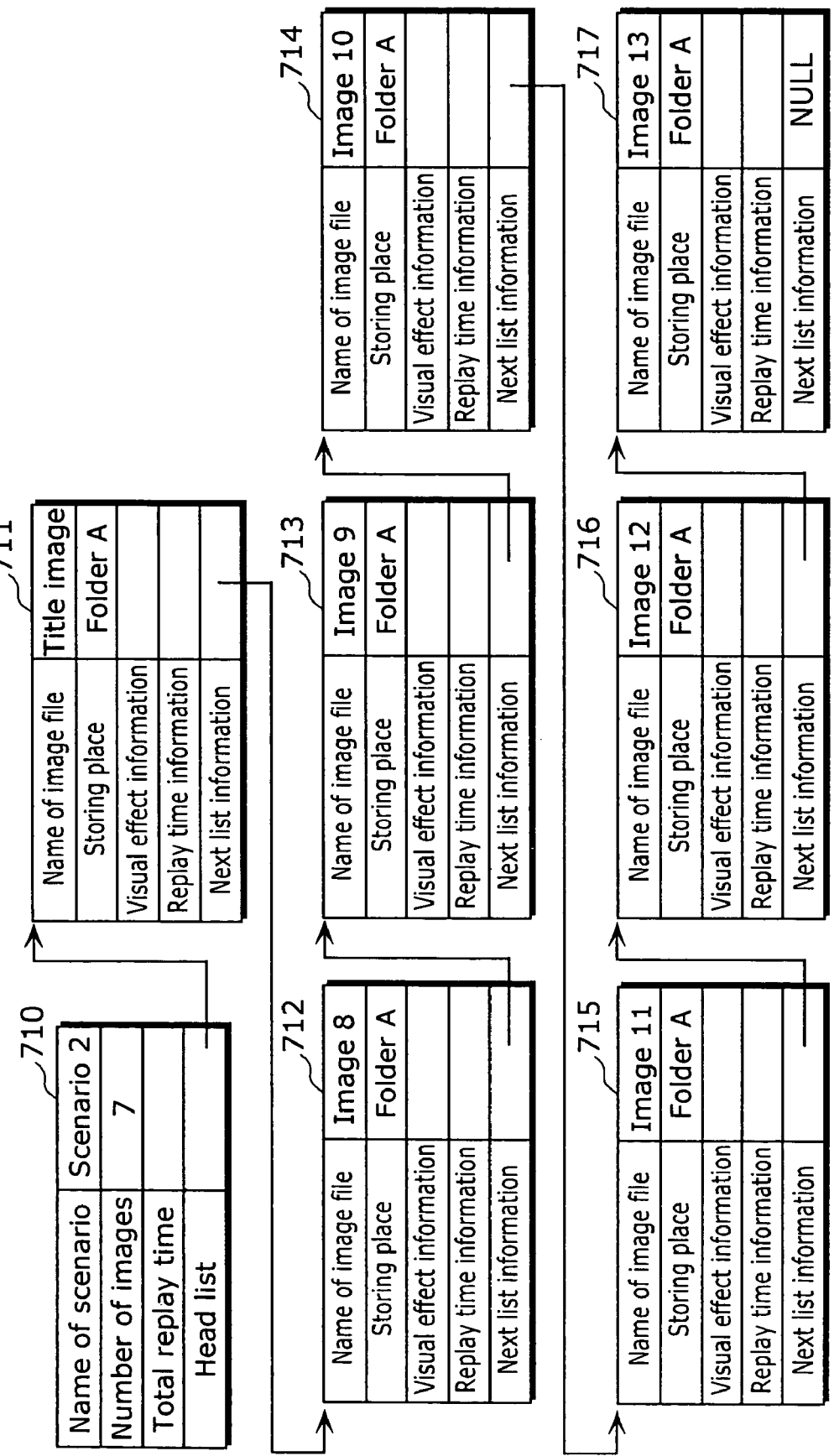
FIG. 40 shows the scenario frame according to the third embodiment.

Here, as shown in FIG. 39, FIG. 40 shows the scenario frame generated in the case where six still images (images 8~13) are selected by the selected image determination unit 509.

FIG. 40 shows an example of the scenario frame.

As shown in FIG. 40, the scenario frame in constructed like a linked list consisting of a scenario header 710, a scenario first list 711, a scenario second list 712, a scenario third list 713, a scenario fourth list 714, a scenario fifth list 715, a scenario sixth list 716 and a scenario seventh list 717.

Here, a name of the scenario and a number of images are set in the scenario header 710, while a name of the image file and a storing place in the image accumulation unit 504, out of the replay information of the title image (e.g., a screen with one color like black) that is stored beforehand in the image accumulation unit to be used for the title of the short film, are set in the scenario first list 711. The name of the image file and the storing place in the image accumulation unit 504 are set for each of the lists 712~717 which are the remaining lists in the scenario frame.

Then, the total replay time of the scenario header 210 as well as the visual effect information and the replay time information in each of the lists 711~717 in the scenario frame are left blank at this stage.

Returning to the explanation of the procedure used by the scenario generation unit 508 with reference to FIG. 38, the scenario generation unit 508 refers to the scenario first list 711 in the generated scenario frame (S808) and determines the visual effect to be assigned for the image indicated in the scenario first list 711.

Here, the scenario generation unit 508 examines the name of the image file and judges whether or not the image indicated in the scenario first list 711 is a title image (S810).

In the case where the image is a title image (Yes in S810), the scenario generation unit 508 adds, to the visual effect information in the scenario first list 711, "character insertion" indicating the insertion of the character area selected by the user in the center of the title image (S812).

In the case where the image is not a title image, (No in S810), the scenario generation unit 508 generates a random number using a random function, divides it by 4, obtains the remainder (S814), and thereby, determines the visual effect to be assigned for the image.

That is to say, in the case where the remainder is "1", (Yes in S816), the scenario generation unit 508 adds, to the visual effect information in the scenario first list 711, "fade-in" as an effect to be applied to the image (S818), while in the case where the remainder is "2", adds, to the visual effect information in the scenario first list 711, "fade-out" as an effect to be applied to the image (S822). In the case where the remainder is "3" (No in S824), the scenario generation unit 508 adds, to the visual effect information in the scenario first list 711, a flag indicating that no visual effect is applied.

Moreover, the scenario generation unit 508 also sets the replay time information of the image and adds it to the replay time information in the scenario first list 711, when adding, to the replay time information in the scenario first list 711, the visual effect to be assigned. Here, "3 seconds" (45 frames) is set as a time for replaying the image on which the zoom-in effect is applied while "2 seconds" (30 frames) is set as a time for replaying the other images.

After that, the scenario generation unit 508 judges whether or not the list to which the visual effect information and the replay time information are added is the last list (S828). In the case the list is the last one (Yes in S828), the scenario generation unit 508 terminates the operation of the scenario generation. In the case is where the list is not the last one (No in S828), the scenario generation unit 508 refers to the next list in the scenario frame (S830) and repeats the operation of determining the visual effect for the image.

Figure 41:
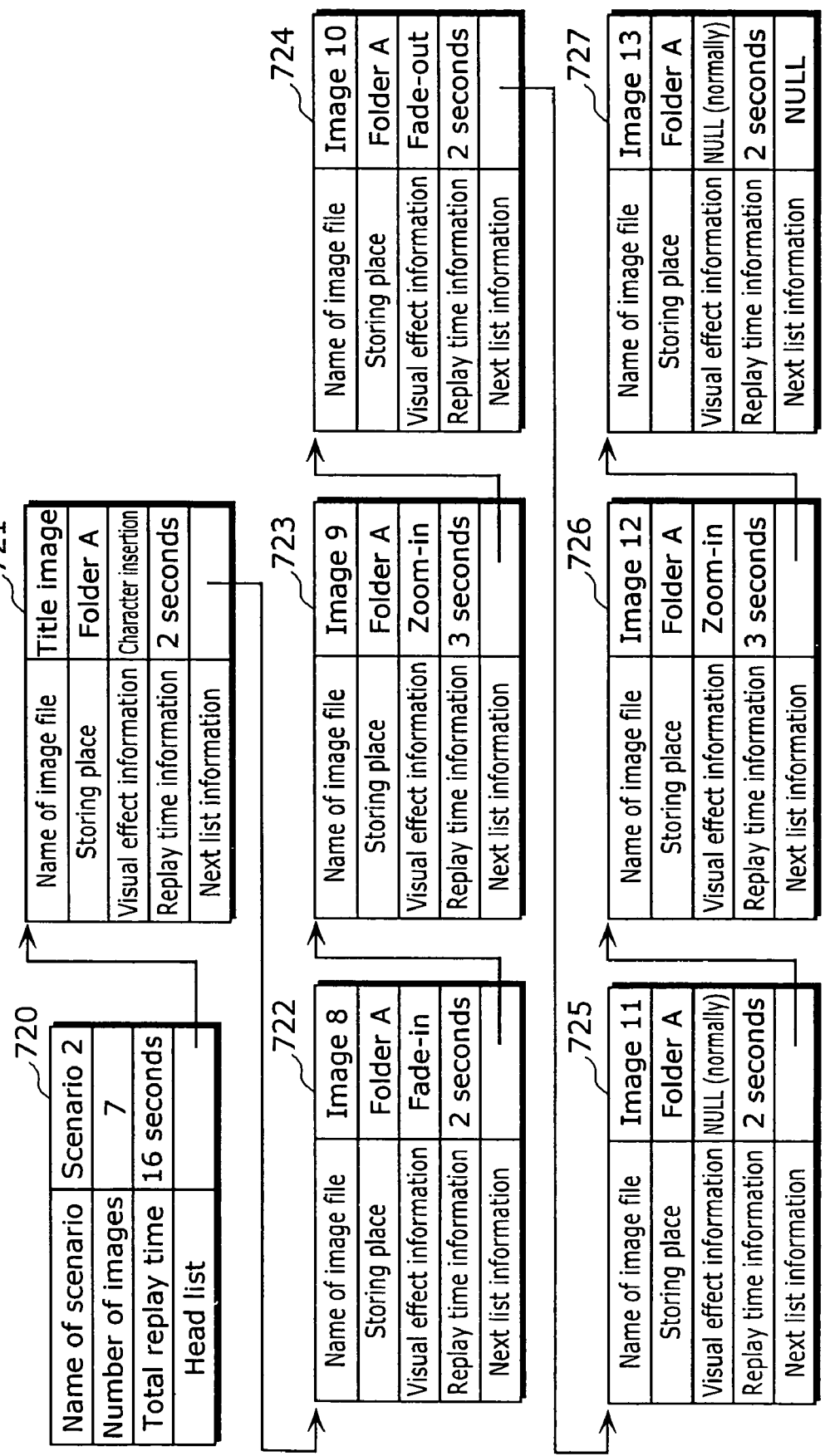
FIG. 41 shows the completed scenario according to the third embodiment.

In this way, the scenario shown in FIG. 41 is completed by the repetitive operation of assigning the visual effect for the images starting from the head image (i.e., title image) until the last image (image 13) in replay order; performed by the scenario generation unit 508.

FIG. 41 shows the completed scenario.

In the completed scenario, the information indicating "16 seconds" for the total replay time is described in the scenario header 720, the visual effect information for assigning character insertion effect and the replay time information indicating "2 seconds" are described in the scenario first list 721 in which the replay information of the title image is described. Similarly, the visual effect information and the replay time information to be respectively assigned are described also in the respective lists 722~727 in which the replay information of each image is described.

That is to say, according to the completed scenario, the title image, the images 8, 9, 10, 11, 12 and 13 are replayed in this order, and the following is indicated: the character insertion effect is applied to the title image; the fade-in effect to the image 8; the zoom-in effect to the image 9; the fade-out effect to the image 10; the zoom-in effect to the image 12; and no visual effect is applied to the images 11 and 13. It is also indicated that the replay time of the respective images are 2 seconds, 2 seconds, 3 seconds, 2 seconds, 2 seconds, 3 seconds and 2 seconds (16 seconds in total).

After this, the image replay unit 506 receives the address information of the scenario generated by the scenario generation unit 508, refers to the scenario first list and obtains the replay information of the image (i.e., title image) stored in the scenario is first list. The image replay unit 506 then reads out, from the image accumulation unit 504 the compressed still image data and decompresses it, based on the obtained replay information. The image replay unit 506 then replays the image by performing the visual effect (e.g., character insertion) indicated in the visual effect information while managing the time based on the replay time information (i.e., a number of frames) and lets the display unit 507 display the image.

After the replay of the image is terminated, the image replay unit 506 refers to the next list in the scenario, obtains the replay information of the next image (image 8), and repeats the above processing until the replay of the last image (image 13) terminates.

Figure 42:
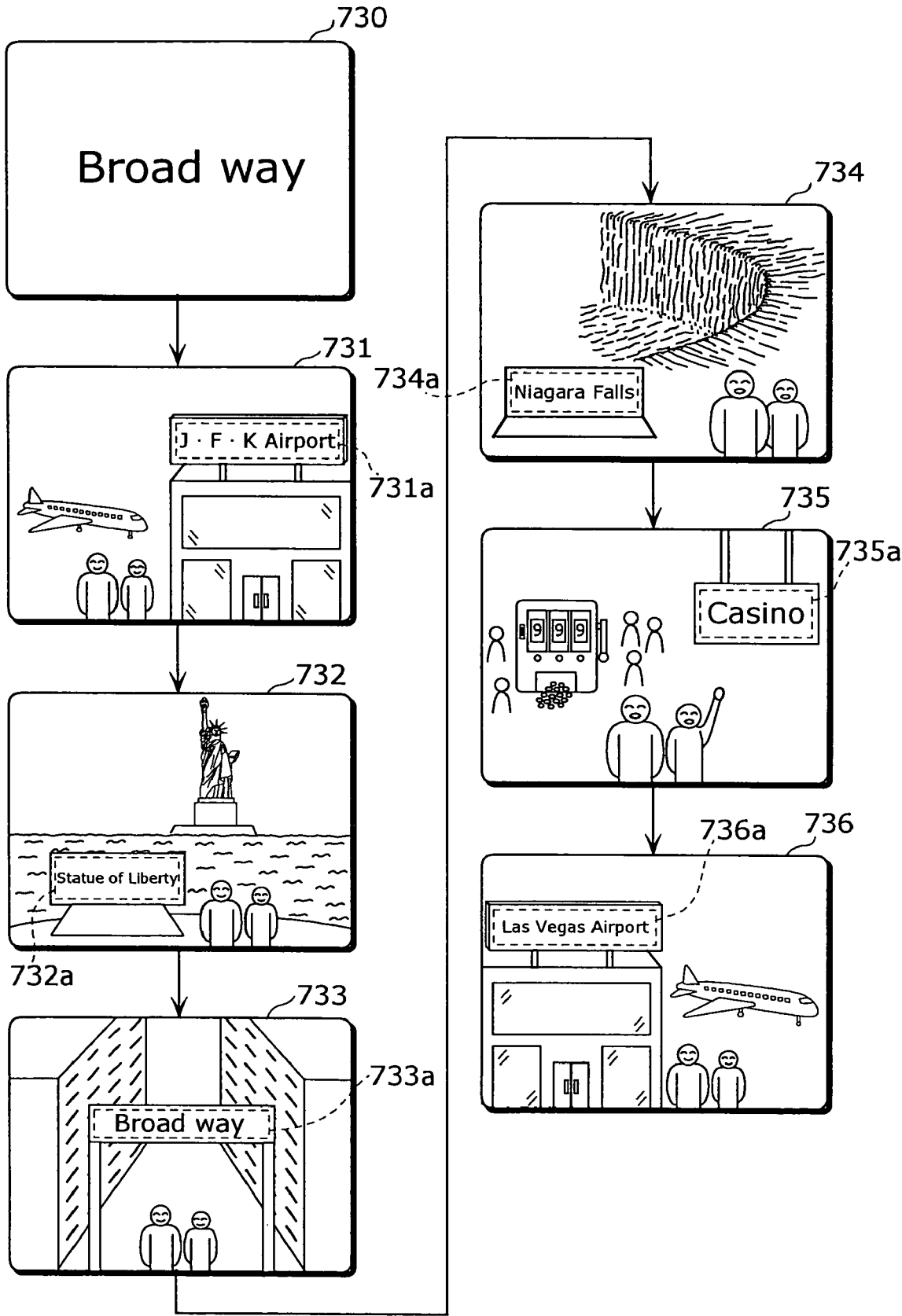
FIG. 42 shows a first example of the screen display performed by the short film generation apparatus according to the third embodiment.
Figure 43:
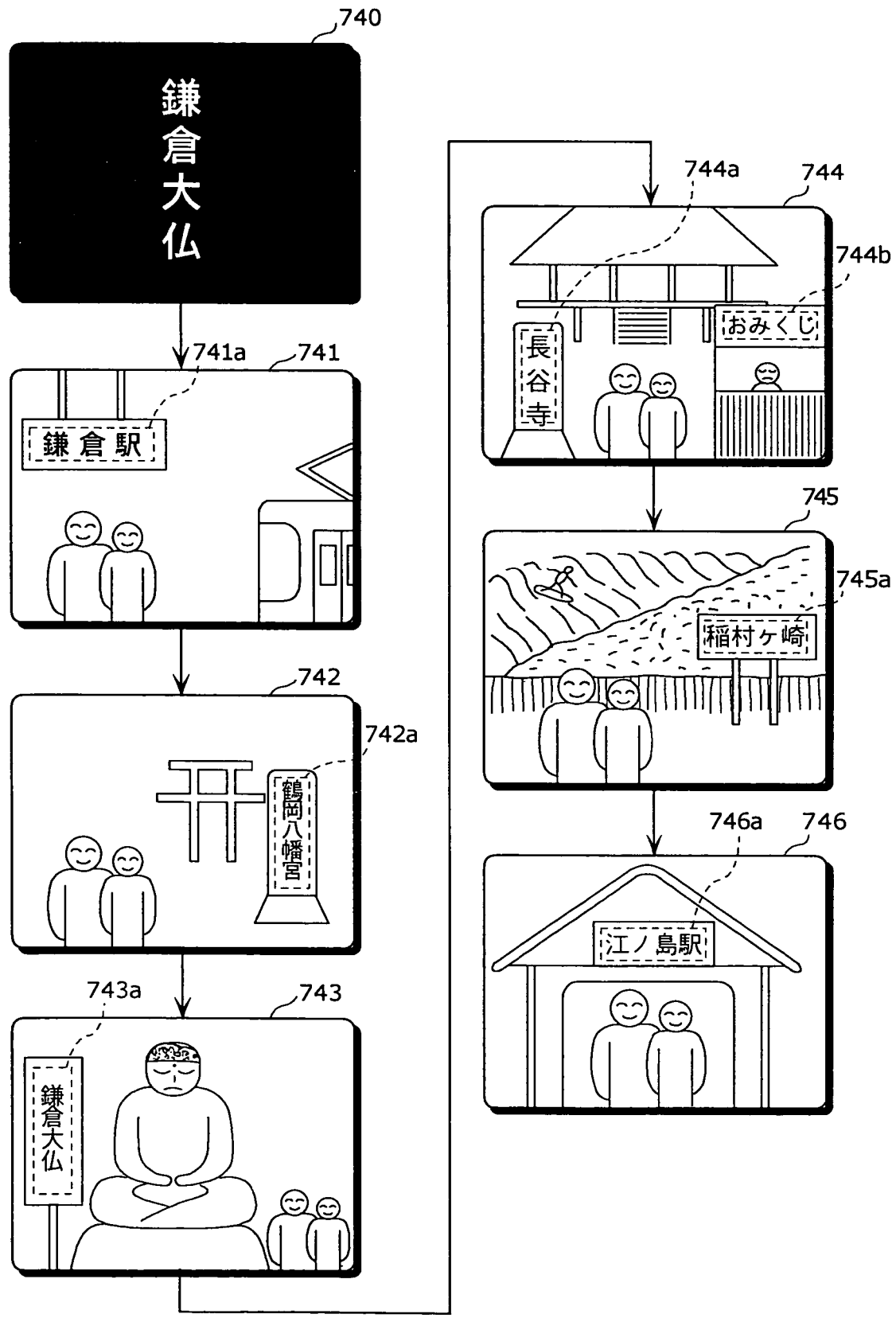
FIG. 43 shows a second example of the screen display performed by the short film generation apparatus according to the third embodiment.

FIGS. 42 and 43 show examples of the image display of the short film replayed by the short film generation apparatus 510 through such processing as described above.

FIG. 42 shows the first example of the image display performed by the short film generation apparatus 510.

FIG. 42 shows the first display image example 730 as an example of the display of the title image and a total of seven examples from the first to seventh display image examples 731~736 as displays of the images 8~13 as well as how the short film generation apparatus 510 starts a sequential replay starting from the first display image example 730.

Here, the first display image example 730 is a title image to be replayed according to the scenario first list 721. The visual effect assigned to the title image is an insertion of the character area in the image 10 that is a key image, namely, the first character area 733a (i.e., "Broadway") included in the fourth display image example 733. The short film generation apparatus 510 switches the display from the two-minute-display of the first display image example 730 to the second display image example 731.

The second display image example 731 is the image 8 to be replayed according to the scenario second list 722 shown in FIG. 41 and the fade-in effect is assigned to the image. The short film generation apparatus 510 displays the second display image example 731 by gradually clarifying the image when switching from the first display image example 730 to the second display image example 731.

The short film generation 510 then replays, in the same way according to the list in the scenario, the images 9~13 arranged in replay order, and sequentially displays the third to seventh display image examples 732~736.

It should be noted that the characters used in character area extracted by the character area extraction unit 503 are not limited to occidental alphabets. It may be in Chinese characters or in Japanese alphabets. The character area extraction unit 503 holds the template for pattern matching use for each language so that it is possible to extract the character area written in multi-language. The same applies to the object judgment unit 300 in the first embodiment described above as well as to the second embodiment.

FIG. 43 shows a screen display in the case where the characters in the character area are written in Japanese.

FIG. 43 shows, as in the case of FIG. 42, the first display image example 740 which is an example of the display of the title image and a total of seven examples of the first through seventh display image examples 741~746, as well as how the short film generation apparatus 510 starts a sequential replay starting from the first display image example 740.

Here, the diagram shows that the visual effect of inserting the first character area 743a written in Japanese that is included in the fourth display image example 743 (i.e., a key image) is assigned for the first display image example 740.

It is also apparent that in the fifth display image example 744 that the second character area 744b, written in Japanese alphabet and included in the fifth display image example 744, is extracted. Thus, it is possible to extract the character area where the character is in Japanese and also to insert the Japanese character in the title image.

In this way, according to the short film generation apparatus 510 according to the third embodiment, the image to be replayed by the scenario generation apparatus 510 is automatically selected when the still image including the character area selected by the user is determined as a key image. Therefore, the trouble imposed on the user to select the image to be replayed can be omitted.

Also, the character area selected by the user is inserted automatically into the title image so that the user's operation to input the characters for the title with a keyboard can be omitted.

It should be noted that in the third embodiment, the user selects the character area from the candidates via the operation receiving unit 501. However, the scenario generation unit 508 may judge based on the size of the character area so that it may be determined automatically. Here, the short film generation apparatus 510 may automatically determine the character area used for the title image using a default value so that the title character desired by the user may be used for the title image in the case where the operation receiving unit 501 receives, from the user, the input of the characters to be used for the title.

The selected image determination unit 509 selects the images that are shot within the predetermined period of time before and after the shooting time of the key image selected by the user, as the images to be replayed. However, in the case where the time interval longer than the predetermined period of time is found out after the examination of the time intervals of the shooting time between an image and the following one among the images arranged in order of shooting time, the selected image determination unit 509 may classify the following image as a different group. In this way, is the image that belongs to the same group as the group to which the key image belongs may be selected as the images to be replayed.

Moreover, the scenario generation unit 508 places, in the scenario first list, the replay information of the title image. The replay information, however, may not be placed in the scenario. Instead, the title image in which the character area is inserted before the execution of the scenario performed by the image replay unit 506 may be outputted for display by the display unit 507. Also, the key image itself, not a black screen, may be used as a title image.

As is the case of the second embodiment, the image shot by the digital camera 100 is directly read into the short film generation apparatus 510 via the image receiving unit 502. The image, however, may be read in via a memory card.

Also, an image or a character area included in the image is used as an example, and the present invention is not limited to this, as is the case of the second embodiment.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The image display apparatus according to the present invention is useful as an image display apparatus equipped with a portable terminal, for example, a display device, such as a cell phone and a PDA, with a number of pixels fewer than that of the original image.

The short film generation apparatus according to the present invention can be applied to a cell phone with an image replay function or a personal computer, and is especially suitable for a personal computer that stores a huge amount of still image data.

What is claimed is:

1. An image display apparatus comprising:
a display unit operable to display an image;
an original image holding unit operable to hold an original image, the original image being specified by a user and including a larger number of pixels than a number of pixels that can be displayed on the display unit;
an object judgment unit operable to (i) judge whether or not an object is included in the original image held in the original image holding unit, and (ii) generate object information related to the object in a case where the object judgment unit judges that the object is included in the original image; and
a display image generation unit operable to (i) extract, from the original image, at least a part of an object area that includes the object included in the original image, and (ii) generate a display image having a number of pixels corresponding to the number of pixels that can be displayed on the display unit, the display image generation unit performing the extraction and generation based on the original image specified by the user and based on the object information related to the object included in the original image,
wherein the object judgment unit includes:
an object extraction unit operable to (i) extract a position and a size of the object included in the original image, and (ii) add the extracted position and size of the object included in the original image to the object information; and
an object type judgment unit operable to (i) determine a type of the object corresponding to the position and size extracted by the object extraction unit, and (ii) add the type of the object to the object information, and
wherein the display image generation unit determines the part of the object area to be extracted from the original image, based on the position, size and type of the object, which are added to the object information.

2. The image display apparatus according to claim 1, wherein the type of object includes at least one of the following: figure; someone's face; dog; cat; book; object with a character string; sign-board; and price tag.

3. The image display apparatus according to claim 1,
wherein the object judgment unit further includes an object priority setting unit operable to add, to the object information, a priority assigned according to the type of the object determined by the object type judgment unit, and
wherein the display image generation unit determines the part of the object area to be extracted from the original image based on the priority added to the object information.

4. The image display apparatus according to claim 1, wherein the object extraction unit extracts the position and size of the object included in the original image using at least one of the following: pattern matching; color distribution information; edge information; area division information; and layout information.

5. The image display apparatus according to claim 1, wherein the display image generation unit further includes a thumbnail image generation unit operable to (i) extract at least a part of an object area that includes the object included in the original image, and (ii) generate a thumbnail image including a predetermined number of pixels, the thumbnail image generation unit performing the extraction and generation based on the object information related to the object included in the original image.

6. The image display apparatus according to claim 5,
wherein the original image holding unit holds a plurality of original images, and
wherein the display image generation unit allows the display unit to display thumbnail images generated by the thumbnail image generation unit for each of the plurality of original images.

7. The image display apparatus according to claim 6, wherein the predetermined number of pixels is a number of pixels assigned for one thumbnail image when being displayed by the display unit.

8. The image display apparatus according to claim 1, wherein the display image generation unit generates a display image including a number of pixels corresponding to the number of pixels that can be displayed on the display unit by enlarging or reducing the part of the object area to be extracted from the original image.

9. The image display apparatus according to claim 1, wherein the display image generation unit determines the part of the object area to be extracted from the original image such that a number of pixels of the part of the object area to be extracted from the original image is equal to the number of pixels that can be displayed on the display unit.

10. The image display apparatus according to claim 1,
wherein the display image generation unit determines the part of the object area to be extracted from the original image such that a center position of the object included in the extracted part of the object area becomes a center position of the display image displayed on the display unit, the center position of the object being added to the object information.

11. The image display apparatus according to claim 1, further comprising:
an obtainment unit operable to obtain the original image at least by one of shooting a picture and obtaining from a storage medium or a transmission medium; and
a storage unit operable to store, in the original image holding unit, the original image obtained by the obtainment unit.

12. An image display method for using an image display apparatus including a display unit operable to display an image and an original image holding unit operable to hold an original image, the original image being specified by a user and including a larger number of pixels than a number of pixels that can be displayed on the display unit, the image display method comprising:
judging whether or not an object is included in the original image held in the original image holding unit, and generating object information related to the object in a case where said judging of whether or not the object is included in the original image judges that the object is included in the original image;
generating a display image by extracting, from the original image, at least a part of an object area that includes the object included in the original image and generating a display image having a number of pixels corresponding to the number of pixels that can be displayed on the display unit, said extracting and generating being performed based on the original image specified by the user and based the object information related to the object included in original image,
wherein said judging further includes:
extracting a position and a size of the object included in the original image, and adding the extracted position and size of the object included in the original image to the object information; and
determining a type of the object corresponding to the position and size extracted by said extracting of the position and size, and adding the type of the object to the object information, and
wherein said generating of the display image further includes determining the part of the object area to be extracted from the original image, based on the position size and type of the object, which are added to the object information.

13. A computer-readable recording medium having a program recorded thereon, the program for using an image display apparatus including a display unit operable to display an image and an original image holding unit operable to hold an original image, the original image being specified by a user and including a larger number of pixels than a number of pixels that can be displayed on the display unit, the program causing the image display apparatus to execute a method comprising:
judging whether or not an object is included in the original image held in the original image holding unit, and generating object information related to the object in a case where said judging of whether or not the object is included in the original image judges that the object is included in the original image;
generating a display image by extracting, from the original image, at least a part of an object area that includes the object included in the original image and generating a display image having a number of pixels corresponding to the number of pixels that can be displayed on the display unit, said extracting and generating being performed based on the original image specified by the user and based on the object information related to the object included in the original image,
wherein said judging further includes:
extracting a position and a size of the object included in the original image, and adding the extracted position and size of the object included in the original image to the object information; and
determining a type of the object corresponding to the position and size extracted by said extracting of the position and size, and adding the type of the object to the object information, and
wherein said generating of the display image further includes determining the part of the object area to be extracted from the original image, based on the position size and type of the object, which are added to the object information.

14. A portable terminal having an image display apparatus, wherein the image display apparatus includes:
a display unit operable to display an image;
an original image holding unit operable to hold an original image, image being specified by a user and including a larger number of pixels than a number of pixels that can be displayed on the display unit;
an object judgment unit operable to (i) judge whether or not an object is included in the original image held in the original image holding unit, and (ii) generate object information related to the object in a case where the object judgment unit judges that the object is included in the original image; and
a display image generation unit operable to (i) extract, from the original image, at least a part of an object area that includes the object included in the original image, and (ii) generate a display image having a number of pixels corresponding to the number of pixels that can be displayed on the display unit, the display image generation unit performing the extraction and generation based on the original image specified by the user and based on the object information related to the object included in the original image, wherein the object Judgment unit includes:

an object extraction unit operable to (i) extract a position and a size of the object included in the original image, and (ii) add the extracted position and size of the object included in the original image to the object information; and an object type judgment unit operable to (i) determine a type of the object corresponding to the position and size extracted by the object extraction unit, and (ii) add the type of the object to the object information, and wherein the display image generation unit determines the part of the object area to be extracted from the original image, based on the position, size and type of the object, which are added to the object information.

* * * * *

UNITED STATES PATENT AND TRADEMARK OFFICE
CERTIFICATE OF CORRECTION

PATENT NO. : 7,469,064 B2
APPLICATION NO. : 10/882641
DATED : December 23, 2008
INVENTOR(S) : Shinji Furuya et al.

Page 1 of 1

It is certified that error appears in the above-identified patent and that said Letters Patent is hereby corrected as shown below:

In column 36, claim 12, line 7, please change "position size" to -- position, size --.

In column 36, claim 13, lines 45 and 46, please change "position size" to -- position, size --.

Signed and Sealed this

Eighteenth Day of August, 2009

David J. Kappos
*Director of the United States Patent and Trademark Office*